US 9,777,470 B2

(12) United States Patent
Mazz et al.

(10) Patent No.: US 9,777,470 B2
(45) Date of Patent: Oct. 3, 2017

(54) SHOWER CONTROL SYSTEM WITH NETWORK FEATURES

(71) Applicant: Kohler Co., Kohler, WI (US)

(72) Inventors: Margaret C. Mazz, Sheboygan, WI (US); Gregory De Swarte, Sheboygan, WI (US); Donald P. Freier, Sheboygan, WI (US); Brian C. Wick, Sheboygan Falls, WI (US); Steven M. Tervo, Plymouth, WI (US); Jeffrey J. Mueller, Manitowoc, WI (US); Keith S. Ruh, Elkhart Lake, WI (US); Greta Knowles, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 198 days.

(21) Appl. No.: 14/803,819

(22) Filed: Jul. 20, 2015

(65) Prior Publication Data

US 2015/0322652 A1    Nov. 12, 2015

Related U.S. Application Data

(63) Continuation-in-part of application No. 13/015,506, filed on Jan. 27, 2011, now Pat. No. 9,085,881.

(Continued)

(51) Int. Cl.
*E03C 1/05* (2006.01)
*G05D 7/06* (2006.01)

(52) U.S. Cl.
CPC .............. *E03C 1/055* (2013.01); *E03C 1/05* (2013.01); *G05D 7/0623* (2013.01);
(Continued)

(58) Field of Classification Search
CPC ......... E03C 1/05; E03C 1/055; G05D 7/0623; G05D 7/0641
(Continued)

(56) References Cited

U.S. PATENT DOCUMENTS 4,854,499 A    8/1989    Neuman
5,255,399 A    10/1993    Park
(Continued)

FOREIGN PATENT DOCUMENTS

CN         2162904         4/1994
CN       201150886        11/2008
(Continued)

OTHER PUBLICATIONS

Taiwan Office Action and English Translation for Taiwan Patent Application No. 100104012, dated Jun. 26, 2013, 17 pages.
(Continued)

*Primary Examiner* — Tuan N Nguyen
(74) *Attorney, Agent, or Firm* — Foley & Lardner LLP

(57) ABSTRACT

A shower control system includes a water subsystem, a steam subsystem, and a controller in communication with the water subsystem and the steam subsystem. The water subsystem includes one or more electronic valves configured to control a flow rate and a temperature of water dispensed from one or more shower outlets within a shower enclosure. The steam subsystem is configured to generate and dispense steam from one or more steam outlets within the shower enclosure. The controller is configured to control the water subsystem and the steam subsystem to provide a spa experience including a predetermined and coordinated sequence of water outputs from the shower outlets and steam outputs from the steam outlets.

18 Claims, 31 Drawing Sheets

Related U.S. Application Data

(60) Provisional application No. 61/300,087, filed on Feb. 1, 2010.

(52) U.S. Cl.
CPC ...... *G05D 7/0641* (2013.01); *Y10T 137/0318* (2015.04); *Y10T 137/8376* (2015.04); *Y10T 137/86292* (2015.04)

(58) Field of Classification Search
USPC .......................................... 4/559, 597, 598
See application file for complete search history.

(56) References Cited

U.S. PATENT DOCUMENTS

| | | | | |
|---|---|---|---|---|
| 5,414,879 | A | 5/1995 | Hiraishi et al. | |
| 7,889,187 | B2* | 2/2011 | Freier | G05D 23/1393 4/597 |
| 8,646,121 | B2* | 2/2014 | Nguyen | A61H 33/06 4/601 |
| 2008/0262755 | A1 | 10/2008 | Dayton et al. | |
| 2011/0186135 | A1 | 8/2011 | Hanna et al. | |
| 2011/0186136 | A1 | 8/2011 | Hanna et al. | |
| 2011/0186137 | A1 | 8/2011 | Hanna et al. | |
| 2011/0186138 | A1 | 8/2011 | Hanna et al. | |

FOREIGN PATENT DOCUMENTS

| | | |
|---|---|---|
| EP | 1 640 837 A2 | 3/2006 |
| EP | 2 008 635 A2 | 12/2008 |
| TW | 191877 | 10/1992 |
| WO | WO-2006/058650 | 6/2006 |

OTHER PUBLICATIONS

Taiwan Office Action and English Translation for Taiwan Patent Application No. 100104010, dated Jun. 20, 2013, 20 pages.
English machine-translation of TW 191877 (Oct. 1, 1992 titled "Shower unit with automatic sprinkler function with multiple shower spout", 60 pages.
Taiwan Office Action and English Translation for Taiwan Patent Application No. 100103995, dated May 13, 2014, 10 pages.
Taiwan Office Action and English Translation for Taiwan Patent Application No. 100104011, dated May 9, 2014, 10 pages.
Notification of the First Office Action for Chinese Patent Application No. 201180022257 with English translation, dated Mar. 27, 2014, 15 pages.
International Search Report and Written Opinion for PCT/US2011/022787, mail date Jun. 15, 2011, 10 pages.
EPO Communication dated Nov. 3, 2016 issued in corresponding European application No. 11 705 720.8, 6 pages.

* cited by examiner

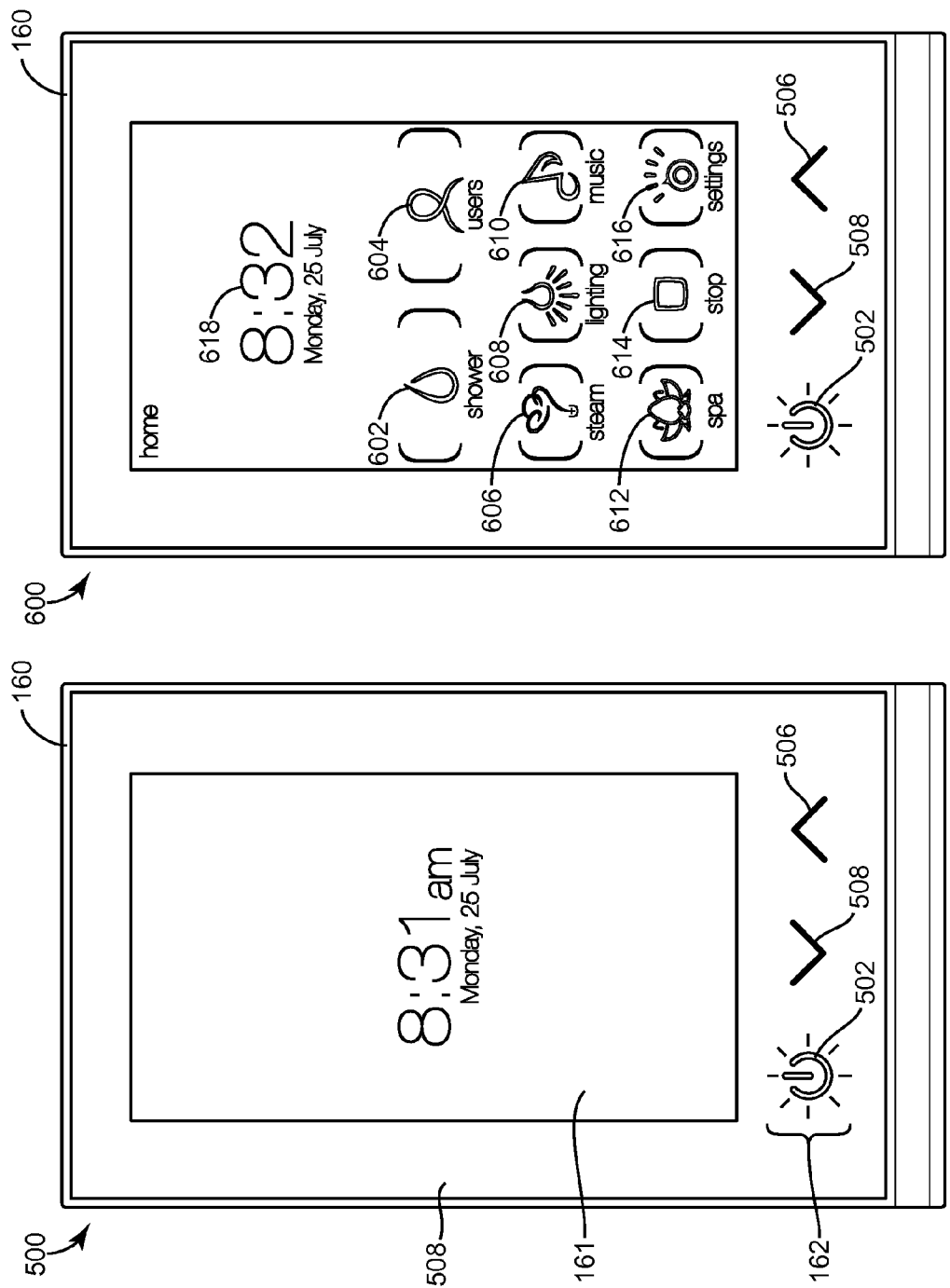

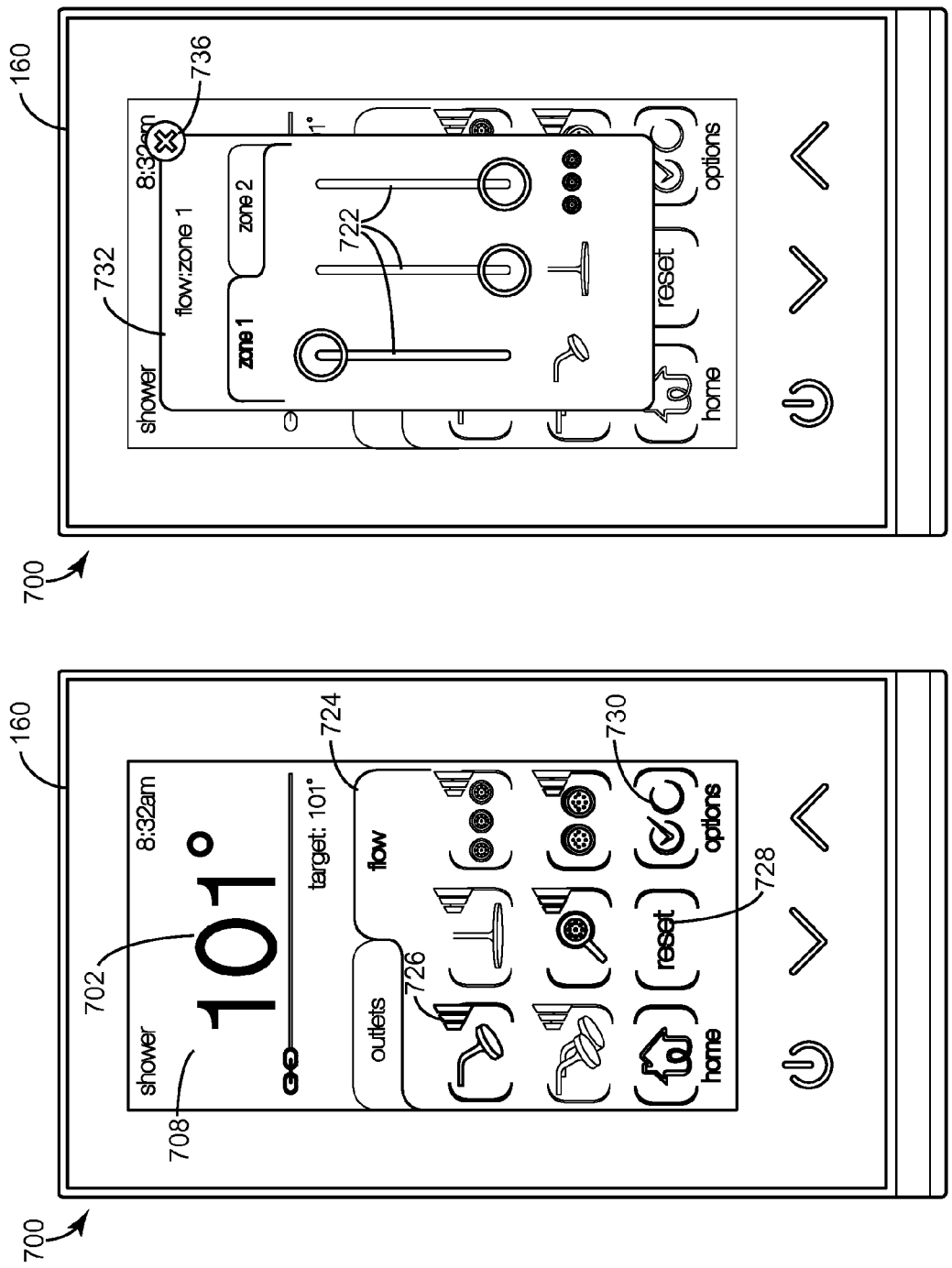

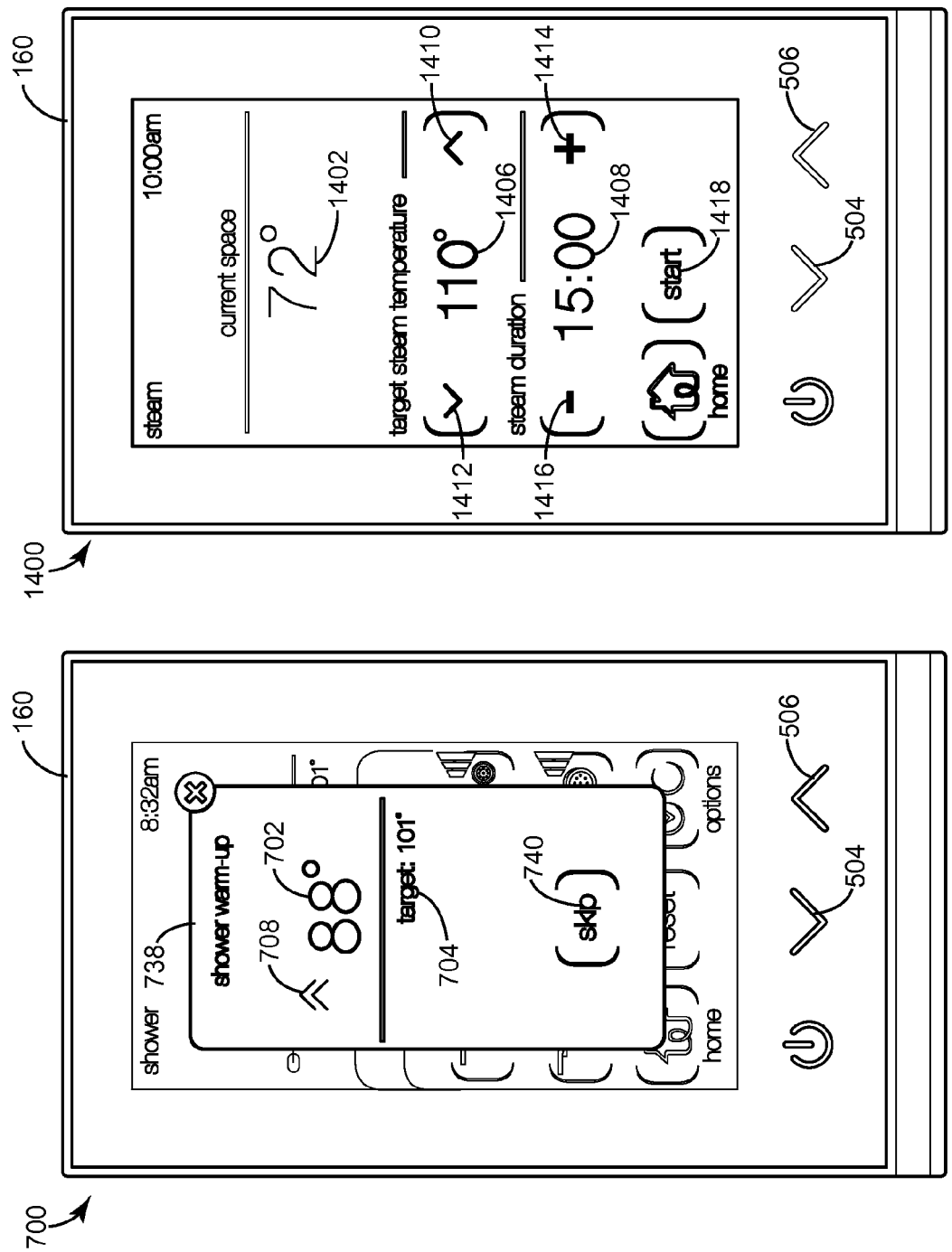

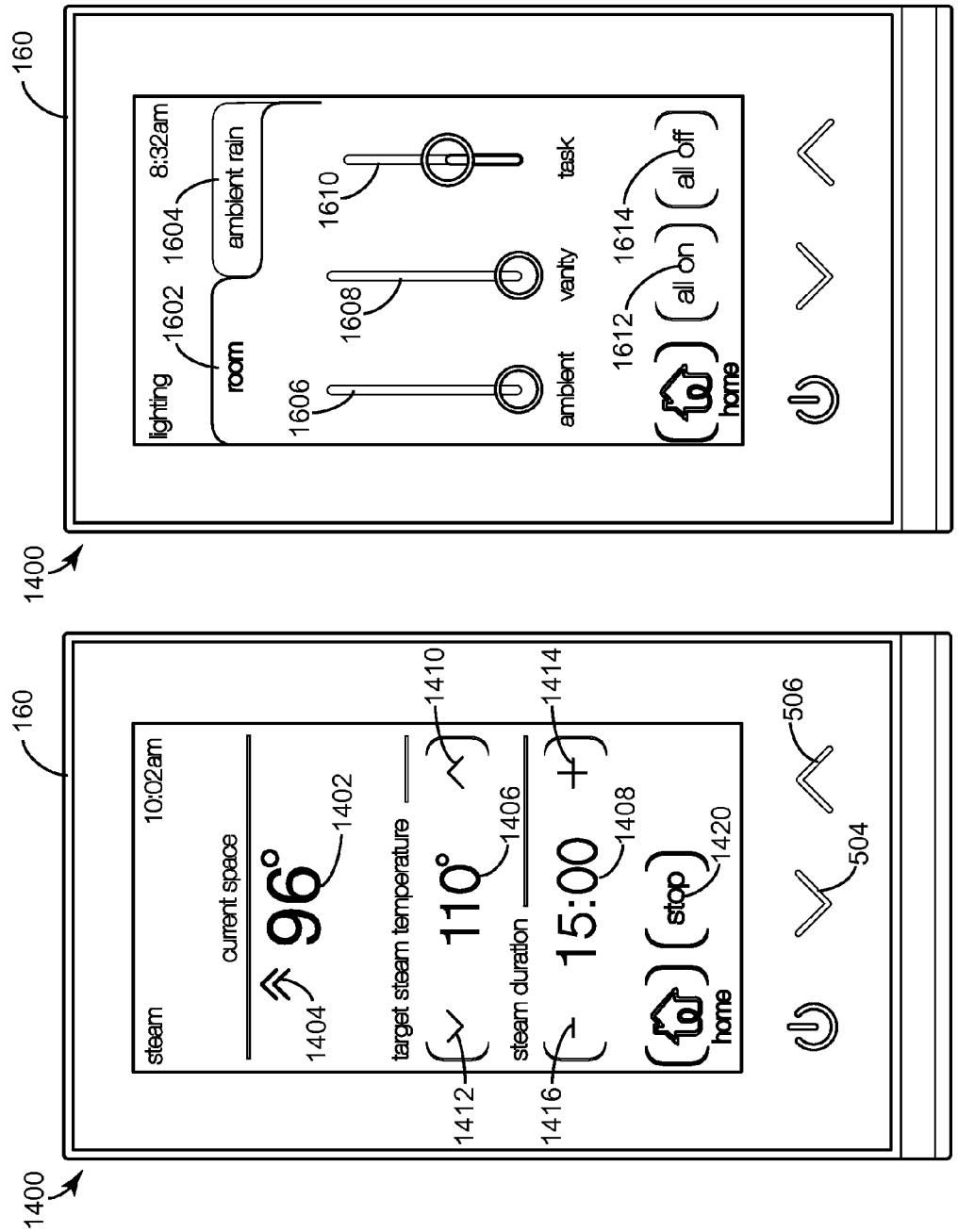

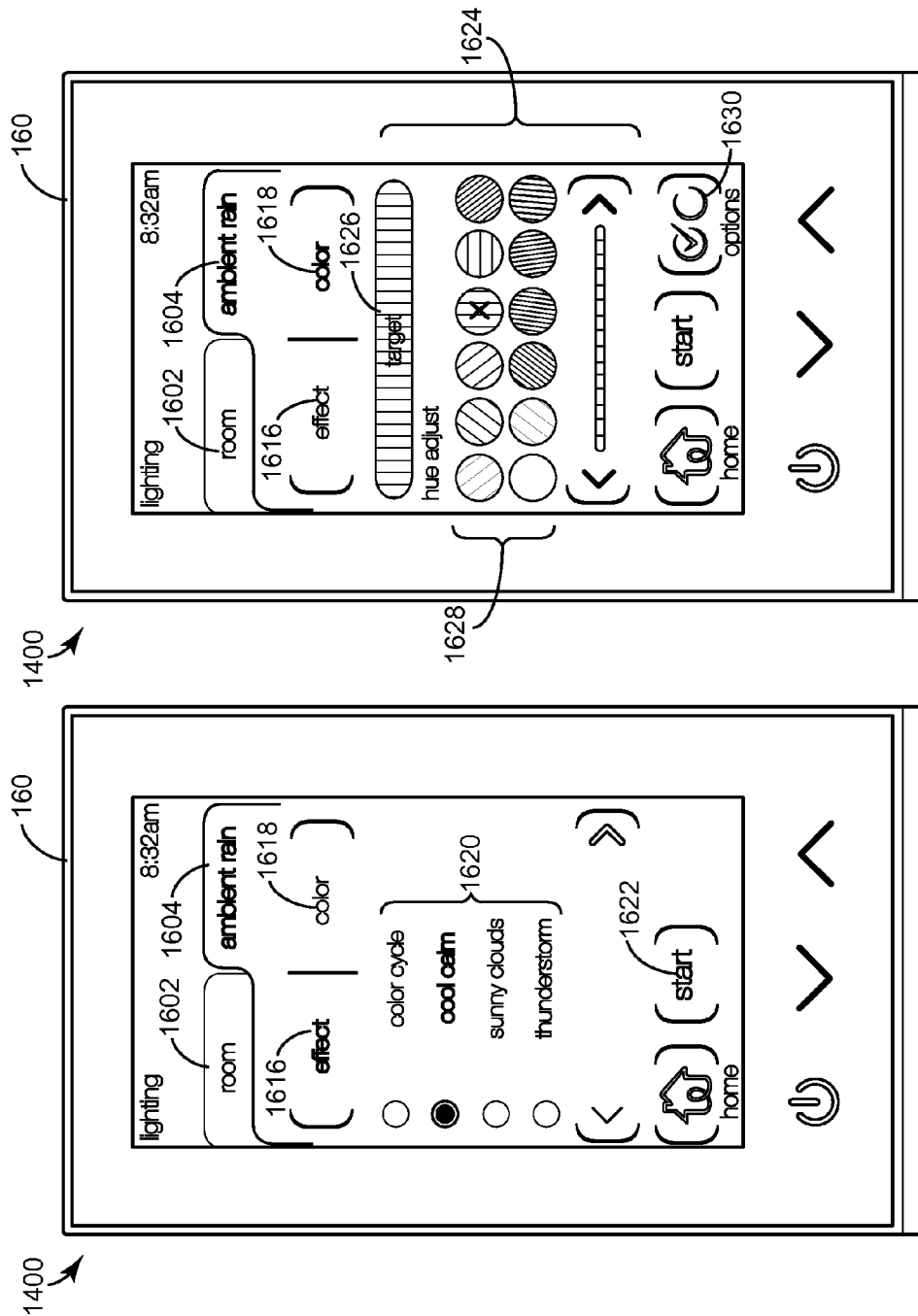

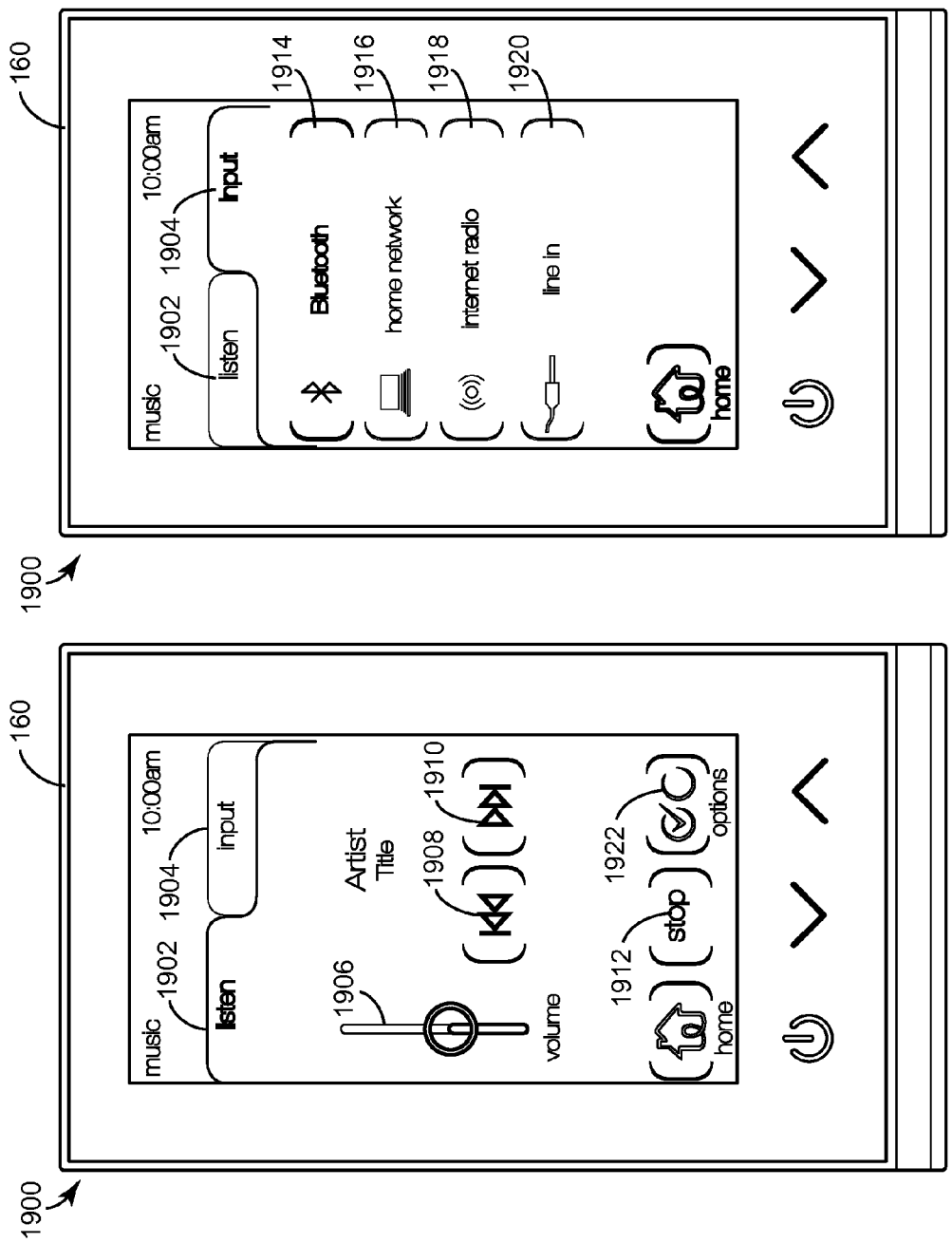

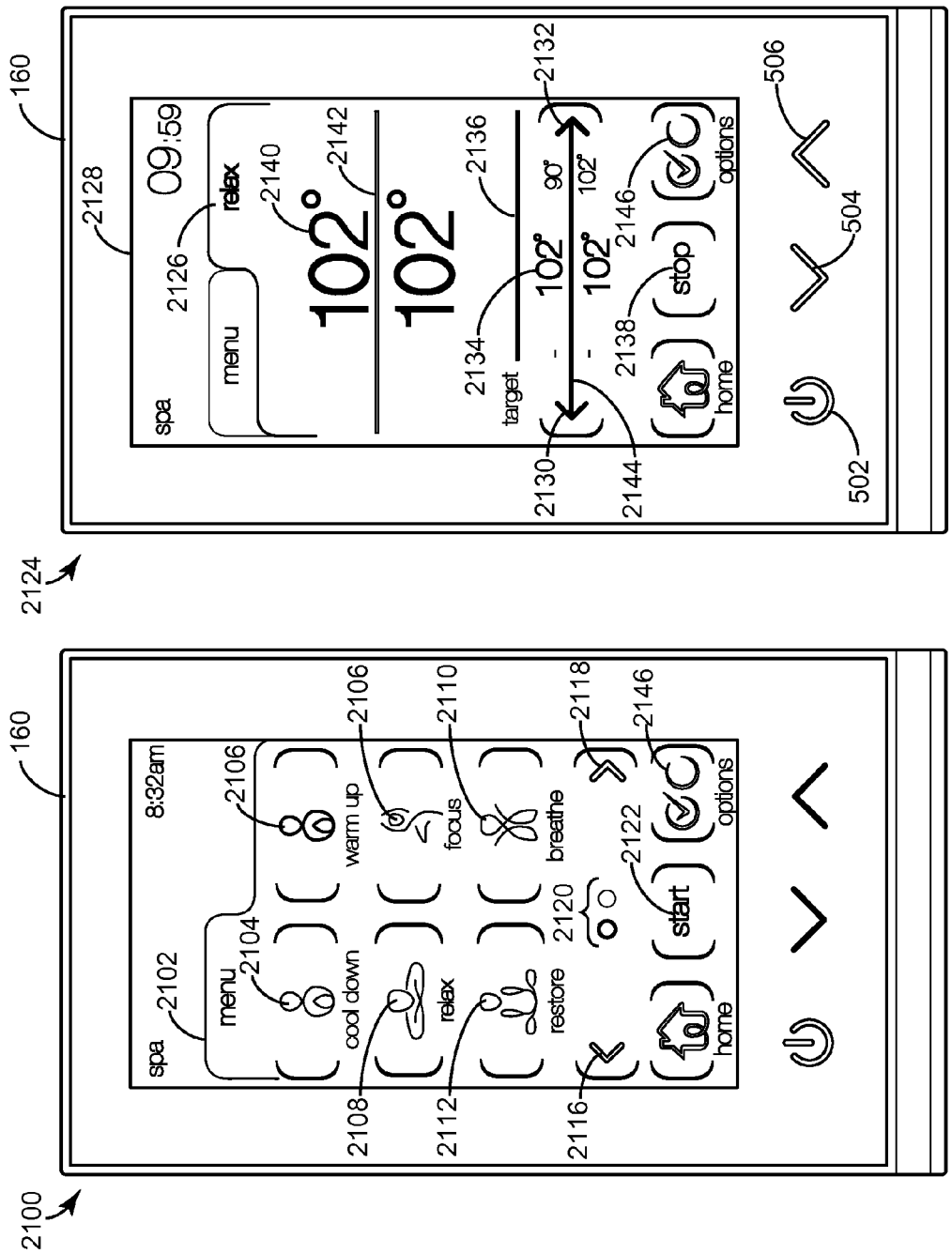

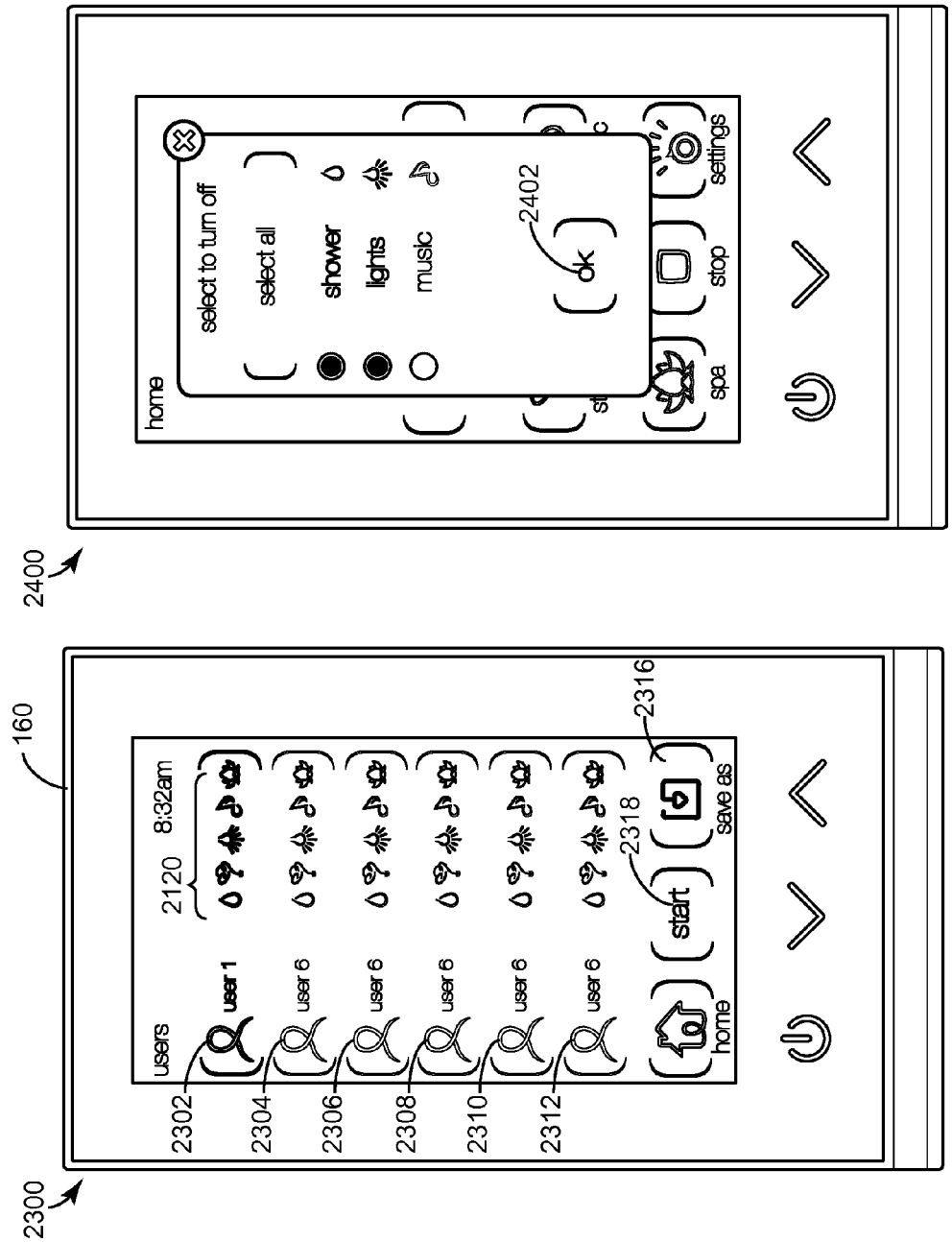

SHOWER CONTROL SYSTEM WITH NETWORK FEATURES

CROSS-REFERENCE TO RELATED PATENT APPLICATIONS

This application is a continuation-in-part of U.S. patent application Ser. No. 13/015,506, filed Jan. 27, 2011, which claims the benefit of and priority to U.S. Provisional Patent Application No. 61/300,087, filed Feb. 1, 2010, the entireties of which are incorporated by reference herein.

BACKGROUND

Showers have conventionally utilized mechanical user interface controls such as handles, knobs, selector switches, and the like. These mechanical user interface controls conventionally have a direct mechanical link to shower valves or other shower components. The mechanical user interface controls conventionally operate independently such that actuation of one control does not affect operation or actuation of another control.

It would be advantageous to provide an improved system for controlling various components of shower systems.

SUMMARY

One implementation of the present disclosure is shower control system. The shower control system includes a water subsystem, a steam subsystem, and a controller in communication with the water subsystem and the steam subsystem. The water subsystem includes one or more electronic valves configured to control a flow rate and a temperature of water dispensed from one or more shower outlets within a shower enclosure. The steam subsystem is configured to generate and dispense steam from one or more steam outlets within the shower enclosure. The controller is configured to control the water subsystem and the steam subsystem to provide a spa experience including a predetermined and coordinated sequence of water outputs from the shower outlets and steam outputs from the steam outlets.

In some embodiments, the shower control system includes an audio subsystem configured to provide audio from one or more speakers within the shower enclosure. The controller may be in communication with the audio subsystem and configured to control the audio subsystem. The spa experience may further include a predetermined sequence of audio outputs from the speakers. The audio outputs may be coordinated with the water outputs and the steam outputs.

In some embodiments, the shower control system includes a lighting subsystem configured to provide lighting from one or more lighting devices within the shower enclosure. The controller may be in communication with the lighting subsystem and configured to control the lighting subsystem. The spa experience may further include a predetermined sequence of lighting outputs from the lighting devices. The lighting outputs may be coordinated with the water outputs and the steam outputs.

In some embodiments, the shower control system includes an aromatherapy subsystem configured to dispense an aromatic substance within the shower enclosure. The controller may be in communication with the aromatherapy subsystem and configured to control the aromatherapy subsystem. The spa experience may further include a predetermined sequence of aromatherapy outputs. The aromatherapy outputs may be coordinated with the water outputs and the steam outputs.

In some embodiments, the spa experience includes multiple stages. Each stage may have a predetermined duration and may include a different combination of the water outputs and the steam outputs. The controller may be configured to perform the multiple stages sequentially.

In some embodiments, performing the multiple stages sequentially includes causing the water subsystem and the steam subsystem to provide a first combination of coordinated water and steam outputs during a first stage of the spa experience, automatically transitioning from the first stage of the spa experience to a second stage of the spa experience, and causing the water subsystem and the steam subsystem to provide a second combination of coordinated water and steam outputs during the second stage of the spa experience. The second combination of coordinated water and steam outputs may be different from the first combination of coordinated water and steam outputs.

In some embodiments, the shower control system includes a control panel in communication with the controller and comprising an electronic display. The controller may cause the control panel to display a graphical user interface for controlling the spa experience.

In some embodiments, the graphical user interface includes a multidimensional temperature profile representing an output provided by a group of the shower outlets during the spa experience. The controller may cause the group of shower outlets to provide a water output defined by the multidimensional temperature profile during the spa experience.

In some embodiments, the multidimensional temperature profile includes a time axis, a temperature axis, and a plurality of points. Each point may have a time attribute and a temperature attribute defining a location of the point in the multidimensional temperature profile.

In some embodiments, the graphical user interface further includes a second multidimensional temperature profile representing an output provided by the steam outlets during the spa experience. The controller may cause the steam outlets to provide a steam output defined by the second multidimensional temperature profile during the spa experience.

In some embodiments, the predetermined sequence of water outputs from the shower outlets is defined by a stored multidimensional temperature profile for the shower outlets. The predetermined sequence of steam outputs from the steam outlets may be defined by a stored multidimensional temperature profile for the steam outlets. The controller may execute both multidimensional temperature profiles concurrently during the spa experience, causing the shower outlets and the steam outlets to provide the coordinated sequence of water outputs and steam outputs.

Another implementation of the present disclosure is another shower control system. The shower control system includes a water subsystem, a steam subsystem, and a controller for the water subsystem and the steam subsystem. The water subsystem includes one or more electronic valves configured to control a flow rate and a temperature of water dispensed from one or more shower outlets within a shower enclosure. The steam subsystem is configured to generate and dispense steam from one or more steam outlets within the shower enclosure. The controller is configured to receive update data from a remote system, use the update data to update configuration settings stored within the controller, and generate control signals for the water subsystem and the steam subsystem using the updated configuration settings.

In some embodiments, the water subsystem is configured to use the control signals to adjust an attribute of the water dispensed from the shower outlets. The steam subsystem may be configured to use the control signals to adjust an attribute of the steam dispensed from the steam outlets.

In some embodiments, the remote system is an Internet file server configured to provide the update data to the controller via the Internet.

In some embodiments, the update data includes at least one of updated firmware for the controller, updated control parameters used by the controller, and updated configuration settings for the controller.

In some embodiments, the shower control system includes a control panel configured to present a user interface for monitoring and controlling the water subsystem and the steam subsystem. The update data may include an updated user interface for the control panel.

In some embodiments, the controller is configured to collect usage information describing control operations performed by the water subsystem and the steam subsystem, store the usage information within a memory of the controller, and report the usage information to the remote system via a communications network.

In some embodiments, the controller is configured to control the water subsystem and the steam subsystem to provide a spa experience including a predetermined and coordinated sequence of water outputs from the shower outlets and steam outputs from the steam outlets.

In some embodiments, the update data includes at least one an update to the spa experience and a new spa experience.

In some embodiments, the shower control system includes at least one of an audio subsystem configured to provide audio from one or more speakers within the shower enclosure, a lighting subsystem configured to provide lighting from one or more lighting devices within the shower enclosure, and an aromatherapy subsystem configured to dispense an aromatic substance within the shower enclosure.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 5 is a drawing of the control panel of FIG. 3 displaying a power off interface, according to an exemplary embodiment.

FIG. 6 is a drawing of the control panel of FIG. 3 displaying a home screen interface, according to an exemplary embodiment.

FIG. 11 is another drawing of the shower control interface of FIG. 9 in which flow volumes associated with each of the shower outlets are represented graphically within the shower control interface, according to an exemplary embodiment.

FIG. 12 is a drawing of the control panel of FIG. 3 displaying a flow control pop-up window for fine-tuning the flow volumes associated with the various shower outlets, according to an exemplary embodiment.

FIG. 13 is a drawing of the control panel of FIG. 3 displaying a shower warm-up pop-up window, which may be displayed while the shower control system is performing a purging operation, according to an exemplary embodiment.

FIG. 14 is a drawing of the control panel of FIG. 3 displaying a steam control interface prior to the shower control system performing a steaming operation, according to an exemplary embodiment.

FIG. 15 is a drawing of the steam control interface of FIG. 14 while the shower control system is performing a steaming operation, according to an exemplary embodiment.

FIG. 16 is a drawing of the control panel of FIG. 3 displaying a lighting control interface in which various sliders representing room lighting fixtures are displayed on a first tab of the lighting control interface, according to an exemplary embodiment.

FIG. 17 is a drawing of the lighting control interface of FIG. 16 in which selectable effects for ambient rain lighting are displayed in a second tab of the lighting control interface, according to an exemplary embodiment.

FIG. 18 is a drawing of the lighting control interface of FIG. 16 in which selectable colors for the ambient rain are displayed in the second tab of the lighting control interface, according to an exemplary embodiment.

FIG. 19 is a drawing of the control panel of FIG. 3 displaying an audio control interface in which various audio control options are displayed in a first tab of the audio control interface, according to an exemplary embodiment.

FIG. 20 is a drawing of the audio control interface of FIG. 19 in which various selectable audio input sources are displayed in a second tab of the audio control interface, according to an exemplary embodiment.

FIG. 21 is a drawing of the control panel of FIG. 3 displaying a spa control interface in which various selectable spa experiences are presented in a first tab of the spa control interface, according to an exemplary embodiment.

FIG. 22 is a drawing of the spa control interface of FIG. 21 in which a selected spa experience and various control options associated therewith are displayed in a second tab of the spa control interface, according to an exemplary embodiment.

FIG. 23 is a drawing of the control panel of FIG. 3 displaying a user preferences interface, which may be used to store configuration settings to a user profile and retrieve stored configuration settings from a user profile, according to an exemplary embodiment.

FIG. 24 is a drawing of the control panel of FIG. 3 displaying a feature deactivation interface, which may be used to deactivate various features of the shower control system, according to an exemplary embodiment.

DETAILED DESCRIPTION

Figure 1:
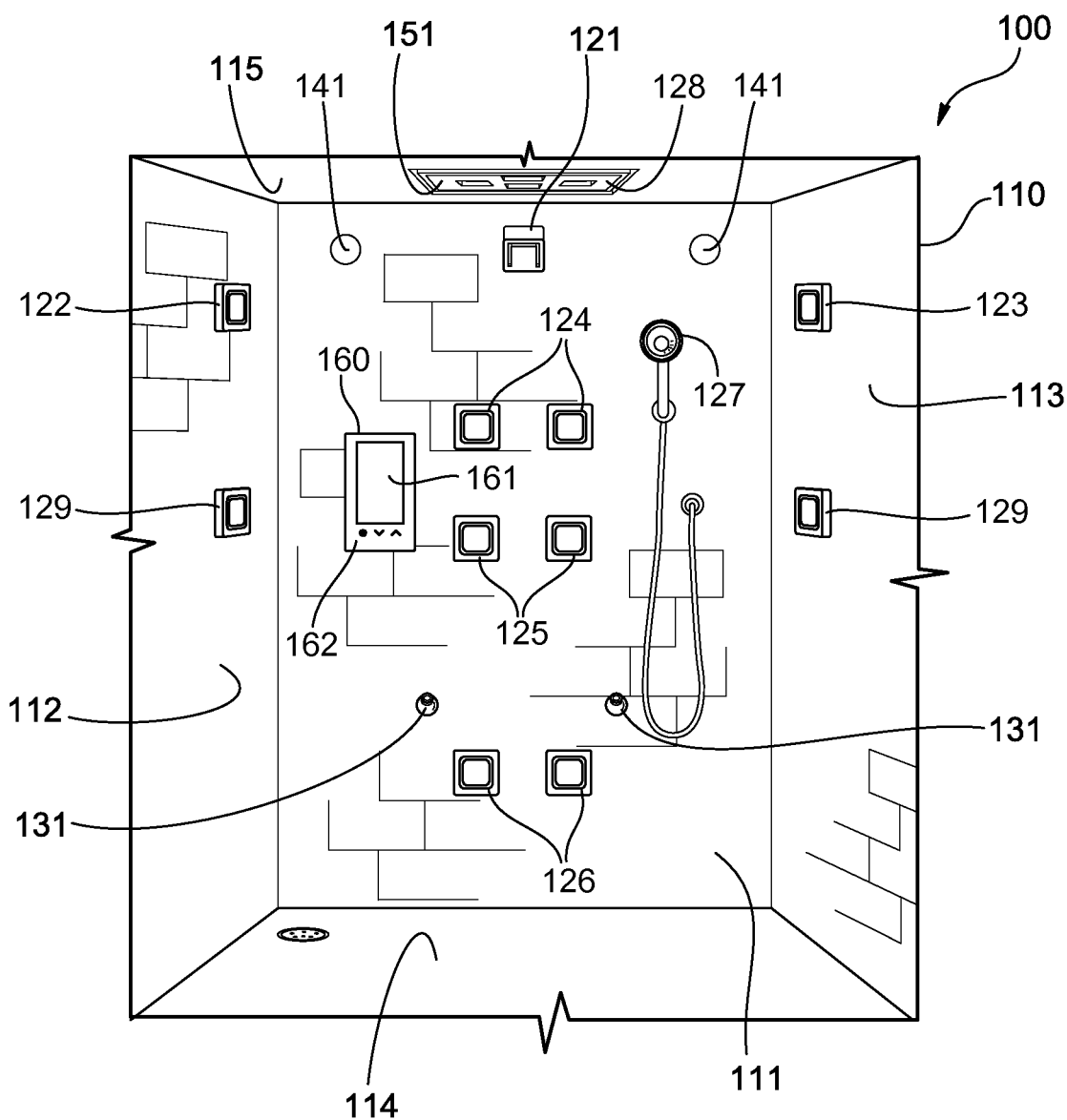
FIG. 1 is a drawing of a shower including a variety of output devices (e.g., shower outlets, speakers, lighting devices, and steam/aromatherapy outlets) and a control panel positioned within a shower enclosure to facilitate user control over the various output devices, according to an exemplary embodiment.

Referring generally to the FIGURES, a shower and a shower control system are shown, according to an exemplary embodiment. The shower includes a shower enclosure and several shower subsystems (i.e., a water subsystem, an audio subsystem, a steam subsystem, a lighting subsystem, an aromatherapy subsystem, etc.). Each of the shower subsystems has output devices (e.g., shower outlets, flow control valves, temperature control valves, solenoids associated with the valves, lighting devices, audio output systems, steam outlets, aromatherapy outlets, etc.) configured to provide a user of the shower with an enhanced showering experience.

The shower control system includes a control panel having an electronic display. The electronic display is configured to display graphical user interfaces for allowing user control of the various shower subsystems and/or shower output devices. A controller is in communication with the electronic display and causes the graphical user interfaces to be presented via the electronic display. In various embodiments, the controller may be integrated with the control panel, physically separate from the control panel, or partially integrated and partially separate from the control panel. The control panel may include a touch-sensitive panel overlaying the electronic display (e.g., a capacitive touch screen), manually-operable buttons (e.g., capacitive touch buttons), and/or other user input devices configured to receive user input and provide the user input to the controller. The control panel (e.g., via the controller) controls the various components of the shower in response to the user inputs (e.g., signals or data representing the user inputs) received at the user input devices.

A shower control system is provided for receiving and processing user inputs, displaying a graphical user interface on the electronic display, and controlling outputs of the various output devices. The shower control system advantageously includes software that causes the generation and display of intuitive graphical user interfaces for providing an intuitive and powerful control experience to the user. Settings and combinations of settings may be saved in the shower control system (e.g., a controller of the system) for later playback (e.g., execution) by a controller of the shower control system. Such playback or execution causes actuation, adjustment, or another state change of one or a plurality of the shower output devices.

In some embodiments, the shower control system is connected to a communications network (e.g., a LAN, WAN, the Internet, etc.). The network connection may allow a user to view and modify various configuration settings stored within a controller for the shower control system and to receive information from the controller (e.g., usage information, log data, etc.). In some embodiments, communications via the network are used to actively control the outputs from various devices (e.g., starting and stopping water flow, adjusting setpoints, turning on/off lighting, steam, audio, aromatherapy, etc.).

In some embodiments, the shower control system is configured to receive updates via the communications network. For example, the controller may be configured to receive firmware updates, software updates, configuration updates, or other updates from a remote server (e.g., from the system manufacturer) or other network data source (e.g., a networked user device). In various embodiments, the controller may be configured to check for and download updates periodically or may receive pushed updates from a remote data source when the updates become available. Advantageously, updating the controller via the network allows for new and improved spa experiences, user interfaces, and/or other features to be provided to multiple controllers in an automated manner. The controller can then install the updates to make the new and improved features available to a user. These and other features of the shower control system are described in greater detail below.

1. Shower and Control System

Referring now to FIG. 1, a shower 100 is shown, according to an exemplary embodiment. Shower 100 includes a shower enclosure 110 having a front wall 111, left wall 112, right wall 113, floor 114, and ceiling 115. An access door may permit entry by the user into shower enclosure 110. The control systems and methods of the present disclosure may be used in combination with shower 100 or any other shower having any shape or size of shower enclosure. For example, alternative shower enclosures may contain fewer or additional walls, be of varying sizes, contain other water outlets or lighting arrangements, or be otherwise configured.

Shower 100 includes a water subsystem having various water delivery devices (i.e., shower outlets) located within shower enclosure 110. For example, shower 100 is shown to include a front showerhead 121, a left showerhead 122, a right showerhead 123, an upper body spray 124, a middle body spray 125, a lower body spray 126, side body sprays 129, a handshower 127, and a rainhead 128. In various embodiments, the water subsystem or set of water delivery devices may include any number or combinations of water delivery devices. For example, in an alternative exemplary embodiment, the water subsystem may include a central body spray (e.g., a vertical column of shower outlets) in place of upper body spray 124 and middle body spray 125. In another exemplary embodiment, left showerhead 122 and right showerhead 123 may be located on front wall 111. Shower outlets 121-129 may be located on any of surfaces 111-114 and may include additional or fewer shower outlets in various embodiments.

The water subsystem may include one or more analog or digital valves. Each of the valves may be associated with one or more of shower outlets 121-129 and may be configured to control the water temperature and/or flow rate of the water delivered by the associated shower outlet(s). Valves of the system may be configured to allow for an electronically controlled mixing of hot and cold water. Such mixing can allow control systems and methods described herein to achieve or approach certain target temperatures (i.e., temperature control). Valves of the system may also be configured to allow for electronically controlled or selected shower outlet water flow (i.e., flow rate control). The electronically controlled valves (e.g., solenoids for actuating the hydraulic valves) are controlled via control signals from one or more controllers of the shower control systems described throughout this disclosure.

In some embodiments, each of shower outlets 121-129 is associated with a different mixing valve configured to control the water temperature and/or flow rate of the water dispensed from the corresponding shower outlet. For example, a mixing valve may be installed upstream of each of shower outlets 121-129, combined with each of shower outlets 121-129, or otherwise fluidly connected with each of shower outlets 121-129. Each of the mixing valves may be independently controlled by a controller to allow for independent control of the temperatures and/or flow rates of the water dispensed from shower outlets 121-129. In other embodiments, a single mixing valve is used to control the temperature and/or flow rate of water provided to groups of shower outlets 121-129 or all of shower outlets 121-129.

In some embodiments, each of the valves is associated with a subset of shower outlets 121-129. For example, each mixing valve may have a plurality of outlet ports (e.g., three outlet ports, six outlet ports, etc.), each of which is fluidly connected to one or more of shower outlets 121-129. In other instances, one or more mixing valves may output water to a pipeline that includes several branches, each of which is fluidly connected to one or more of shower outlets 121-129. A first mixing valve may control the temperature and/or flow rate of water provided to a first subset of shower outlets 121-129, whereas a second mixing valve may control the temperature and/or flow rate of water provided to a second subset of shower outlets 121-129. For example, a first mixing valve may control the temperature and/or flow rate of water provided to shower outlets 121, 125, and 128, whereas a second mixing valve may control the temperature and/or flow rate of water provided to shower outlets 122, 123, 124, 126, and 127. Advantageously, using multiple different mixing valves allows the water from different shower outlets to have different temperatures and/or flow rates. In various embodiments, any number of mixing valves may be used to define any number of temperature zones.

The water subsystem may be controlled via control signals from one or more controllers of the shower control systems described throughout this disclosure. For example, a controller may be configured to automatically operate the mixing valves to adjust the temperatures and/or flow rates of water provided to various sets of shower outlets 121-129. The water subsystem may be automatically operated by the controller as part of a stored spa experience that dispenses water from shower outlets 121-129 according to a predefined pattern of water temperatures and/or flow rates defined by the spa experience. Spa experiences are described in greater detail with reference to FIGS. 21-22.

In some embodiments, shower 100 includes a steam subsystem. The steam subsystem may include steam outlets 131 that receive steam from a steam generator in fluid communication with steam outlets 131. The steam generator may be disposed between, and coupled via conduit (e.g., piping or tubing), to steam outlets 131 and a water supply. The steam generator heats the water, turning it into steam that is then communicated into shower enclosure 110 through steam outlets 131. The steam subsystem may be controlled via control signals from one or more controllers of the shower control systems described throughout this disclosure and may be used to incorporate steam into the spa experiences.

In some embodiments, shower 100 includes an aromatherapy subsystem. The aromatherapy subsystem may be configured to dispense various aromas or scents (e.g., fragrant oils, essential oils, aromatic compounds, etc.) into shower enclosure 110. The aromatherapy subsystem may include an aerial diffuser, heater, vaporizer, or other device configured to vaporize a stored aromatic substance and emit the aromatic vapor into shower enclosure 110. In some embodiments, the aromatic vapor is combined with the steam emitted via steam outlets 131. In other embodiments, the aromatic vapor is emitted via separate aromatherapy outlets 181 (shown in FIG. 2), which may be located within shower enclosure 110 (e.g., anywhere along any of walls 111-115). The aromatherapy subsystem may be configured to selectively vaporize and dispense any of a plurality of stored aromatic substances in response to a control signal from a user control panel and/or a controller. The aromatherapy subsystem may be controlled via control signals from one or more controllers of the shower control systems described throughout this disclosure and may be used to incorporate aromatherapy into the spa experiences.

In some embodiments, shower 100 includes an audio subsystem. The audio subsystem includes speakers 141, an amplifier, and a media player. The amplifier, media player, and other components may be located proximate to or remote from shower enclosure 110. The audio subsystem is configured to communicate sound into shower enclosure 110. The audio subsystem (e.g., a media player thereof) may be controlled via control signals from one or more controllers of the shower control systems described throughout this disclosure and may be used to incorporate music or other audio effects into the spa experiences.

In some embodiments, shower 100 includes a lighting subsystem. The lighting subsystem includes one or more lights 151, such as conventional light bulbs (e.g., incandescent, LED, fluorescent) or a plurality of colored lights configured for use as a lighted rain panel used for chromatherapy. In some embodiments, lights 151 are integrated with rainhead 128. The lighting subsystem is configured to selectively supply light into shower enclosure 110. The lighting subsystem (e.g., particular switches for the lights, dimmers for the lights, etc.) may be controlled via control signals from one or more controllers of the shower control systems described throughout this disclosure and may be used to incorporate chromatherapy or other lighting effects into the spa experiences.

Shower 100 is shown having a plurality of water outlets 121-129, steam outlets 131, speakers 141, lights 151, and aromatherapy outlets 181. Throughout this disclosure, these components may be referred to collectively as shower outlets, shower devices, shower components, shower output devices, or the like. It should be understood that these terms are not limited to water dispensing outlets and may include other types of outlets or devices configured to generate and/or output various substances or forms of energy into shower enclosure 110 (e.g., water, steam, light, sound, vibrations, aromatic substances, etc.). Additionally, it is contemplated that shower 100 may include any combination or subset of the shower subsystems and/or shower output devices described with reference to FIG. 1. For example, in some embodiments, shower 100 may include only a subset of shower outlets 121-129. As another example, in some embodiments, shower 100 may include the water subsystem and one or more of the steam subsystem, the audio subsystem, the aromatherapy subsystem, and the lighting subsystem. All such variants are within the teachings of the present disclosure.

Still referring to FIG. 1, shower 100 is shown to include a control panel 160. In some embodiments, a control panel 160 is configured to receive user inputs for controlling the shower subsystems and for communicating settings and status information of the shower subsystems to a user. Control panel 160 generally includes a housing and an electronic display 161 (e.g., a LCD panel). The housing includes various attachment points (e.g., brackets, fasteners, portions for receiving screw heads, etc.) for mounting control panel 160 within shower enclosure 110. The housing also provides a waterproof casing to protect electronic display 161 and associated internal electronic components from moisture. A touch-sensitive panel (e.g., a capacitive touch panel) may also be provided on the housing for receiving user inputs. A portion of the touch-sensitive panel may overlay electronic display 161 to provide a touchscreen interface. Electronic display 161 can be caused to display graphical user interfaces and to receive user inputs via the touch screen interface.

In some embodiments, another portion of the touch-sensitive panel (or a different touch-sensitive panel) overlays one or more illuminated buttons 162 that are not part of electronic display 161. Buttons 162 may be backlit (e.g., by a LED) using a separate lighting source. Buttons 162 may be touch sensitive (e.g., capacitive touch) or a group of hard keys (e.g., physical buttons). Buttons 162 may be static buttons which are selectively illuminated by activating or deactivating the backlighting for each button. In some embodiments, the same touch-sensitive panel overlays both electronic display 161 and buttons 162. Control panel 160 is described in greater detail with reference to FIGS. 3-4.

Figure 2:
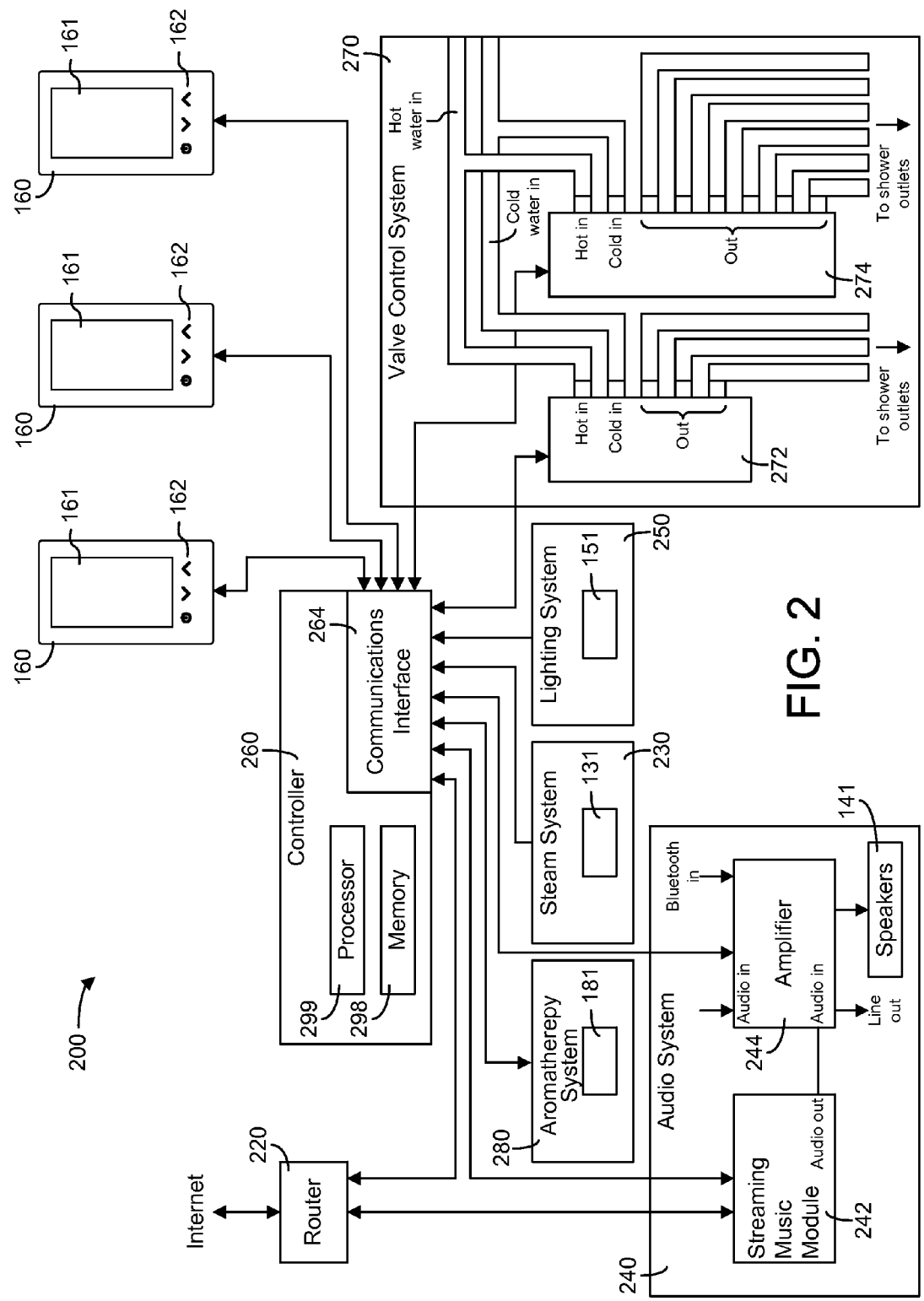
FIG. 2 is a block diagram of a shower control system including a controller in communication with a control panel, an audio system, a steam system, a lighting system, and a valve control system, which may be used to monitor and control the various components of the shower of FIG. 1, according to an exemplary embodiment.

Referring now to FIG. 2, a block diagram of a shower control system 200 is shown, according to an exemplary embodiment. Shower control system 200 generally refers to the electronics involved in processing and communicating signals for controlling shower subsystems 230-280 according to user inputs, but may also refer to any of the controlled shower subsystems 230-280 or shower output devices themselves. Shower control system 200 receives indications to change conditions of the various output devices (e.g., from the user input devices) and acts upon the indications by sending signals to control panels 160, shower subsystems 230-280, and/or devices/controllers thereof.

Shower control system 200 is shown to include a controller 260 in communication with one or more control panels 160. Each of control panels 160 may be disposed at a different location (e.g., in shower 100, outside shower 100, etc.) for facilitating user interaction with shower control system 200 at multiple different locations. In various embodiments, controller 260 may be integrated with one or more of control panels 160 or separate from control panels 160. Controller 260 may receive input from control panels 160 (e.g., via communications interface 264) and may control the user interface outputs provided via electronic display 161. Controller 260 processes user inputs received at control panels 160 (e.g., user inputs received via a touchscreen, buttons, switches, or other user input devices of control panel 160) and provides control outputs to shower subsystems 230-280 based on the user inputs.

Controller 260 may communicate with shower subsystems 230-280 and/or the devices thereof (e.g., shower outlets, speakers, lights, valves, etc.) for controlling the various output devices. For example, controller 260 may receive an indication to adjust the temperature of the water provided by one or more of shower outlets 121-129 (e.g., based on user input received at a touch panel interface), and act upon the indication by causing water with increased temperature to flow through the shower outlet (e.g., by sending an appropriate control signal to the appropriate mixing valve subsystem). Controller 260 may cause electronic display 161 to indicate a target water temperature, an actual water temperature, and indication of whether the actual water temperature is rising or falling. Controller 260 may cause electronic display 161 to indicate the requested and completed adjustment in temperature.

In some embodiments, controller 260 is configured to receive signals from control panels 160, steam system 230, audio system 240, lighting system 250, valve control system 270 (e.g., electronic valves 272-274), aromatherapy system 280, and/or other subsystems or devices of shower control system 200 or external devices (e.g., router 220). Controller 260 processes and acts upon the received signals. Controller 260 may act upon signals received by sending control signals to steam system 230, audio system 240, lighting system 250, and aromatherapy system 280. Controller 260 may also act upon signals received by sending control signals to valve control system 270 (e.g., electronic valves 272-274) or other shower subsystem components.

Controller 260 is shown to include a communications interface 264, a processor 299, and memory 298. Communications interface 264 may include wired or wireless interfaces (e.g., jacks, antennas, transmitters, receivers, transceivers, wire terminals, etc.) for conducting data communications with various systems, devices, or networks. For example, communications interface 264 can include an Ethernet card and port for sending and receiving data via an Ethernet-based communications network and/or a WiFi transceiver for communicating via a wireless communications network. Communications interface 264 may be configured to communicate via local area networks (e.g., a home network, a LAN, etc.) or wide area networks (e.g., the Internet, a WAN, etc.).

Processor 299 may be a general purpose or specific purpose processor, an application specific integrated circuit (ASIC), one or more programmable logic controllers (PLCs), one or more field programmable gate arrays (FPGAs), a group of processing components, or other suitable processing components. Processor 299 is configured to execute computer code or instructions stored in memory 298 or received from other computer readable media (e.g., embedded flash memory, local hard disk storage, local ROM, network storage, a remote server, etc.).

Memory 298 may include one or more devices (e.g., memory units, memory devices, storage devices, etc.) for storing data and/or computer code for completing and/or facilitating the various processes described in the present disclosure. Memory 298 may include random access memory (RAM), read-only memory (ROM), hard drive storage, temporary storage, non-volatile memory, flash memory, optical memory, or any other suitable memory for storing software objects and/or computer instructions. Memory 298 may include database components, object code components, script components, or any other type of information structure for supporting the various activities and information structures described in the present disclosure. Memory 298 may be communicably connected to processor 299 via a processing circuit and may include computer code for executing (e.g., by processor 299) one or more processes described herein. For example, memory 298 may include graphics, web pages, HTML files, XML files, script code, shower configuration files, or other resources for use in generating graphical user interfaces for display and/or for use in interpreting user interface inputs to make command, control, or communication decisions.

In some embodiments, controller 260 includes a valve controller, a steam controller, an aromatherapy controller, a lighting controller, an audio controller, a user interface controller, and/or other controllers configured to facilitate user control of shower subsystems 230-270 and the various components thereof. Such controllers may be implemented as separate hardware components or as control modules within memory 298. Controller 260 is described in greater detail with reference to FIG. 40.

Still referring to FIG. 2, shower control system 200 is shown to include a valve control system 270. According to an exemplary embodiment, one or more digital valves 272-274 are configured to selectively mix hot and cold water and selectively control water output to shower outlets 121-129. Each digital valve 272-274 may be arranged between shower outlets 121-129 and hot and cold water supplies. In an exemplary embodiment, valves 272-274 include a thermostatic mixing component (e.g., for controlling temperature) and/or one or more electrically-actuated solenoids (e.g., for controlling flow volume). In some embodiments, valve control system 270 includes one or more sensors for measuring temperature, valve position, and/or water pressure upstream or downstream of valves 272-274. The sensors may send signals with condition information to controller 260, which then processes the signals, and acts upon them.

Valves 272-274 may be electrically operated. In some embodiments, controller 260 controls operation of valves 272-274. Controller 260 may operate each of valves 272-274 independently to achieve multiple different water temperatures simultaneously. For example, controller 260 may cause valve 272 to output water having a first temperature and may cause valve 274 to output water having a second temperature, different from the first temperature. In some embodiments, valves 272-274 are the same or similar to the mixing valves described in U.S. patent application Ser. No. 14/693,447, filed Apr. 22, 2015, the entire disclosure of which is incorporated by reference herein.

In some embodiments, the hot and cold water inlets of valves 272-274 are coupled via a conduit (e.g., piping or tubing) to hot and cold water supplies, respectively. Valves 272-274 may be actuated by controller 260 and/or a separate valve driver circuit. Valves 272-274 may be configured to control an amount of hot and cold water allowed to pass through valves 272-274 to achieve a specified water temperature. Each of valves 272-274 may be independently connected to the hot and cold water supplies and may be operated independently to control the temperature of the water provided to a subset of shower outlets 121-129.

In some embodiments, each of valves 272-274 is connected (e.g., via piping or tubing) to one or more of shower outlets 121-129. Valves 272-274 may be actuated by controller 260 and/or a separate valve driver circuit to selectively open and close to control an amount of water (e.g., a flow rate) provided to each of shower outlets 121-129. Valve 272 is shown to include three outlet ports and valve 274 is shown to include six outlet ports. Each of the outlet ports may be opened and closed independently (e.g., via a solenoid or outlet valve) to independently control the flow rate of water provided to various groups of shower outlets 121-129. Such a configuration is described in greater detail with reference to FIG. 39.

In some embodiments, valves 272-274 do not include outlet valves. Instead, outlet valves may be disposed between valves 272-274 and shower outlets 121-129, may be attached directly to shower outlets 121-129, or may be integral with shower outlets 121-129. According to another exemplary embodiment, valves 272-274 are attached directly to or are integral with shower outlets 121-129, eliminating the need for outlet valves. Such a configuration is described in greater detail with reference to FIG. 38.

Still referring to FIG. 2, shower control system 200 is shown to include a steam system 230, an audio system 240, a lighting system 250, and an aromatherapy system 280. In some embodiments, the control electronics (e.g., controller, microprocessor, data interface) for one or more of subsystems 230-250 and 280 may be integral with each other and/or combined with controller 260. For example, controller 260 may include the control electronics for lighting system 250, audio system 240, and/or other subsystems of shower control system 200, thus obviating the need for separate system control electronics. In other embodiments, each subsystem may include a controller and data interface that is configured for receiving signals, processing those signals, and acting upon received signals. Steam system 230, audio system 240, lighting system 250, and/or aromatherapy system 280 may include sensors for detecting conditions of the respective systems, such as temperature, humidity, volume, and luminosity.

Controller 260 may be configured to coordinate the operation of subsystems 230-250 and 270-280 to provide various spa experiences that include coordinated patterns of outputs from any or all of these subsystems. For example, controller 260 may coordinate the operation of subsystems 230-250 and 270-280 to provide a spa experience that includes a coordinated pattern of water from shower outlets 121-129, steam from steam outlets 131, audio from speakers 141, lighting from lighting elements 151, and/or aromatherapy from aromatherapy outlets 181. The coordinated pattern of outputs may be defined by a predetermined or stored spa experience that can be selected by a user (e.g., via control panel 160) and actuated by controller 260.

2. Shower Control Panel

Figure 3:
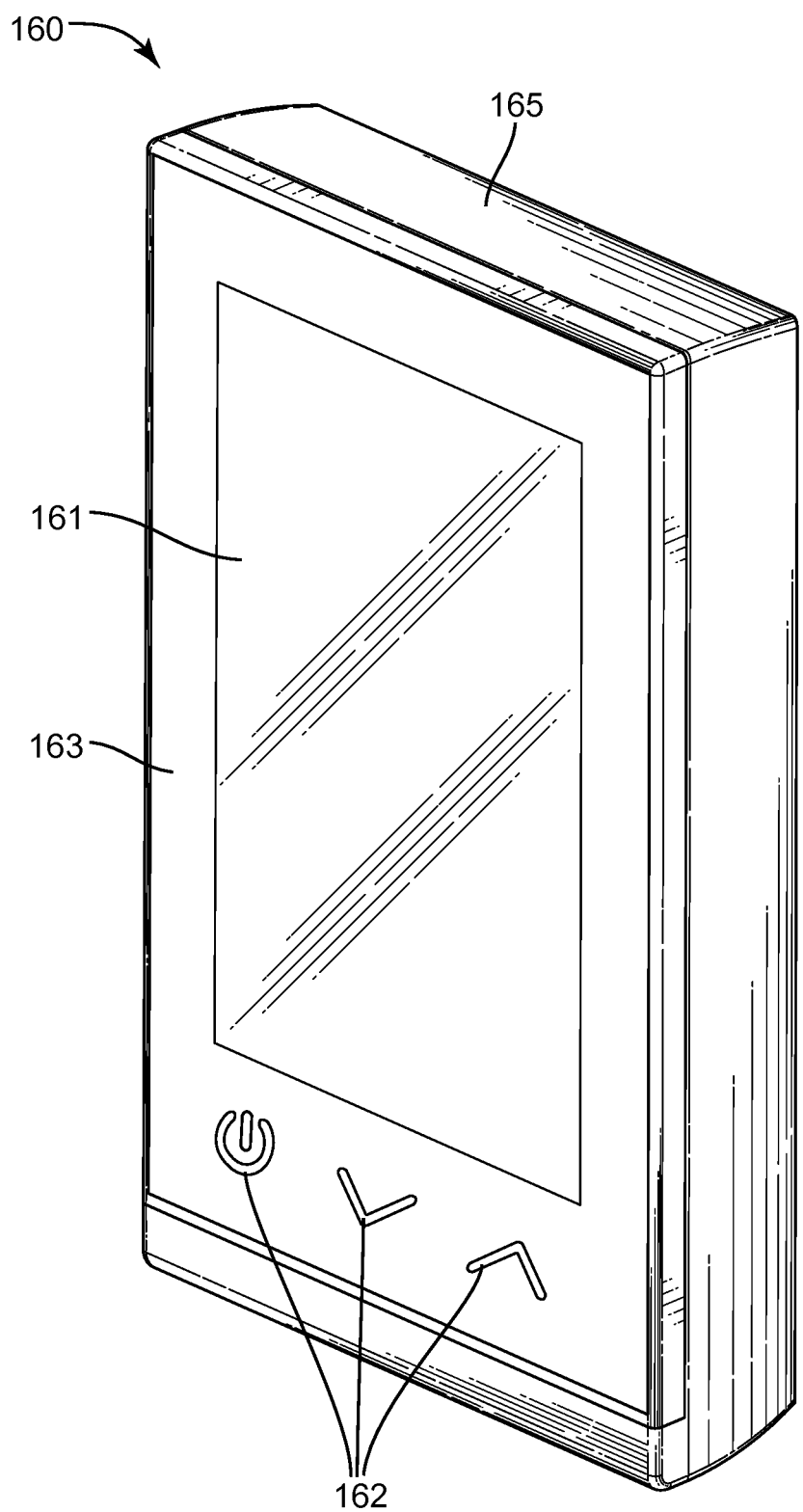
FIG. 3 is a drawing illustrating the control panel of FIGS. 1-2 in greater detail, according to an exemplary embodiment.
Figure 4:
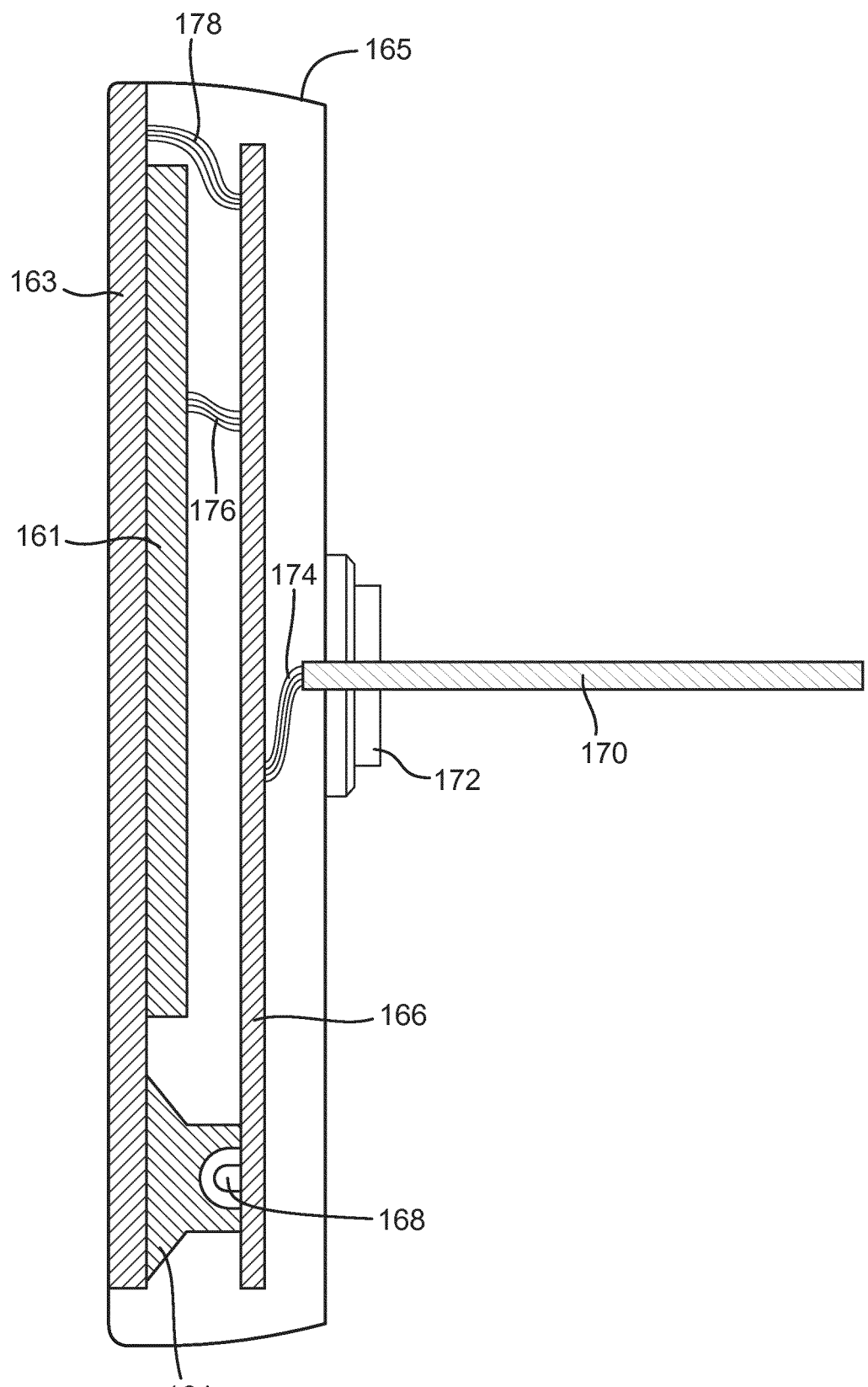
FIG. 4 is a cross-sectional elevation view of the control panel of FIG. 3, according to an exemplary embodiment.

Referring now to FIGS. 3-4, control panel 160 is shown in greater detail, according to an exemplary embodiment. Control panel 160 may be configured to display a graphical user interface via electronic display 161 and to receive user input via a touch-sensitive panel 163 and/or buttons 162. Control panel 160 may include a communications interface (e.g., a wired or wireless interface) for communicating with controller 260 and/or other systems or devices. Control panel 160 may facilitate user interaction with shower control system 200 by receiving and communicating user inputs to controller 260 and displaying information to a user. In various embodiments, controller 260 may be a component of control panel 160 or may be implemented as a separate component.

Control panel 160 is shown to include an electronic display 161. In some embodiments, electronic display 161 is a liquid crystal display (LCD) measuring approximately 7" diagonally. According to other exemplary embodiments, electronic display 161 may use other display technologies particularly suited or adapted for use in a wet environment and may be smaller or larger than 7" (e.g., 5" and smaller, 9" and larger, between 5" and 9", etc.). Display 161 may be positioned behind a touch-sensitive panel 163 and configured to operate as a touchscreen display. For example, electronic display 161 may graphically display information and soft keys (i.e., graphics or icons) configured to be selected by a user or otherwise receive user input. The soft keys may depict, for example, a virtual button, slider, dial, switch, keypad, or other graphic or icon. Control panel 160 may be configured to receive user inputs (e.g., when the user touches or presses one of the soft keys) or performs a gesture relative to touch-sensitive panel 163 (e.g., a swiping motion). In some embodiments, touch-sensitive panel 163 employs resistive touch or capacitive touch-sensitive technology (e.g., capacitive glass). In other embodiments, touch-sensitive panel 163 may use other touch-sensitive technologies as may be applied in wet environments, or may use touch-sensitive technology in combination with hard keys (i.e., physical buttons) located elsewhere on control panel 160.

Control panel 160 is shown to include buttons 162. Buttons 162 may be static buttons which are not part of electronic display 161. Buttons 162 may be represented by fixed-position apertures in an opaque frame around electronic display 161. In some embodiments, buttons 162 are backlit by LEDs 168 or another lighting source positioned within control panel 160. Buttons 162 may be touch-sensitive (e.g., capacitive touch) or a group of hard keys (e.g., physical buttons). In some embodiments, touch-sensitive panel 163 overlays both electronic display 161 and buttons 162. A user interaction with buttons 162 may be detected in the same way that a user interaction is detected with a soft key or other dynamic user interface element of electronic display 161. In some embodiments, control panel 160 can include various other buttons, switches, or other user input devices for receiving user inputs. Such buttons, switches or other user interface devices may be momentary contact switches disposed on a control panel housing 165.

Referring now to FIG. 4, control panel 160 is shown to include a control panel housing 165 enclosing touch-sensitive panel 163, electronic display 161, and a circuit board 166. In some embodiments, control panel 160 includes a backlight for electronic display 161. Circuit board 166 may include a processor, memory, and/or various circuit components configured to receive input from touch-sensitive panel 163 (via wires 178) and to provide an output signal to electronic display 161 (via wires 176). Control panel 160 may communicate with external systems or devices via wires 174, which connect to circuit board 166 and pass through a rear surface of housing 165. A seal 170 (e.g., a silicon seal) may surround wires 174 to prevent water from entering housing 165. In some embodiments, one or more sealing strips or sealing layers are provided between various components of control panel 160 to facilitate the water-proof enclosure provided by housing 165. The front surface of control panel 160 may be seamless and impervious to water.

In some embodiments, control panel 160 includes a LED backlight 168 for buttons 162. In some embodiments, a separate LED backlight 168 is provided for each of buttons 162. Light emitted from each LED backlight 168 may be channeled to the front surface of control panel 160 by a light guide 164 (e.g., a light pipe). Advantageously, light guide 164 increase the amount of light visible through buttons 162, thereby providing a high contrast between buttons 162 and the front surface of control panel 160. LED backlights 168 may be separate from any backlight used to provide backlighting for electronic display 161.

As shown in FIG. 4, touch-sensitive panel 163 overlays both electronic display 161 and the light guides 164 that provide lighting for buttons 162. In this configuration, electronic display 161 provides a dynamic display behind a first portion of touch-sensitive panel 163, whereas buttons 162 and light guides 164 provide a static display behind a second portion of touch-sensitive panel 163. Since LED backlights 168 are separate from the backlight for electronic display 161, buttons 162 can illuminate brightly even when electronic display 161 is turned off or in a low power mode. This feature can save power and extend the lifespan of electronic display 161 while still providing touch-sensitive feedback via buttons 162. Since user interactions with buttons 162 are detected in the same manner as user interactions with the dynamic content presented via electronic display 161 (i.e., input received via touch-sensitive panel 163), the front surface of control panel 160 may be implemented as a continuous front panel.

Control panel 160 may be installed within a shower enclosure (as shown in FIG. 1). Housing 165 may include attachment points 172 (e.g., brackets, fasteners, portions for receiving screw heads, etc.) for mounting control panel 160 within shower enclosure 110. Housing 165 also provides a waterproof casing to protect the internal electronic components of control panel 160 from moisture. In various embodiments, the front surface of control panel 160 may be flat with a surface of the shower enclosure (e.g., with housing 165 positioned within the wall) or control panel 160 may be mounted on an existing shower wall (e.g., with a rear surface of housing 165 mounted on the wall).

3. Shower Control Interfaces

Referring now to FIGS. 5-24, several graphical user interfaces that may be presented via control panel 160 are shown, according to an exemplary embodiment. The graphical user interfaces illustrate various features, processes, and control options made available to a user by shower control system 200. Computer code modules, instruction sets, or other resources for causing, executing, or facilitating these processes and the related graphical user interfaces may be stored in memory 298 or across memory of the controllers (e.g., control panel 160, controller 260, a controller for subsystems 230-280, etc.).

In some embodiments, the graphical user interfaces presented via control panel 160 display graphical elements for quick and intuitive information recognition and input by the user. For example, the information and soft keys displayed via control panel 160 may be easily distinguished by users with compromised vision (e.g., from steam in shower enclosure 110, moisture on control panel 160, or deteriorated vision). Each soft key displays a graphical user interface element (e.g., an icon) that includes a combination of distinguishing visual features that provide information related to the physical feature associated with the user interface element. For example, each graphical user interface element be indicative of the function of a corresponding physical feature (e.g., water control, lighting, music, steam, etc.). Icons may be grouped in particular areas of the touchscreen interface, may have a particular color, shading, size, background, luminosity, or any combination thereof.

In some embodiments, the graphical elements displayed via electronic display 161 are dynamic elements whereas the graphical elements displayed via buttons 162 are static elements. For example, the graphical elements displayed via electronic display 161 may change based on the display data presented on electronic display 161. Conversely, buttons 162 may be represented by fixed-position apertures in an opaque frame 508 around electronic display 161 and may not change based on the information presented via electronic display 161. Buttons 162 are shown to include a power button 502, a temperature down button 504, and a temperature up button 506. Buttons 162 can be illuminated or non-illuminated by activating or deactivating a corresponding LED backlight 168 behind each button to indicate that the feature associated with the button (e.g., power, temperature up, temperature down) is either available or unavailable.

Referring particularly to FIG. 5, control panel 160 is shown displaying a "power off" user interface 500, according to an exemplary embodiment. In power off user interface 500, electronic display 161 may display the current time and/or date 510. Buttons 162 are shown with power button 502 illuminated and temperature up button 504 and temperature down button 506 not illuminated. A user can turn on shower control system 200 by pressing power button 502.

Referring now to FIG. 6, control panel 160 is shown displaying a "home screen" user interface (i.e., home screen 600), according to an exemplary embodiment. Home screen 600 may be displayed in response to pressing power button 600 in power off interface 500. However, this behavior can be changed by setting the startup screen to a different default feature. Home screen 600 is shown to include several graphical elements (i.e., soft keys or icons) displayed on electronic display 161. For example, home screen 600 is shown to include a "shower" element 602, a "users" element 604, a "steam" element 606, a "lighting" element 608, a "music" element 610, a "spa" element 612, a "stop" element 614, and a "settings" element 616. Elements 602-616 may correspond to various program modules or systems that may be selected by the user to display control interfaces for the respective modules or systems. In some embodiments, the elements displayed on home screen 600 can be customized by the user, for example, to display those elements associated with systems or modules most often used.

Home screen 600 may display the current time and/or date 618. If water is not running, the time and/or date 618 may be displayed prominently (shown in FIG. 6). If water is currently running, home screen 600 may display the current temperature of the running water and a target or setpoint water temperature. When water is running, the current temperature and target temperature may be displayed prominently and the current time and/or date 618 may be displayed in a less prominent location (e.g., a corner of electronic display 161). The target water temperature can be adjusted by pressing temperature up button 504 or temperature down button 506. Temperature up button 504 and temperature down button 506 may be illuminated whenever water is running to indicate that the temperature of the running water can be adjusted.

In some embodiments, one or more of graphical elements 602-616 may be omitted from home screen 600 if the corresponding feature is not available for the user's shower configuration. For example, lighting element 608 may be omitted if shower 100 does not include a lighting feature. If fewer features or components are included in shower 100, fewer elements may be displayed on home screen 600. Advantageously, home screen 600 can adapt to multiple different shower configurations by displaying only the user interface elements applicable to a particular shower configuration. Displaying fewer elements on home screen 600 may result in a larger amount of unoccupied space. In some embodiments, the current time 618 or current water temperature is vertically centered in the unoccupied space, regardless of the number of elements displayed.

Referring now to FIGS. 7-13, control panel 160 is shown displaying a "shower control" user interface 700, according to an exemplary embodiment. Shower control interface 700 may be displayed in response to a user selecting "shower" icon 602 on home screen 600. Shower control interface 700 includes a variety of graphical elements for monitoring and/or controlling the water temperature and/or flow volume associated with shower outlets 121-129. For example, shower control interface 700 is shown to include a current water temperature 702 and a target water temperature 704. When water is running, both the current water temperature 702 and the target water temperature 704 may be displayed. Current temperature 702 may be displayed as a larger element than target water temperature 704 when water is running and may be separated from target water temperature 704 by a divider line 706. When water is not running, only the target temperature 704 may be displayed. The display size of target temperature 704 may be larger when water is not running than when water is running.

Figure 9:
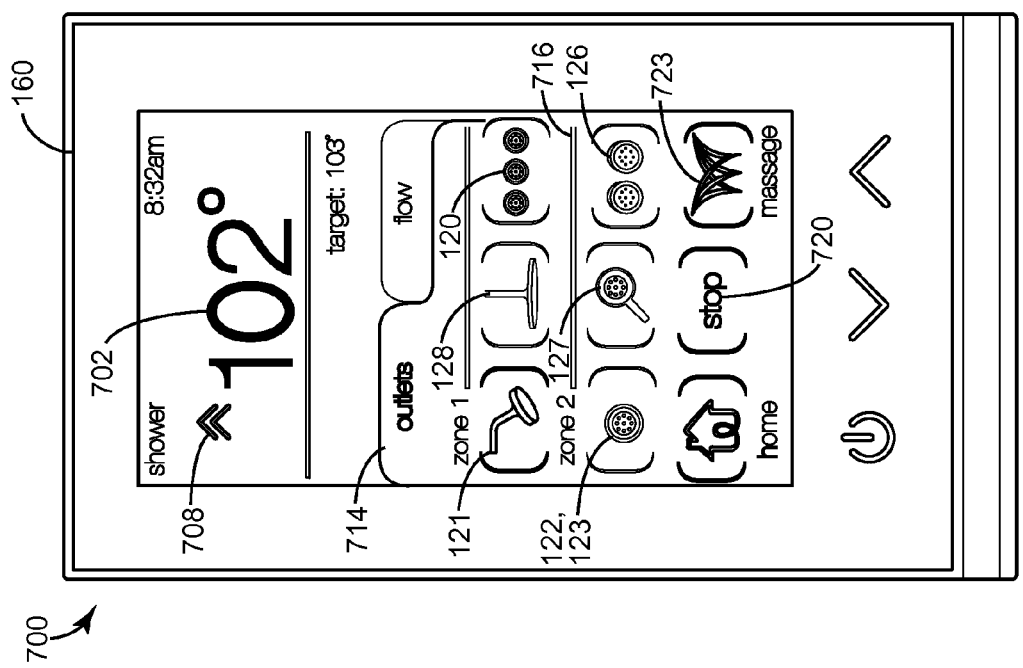
FIG. 9 is a drawing of the control panel of FIG. 3 displaying another shower control interface in which all of the shower outlets are represented as graphical icons in a single tab of the shower control interface, according to an exemplary embodiment.

If the current temperature of the water is increasing, a temperature rising indicator 708 (e.g., a red chevron) may be displayed adjacent to the current temperature 702 (shown in FIG. 9). If the current temperature of the water is decreasing, a temperature dropping indicator (e.g., a blue chevron) may be displayed adjacent to the current temperature 702. The temperature change indicators may blink between dim and bright as the temperature of the water approaches the target value. The temperature change indicators may disappear once the target temperature has been achieved.

When shower control interface 700 is displayed, temperature up button 504 and temperature down button 506 may be illuminated indicating that the target temperature 704 (or temperatures for multi-valve configurations) can be adjusted. Temperature up button 504 and temperature down button 506 may also be illuminated at any time water is running, regardless of which user interface is currently displayed via electronic display 161.

When the target water temperature 704 is adjusted, shower control interface 700 may display a pop-up window 722 (shown in FIG. 10) indicating the change. Pop-up window 722 may prominently display the target water temperature 704 and may be displayed until a predetermined time period (e.g., one second) has passed since the target water temperature 704 has changed. When pop-up window 722 disappears, the target temperature 704 displayed via shower control interface 700 may reflect the new target temperature. For embodiments that include multiple control panels 160, target temperature 704 can be changed from any of the control panels 160. When target temperature 704 is changed from any control panel 160, pop-up window 722 may be displayed on all of the control panels 160 to indicate the target temperature change.

Figure 8:
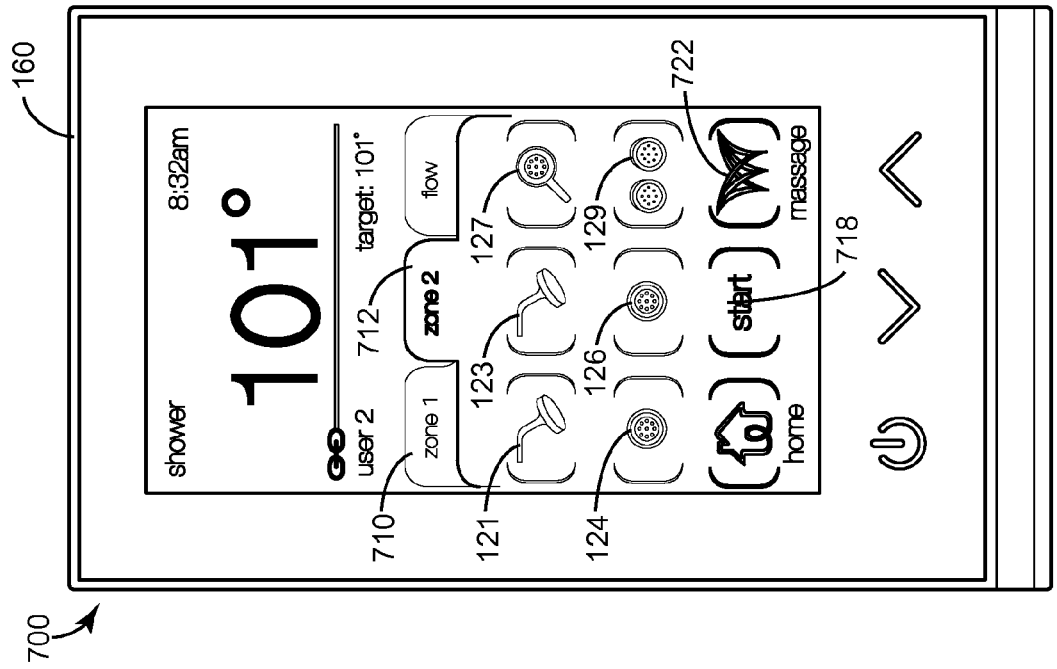
FIG. 8 is another drawing of the shower control interface of FIG. 7 in which another set of shower outlets are represented as graphical icons in a second tab of the shower control interface, according to an exemplary embodiment.
Figure 7:
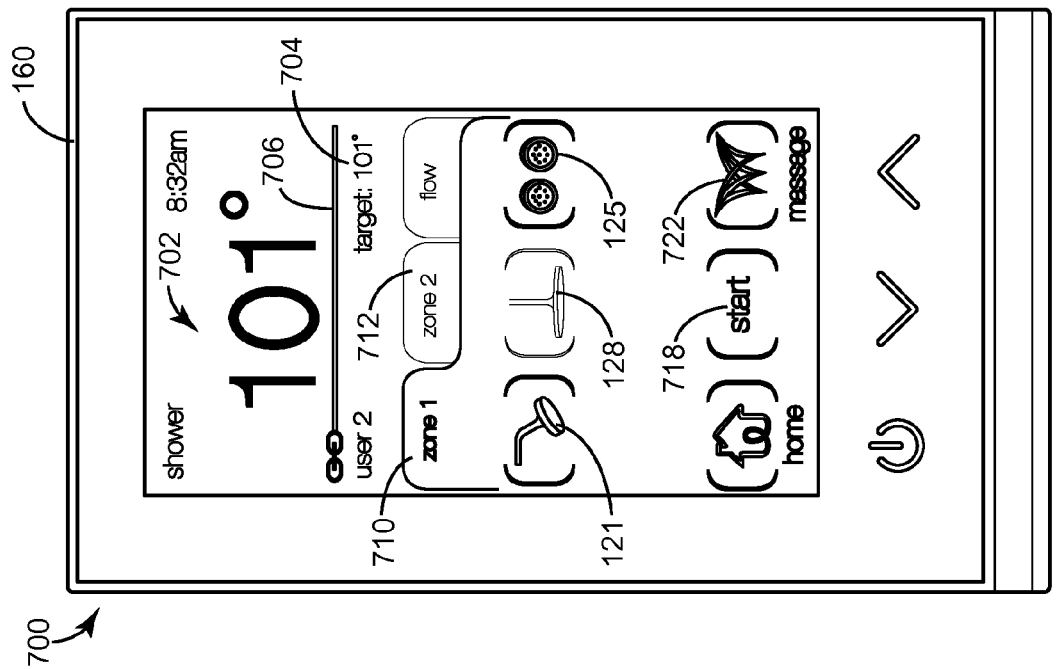
FIG. 7 is a drawing of the control panel of FIG. 3 displaying a shower control interface in which a set of the shower outlets are represented as graphical icons in a first tab of the shower control interface, according to an exemplary embodiment.
Figure 10:
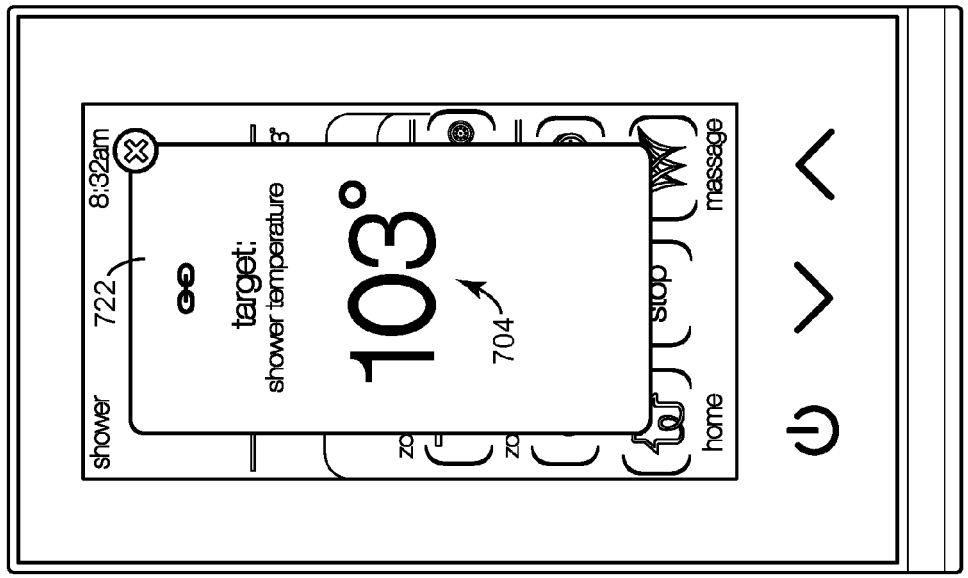
FIG. 10 is a drawing of the control panel of FIG. 3 displaying a temperature adjustment pop-up window, which may be displayed in response to a change in the target water temperature, according to an exemplary embodiment.

Referring particularly to FIGS. 7-9, shower control interface 700 may include graphical elements representing shower outlets 121-129 of the corresponding physical shower 100. The particular graphical elements shown in shower control interface 700 may depend on the number, type, and/or location of shower outlets in shower 100. For example, if shower 100 has multiple temperature control valves, each connected to a subset of shower outlets 121-129, shower control interface 700 may display graphical elements representing shower outlets 121-129 in multiple temperature zones. However, if shower 100 has only a single temperature control valve, shower control interface 700 may display the graphical elements representing shower outlets 121-129 in a single temperature zone.

FIGS. 7-8 illustrate an embodiment of shower control interface 700 for a shower that includes a six-port temperature control valve and a separate three-port valve temperature control valve. Each valve may control water temperature and/or flow to a separate set of shower outlets. In some embodiments, shower control interface 700 includes a "zone 1" tab 710 and a "zone 2" tab 712. Each zone corresponds to a different temperature control valve and may be set to a different temperature. The zone 1 tab 712 is shown to include graphical elements representing front showerhead 121, middle body spray 125, and rainhead 128. The zone 2 tab 714 is shown to include graphical elements representing left showerhead 122, right showerhead 123, upper body spray 124, lower body spray 126, side body sprays 129, and handshower 127. In some embodiments, each zone tab can display a maximum of six shower outlets. The graphical elements may be illuminated (e.g., displayed as white) to indicate that the corresponding shower outlet is active, or not illuminated (e.g., displayed as gray) to indicate that the corresponding shower outlet is inactive. A user can select (e.g., tap or touch) each of the graphical elements to toggle on/off the corresponding shower outlet.

FIG. 9 illustrates an embodiment of shower control interface 700 for a shower than includes two three-port temperature control valves. Each valve may control water temperature and/or flow to a separate set of shower outlets. Each zone corresponds to a different temperature control valve and may be set to a different temperature. In FIG. 9, shower control interface 700 is shown to include a single "outlets" tab 714 which displays multiple temperature zones. Zone 1 is shown to include graphical elements representing front showerhead 121, a central body spray 120, and rainhead 128. Zone 2 is shown to include graphical elements representing lower body spray 126, handshower 127, and a side showerhead element representing both left showerhead 122 and right showerhead 123. Because only six outlet control elements are required, all such elements can be represented on a single outlet control tab 714. Zone 1 may be distinguished from zone 2 by a divider line 716 separating zone 1 outlets from zone 2 outlets.

In various other embodiments of shower 100, shower 100 may include a single six-port temperature control valve or a single three-port temperature control valve. For showers that include only a single temperature control valve, all of the graphical elements representing the available shower outlets may be included in the same temperature zone. Shower control interface 700 may display all of the available shower outlets on a single outlets tab 714 without distinguishing between temperature zones.

In shower control interface 700, any of the graphical elements representing the various shower outlets can be selected or deselected prior to and/or during shower operation. For example, prior to initiating water flow, a user can select or deselect one or more shower outlets by touching the corresponding graphical element in shower control interface 700. When a shower outlet is selected, the corresponding graphical element may be illuminated (e.g., displayed as white) or otherwise marked to indicate the user's selection. The user can then select the "start" element 718 (shown in FIGS. 7-8) to initiate water flow from the selected outlets. While water is flowing, the user can activate or deactivate various shower outlets by selecting the corresponding elements of shower control interface 700. When water begins flowing, start element 718 may change into a "stop" element 720 (shown in FIG. 9). The user can select stop element 720 to stop the flow of water to all shower outlets. Advantageously, shower outlets can be selected and deselected independent of starting and stopping water flow. This feature allows a user to select a combination of shower outlets prior to starting water flow and then select start element 718 to initiate water flow from all of the selected outlets simultaneously.

In some embodiments, controller 260 maintains a first set of state information indicating which of shower outlets 121-129 are selected. Controller 260 may also maintain a second set of state information indicating whether various features provided by shower control system 200 are currently active (e.g., a shower feature, a music feature, a lighting feature, etc.). Controller 260 may use the first set of state information and the second state information to determine whether to use each of shower outlets 121-129 and/or other output devices of shower control system 200 provide an output to shower enclosure 110. For example, controller 260 may activate a shower outlet if the shower outlet is both selected via shower control interface 700 and the shower feature of shower control system 200 is currently active. Multiple shower outlets can be selected or deselected prior to activating the shower feature and then activated simultaneously upon activating the shower feature.

In some embodiments, shower control interface 700 includes a "massage" graphical element 723. Selecting massage element 723 may lead to a pop-up of shower massage sequencing options. The massage sequencing options may include, for example, a shoulder pulse option, a foot pulse option, a single outlet pulse option, and/or a custom pulse option which allows a user to select a combination of shower outlets for use in a massage process. The available massage options may vary depending on the shower configuration. In some embodiments, the available massage options are displayed as radio buttons. The pop-up of massage sequencing options may allow one option to be selected per zone.

Selecting a start element in the pop-up of massage sequencing options may begin the selected massage sequence and toggle the start element to a stop element. If the selected massage sequence requires that more of shower outlets 121-129 be turned on, then the massage sequence may activate any necessary shower outlets. For example, if front showerhead 121 is the only shower outlet that is active prior to beginning the massage sequence and the user selects "shoulder pulse" and "start," the shoulder pulse showerheads (e.g., upper body spray outlets 124) may activate and begin pulsing. Front showerhead 121 may remain active at its pre-massage setting.

Selecting the stop element in the massage pop-up window may stop the massage sequence. If water was running from any of shower outlets 121-129 prior to beginning the massage sequence, selecting the stop element may cause the shower control system to revert to the pre-massage flow configuration. The massage sequence may also be stopped by deactivating the pulsing shower outlets via shower control interface 700. Selecting the stop element 720 via shower control interface may stop water flow from all shower outlets 121-129, regardless of whether the outlets were active prior to the massage sequence.

Referring now to FIGS. 11-12, a flow control feature of shower control interface 700 is shown, according to an exemplary embodiment. The flow control feature may be activated by selecting the "flow" tab 724 in shower control interface 700. When flow tab 724 is active, each graphical element representing one or more of shower outlets 121-129 in shower control interface 700 may include a volume indicator icon 726 (e.g., one bar for low flow volume, two bars for medium flow volume, three bars for high flow volume, etc.). When outlets 121-129 are initially activated, they may turn on at a default flow volume. Selecting a graphical element associated with one of shower outlets 121-129 in flow tab 724 may shift the associated flow volume to the next increment and update the corresponding volume indicator icon 726 accordingly. Selecting the reset element 728 may cause all flow volumes to revert to their default values.

Flow tab 724 is shown to include an "options" graphical element 730. Selecting options element 730 may lead to a pop-up flow control window 732 (shown in FIG. 10). Pop-up flow control window 732 may allow a user to adjust flow more precisely relative to the adjustments made via flow tab 724. For example, pop-up flow control window 732 is shown to include sliders 734 that can be set at any point (e.g., one of ten intermediary steps) between minimum volume and maximum volume. Outlets that are currently active or selected may be represented by a bright slider that reflects the flow volume of the corresponding outlet. Outlets that are inactive or not selected may be represented by a dim slider at its at its lowest point. Selecting the "x" icon 736 in the corner of pop-up flow control window 732 may cause shower control interface 700 to revert to flow tab 724 (e.g., without canceling changes made). Updates to flow volumes made via pop-up flow control window 732 may be shown in the flow tab 724. In some embodiments, flow volume adjustment is available for any valve having three ports; however, in other embodiments, flow volume adjustment is available for other types of valves.

Referring now to FIG. 13, in some embodiments, shower control system 200 includes a purge feature. The purge feature allows shower control system 200 to achieve the target water temperature at an expedited rate by rapidly purging water from the inlet pipes leading into the system. The purge feature may be useful, for example, when shower 100 is initially turned on to purge water that has lost its heat from the hot water inlet line. If the purge feature is enabled, selecting "start" icon 718 in shower control interface 700 may activate all of shower outlets 121-129 until the target temperature is reached.

While the purge process is active, a purge interface 738 may be displayed. Purge interface 738 may include graphical elements indicating current water temperature 702, target water temperature 704, and either a temperature rising indicator 708 or a temperature falling indicator. Target temperature 704 can be adjusted via temperature up button 504 and temperature down button 506 while the purge process is active. Purge interface 738 may include a skip element 740 which cancels the purge process when selected. In some embodiments, if target temperature 704 is not achieved within a predetermined time period after starting the purge process (e.g., twenty minutes), controller 260 automatically cancels the purge process. Upon canceling the purge process (e.g., either automatically or by a user), shower control interface 700 may be displayed.

When the purge process ends (e.g., upon achieving the target temperature or cancelling the purge process) all of shower outlets 121-129 that were not selected prior to selecting start icon 718 may be deactivated. Outlets that were selected prior to selecting start icon 718 may remain active and may maintain target temperature 704. In some embodiments, an indication (e.g., a sound, a display message, etc.) is provided in response to achieving target temperature 704 to inform the user that the target temperature has been reached. When the purge process ends, shower control interface 700 may be displayed. In some embodiments, the purge feature can be enabled or disabled by adjusting the settings of controller 260 (e.g., via a web interface and/or a settings interface). If the purge feature is disabled, selecting start icon 718 may activate only the outlets that were selected prior to selecting start icon 718 without performing the purge process.

Referring now to FIGS. 14-15 a "steam" user interface 1400 is shown, according to an exemplary embodiment. Steam interface 1400 may be displayed in response to selecting steam icon 606 on home screen 600. Steam interface 1400 may provide interface options for monitoring and/or controlling steam system 230. Steam interface 1400 is shown to include a current space temperature indicator 1402. Current space temperature indicator 1402 may display the current temperature of the room or space in which shower 100 is located. If the current temperature of the space is increasing, a temperature rising indicator 1404 (e.g., a red chevron) may be displayed adjacent to current temperature 1402, as shown in FIG. 15. If the current temperature of the space is decreasing, a temperature dropping indicator (e.g., a blue chevron) may be displayed adjacent to current temperature 1402.

Steam interface 1400 is shown to include a target steam temperature indicator 1406 and a steam duration indicator 1408. Target steam temperature indicator 1406 may display the target temperature for steam emitted by steam system 230 from steam outlets 131. The target steam temperature can be adjusted by selecting temperature up arrow 1410 and/or temperature down arrow 1412. Steam duration indicator 1408 may display the duration for which the steam will be emitted from steam outlets 131 at the target steam temperature. The steam duration can be adjusted by selecting plus icon 1414 and/or minus icon 1416. In some embodiments, target steam temperature 1406 may be adjusted by one degree increments and steam duration 1408 may be adjusted by one minute increments. In other embodiments, various other temperature and time increments can be made via steam interface 1400.

In some embodiments, steam interface 1400 includes an aromatherapy selector. The aromatherapy selector may allow a user to select an aromatherapy scent to be combined with the emitted steam. The aromatherapy selector may allow a user to scroll through a list of aromatherapy scents that can be generated by the aromatherapy subsystem 280 and combined with the emitted steam. The saturation, density, or intensity of the aromatherapy scent can be adjusted via the steam interface 1400. In other embodiments, a separate aromatherapy interface is provided for selecting and adjusting an aromatherapy scent. The aromatherapy interface may provide interface options that enable the aromatherapy scent to be emitted independent of the emitted steam and/or combined with the emitted steam.

Steam interface 1400 is shown to include a start icon 1420. Selecting start icon 1420 may begin the steaming process at the parameters shown. In some embodiments, current space temperature indicator 1402 becomes bright and the adjustable parameters 1406-1408 are dimmed once the steaming process has started (as shown in FIG. 15). Start icon 1420 may also change to a stop icon 1420 when the steaming process is active. The steaming process may cause the temperature of the current space to rise to the target steam temperature. When the current space temperature reaches the target temperature, steam interface 1400 may start a steam duration countdown and an indication (e.g., a beep) may be provided. In some embodiments, the steam duration parameter 1408 can be adjusted during the steaming process. Once the steam duration timer reaches zero, the steaming process may stop. Another indication may be provided when the timer reaches zero and/or shortly before the timer reaches zero (e.g., with one minute remaining).

If water is running while steam interface 1400 is displayed, the water temperature may be displayed on steam interface 1400. Temperature up button 504 and temperature down button 506 can be used to adjust the target water temperature. If either of the temperature control buttons 504-506 is selected, pop-up window 722 may be displayed for a short duration to indicate the adjusted target water temperature.

Referring now to FIGS. 16-18, a "lighting" user interface 1600 is shown, according to an exemplary embodiment. Lighting interface 1600 may be displayed in response to selecting lighting icon 608 on home screen 600. Lighting interface 1600 may provide interface options for monitoring and/or controlling lighting for the room in which shower 100 is located (e.g., standard room lighting, chromotherapy lighting, lighting integrated with shower 100, etc.). Shower control system 200 may use input received via lighting interface 1600 to activate or deactivate various lighting elements (e.g., switches, circuits, etc.) or to otherwise control a lighting effect (e.g., color, intensity, etc.). Lighting interface 1600 is shown to include a "room" tab 1602 and an "ambient rain" tab 1604.

Referring particularly to FIG. 16, room tab 1602 may provide interface options for controlling one or more electric fixtures or appliances that can normally be controlled with a switch and/or a dimmer (e.g., incandescent lights, fluorescent lights, LEDs, chromotherapy lights, fans, bathroom appliances, etc.). For example, room tab 1602 is shown to include a plurality of sliders 1606-1610 that can be adjusted between a maximum position and a minimum position. Each slider 1606-1610 may correspond to a particular electric fixture or appliance and can be adjusted to turn on, turn off, or otherwise control (e.g., adjust a light brightness, adjust a fan rotation speed, etc.) the corresponding electric fixture or appliance. For example, ambient light slider 1606 may be used to adjust ambient lighting (e.g., ceiling-mounted or wall-mounted lighting) for the room in which shower 100 is located. Vanity slider 1608 can be used to adjust separate lighting in the room. Task slider 1610 can be used to control a third lighting fixture or another appliance.

Fixtures that are dimmable can be controlled incrementally with sliders 1606-1610. Binary on/off fixtures can be toggled on/off with toggle switches and/or other binary user interface elements. In various embodiments, sliders 1606-1610 may be replaced with switch icons or binary selection icons (e.g., toggle switches) for fixtures or appliances that cannot be controlled incrementally. Selecting the "all on" icon 1612 may move all of sliders 1606-1610 to a maximum position and cause any corresponding lighting fixtures to activate at maximum brightness. Selecting the "all off" icon 1614 may move all of sliders 1606-1610 to a minimum position and cause any corresponding lighting fixtures to turn off. Tabs and sliders in lighting interface 1600 can be renamed, added, or removed via a settings interface.

Referring particularly to FIGS. 17-18, ambient rain tab 1604 is shown, according to an exemplary embodiment. Ambient rain tab 1604 may be used to control a color and/or effect of light emitted from a lighting element 151 integrated with rainhead 128. A user can toggle between effect control and color control by selecting either the "effect" icon 1616 or the "color" icon 1618 in ambient rain tab 1604. Effects may be scripted light effects that change color and brightness in sequence. A user can select an effect from a list 1620 of pre-scripted lighting effects displayed in ambient rain tab 1604. Selecting "start" icon 1622 initiates the selected lighting effect and toggles start icon 1622 to a stop icon. When a lighting effect is active, selecting another lighting effect from list 1620 may cause a transition to the newly-selected lighting effect. Effects may be configured to loop until a user selects the stop icon, turns off the lighting feature, or powers off the system.

Selecting the color icon 1618 may cause a color selection interface 1624 to be displayed. Color selection interface 1624 includes a target color 1626 indicating a color that the ambient rain lighting 151 is emitting (i.e., if currently active) or will emit once start icon 1622 is selected (e.g., if currently inactive). Color selection interface 1624 is shown to include various color swatches 1628. Selecting a color swatch 1628 may change target color 1626 to the color of the selected swatch 1628 and cause ambient rain lighting 151 to change to the selected color. Colors in color swatches 1628 may include various shades of white (e.g., soft white, bright white, cool white) and other colors (e.g., red, orange, blue, green, purple, etc.). Selecting the options icon 1630 may cause a brightness slider to be displayed. The brightness slider can be used to control the brightness of ambient rain lighting 151.

Referring now to FIGS. 19-20, control panel 160 is shown displaying an "audio control" user interface 1900, according to an exemplary embodiment. Audio control interface 1900 may be displayed in response to a user selecting the "music" icon 610 via home screen 600. Audio control interface 1900 includes a variety of graphical elements for monitoring and/or controlling audio system 240. For example, audio control interface 1900 is shown to include a "listen" tab 1902 and an "input" tab 1904.

In some embodiments, audio control interface 1900 automatically displays listen tab 1902 when an external device is connected (e.g., via a wireless pairing or via a cable). As shown in FIG. 19, listen tab 1902 is shown to include a volume slider 1906, a previous track icon 1908, and a next track icon 1910. Volume slider 1906 and track icons 1908-1910 can be selected to adjust the volume and/or track of the audio currently playing via audio system 240. Listen tab 1902 may also provide an option pause or stop audio playback (e.g., by selecting stop icon 1912). In some embodiments, listen tab 1902 includes a shuffle icon and a loop icon for indicating whether shuffle and/or loop are active.

Listen tab 1902 is shown to include an options icon 1922 which causes an options window to appear when selected. The options window may include various options for adjusting audio playback. For example, the options window may include a bass slider, a treble slider, and a balance slider. A user can manipulate the sliders to adjust the bass, treble, and balance of the audio playback. Adjustments may be reflected in real time. The options window may also include a shuffle icon, a loop icon, and a repeat icon for toggling a shuffle playback mode, a loop playback mode, and a repeat playback mode, respectively.

As shown in FIG. 20, selecting input tab 1904 may cause a list of input connections to be displayed. For example, input tab 1904 is shown to include a Bluetooth icon 1914, a home network icon 1916, an Internet radio icon 1918, and a line in icon 1920. Each of icons 1914-1920 corresponds to a particular input connection available to audio system 240. For example, shower control system 200 may include a wireless transceiver (e.g., WiFi, Bluetooth, NFC, etc.) capable of communicating wirelessly with an external data source. In some embodiments, shower control system 200 includes a Bluetooth-capable transceiver. A user can pair a Bluetooth-capable device (e.g., a smartphone, a portable music player, etc.) with the Bluetooth-capable transceiver to receive audio data from a Bluetooth audio source.

A user can select any of input connection icons 1914-1920 to switch the audio input to the corresponding input connection. For example, selecting Bluetooth icon 1914 may initiate audio playback from a Bluetooth source. The volume of the music may default to approximately 50% when playback is started automatically. When a Bluetooth connection is formed, listen tab 1902 may display artist information and title information for an audio track. In some embodiments, music starts playing automatically when an external device is connected. In various implementations, one or more of input connection icons 1914-1920 may be omitted from input tab 1904 if the corresponding input connection is not available. For example, if shower control system 200 is not connected to a home network, then home network icon 1916 may not be shown.

Selecting the home network icon 1916 may cause a server selection window to appear. The server selection window may include a list of servers available on the home network to which shower control system 200 is connected (e.g., via router 220). The list of servers displayed in the server selection window may be adjusted via a web interface or using the settings configuration options. Selecting a server may cause audio system 240 to connect to the server. Upon connecting to a server, listen tab 1902 may display the artist and title for the most recent audio track from the server played by audio system 240. If playback was from a playlist, the name of the playlist may be displayed. A search interface may be provided to allow a user to locate audio files and/or audio sources available on the home network. When a home network connection is formed, listen tab 1902 may display artist information and title information for an audio track. Listen tab 1902 may also allow the user to pause playback (e.g., by selecting stop icon 1912) or to change the track currently playing (e.g., by selecting previous track icon 1908 or next track icon 1910).

Selecting the Internet radio icon 1918 may cause an Internet radio user interface to be displayed. The Internet radio user interface may include a service selection window which allows the user to select an Internet music service (e.g., Pandora, etc.). Internet radio accounts can be configured via a settings interface. Different users can have different accounts. Selecting an Internet radio service may cause a list of stations to be displayed (e.g., by station name). A station can be selected and music from the selected station can be played via audio system 240. When an Internet radio station is playing, listen tab 1902 may display artist information and title information for an audio track. Listen tab 1902 may also allow the user to pause playback (e.g., by selecting stop icon 1912) or to change the track currently playing (e.g., by selecting previous track icon 1908 or next track icon 1910).

Selecting the line in icon 1920 may cause a line in user interface to be displayed. In some embodiments, the line in user interface allows audio to be played from an external device connected via an auxiliary input (e.g., a data cable, a stereo or mono connection, etc.). The line in user interface may include a volume slider for adjusting the volume of the audio playback from the external device.

Referring now to FIGS. 21-22, control panel 160 is shown displaying a "spa control" user interface 2100, according to an exemplary embodiment. Spa control interface 2100 may be displayed in response to a user selecting "spa" icon 612 on home screen 600. Spa control interface 2100 includes a variety of graphical elements for monitoring and/or controlling various spa experiences provided by shower control system 200. Spa experiences may include coordinated patterns of water experiences, steam experiences, lighting experiences, audio experiences, and/or aromatherapy experiences. The particular graphical elements shown in spa control interface 2100 may depend on the number, type, and/or location of shower outlets 121-129, steam outlets 131, speakers 141, lighting elements 151, and aromatherapy outlets 181 in the physical shower 100. For example, shower configurations with a greater number or diversity of shower outlets may have a higher number of water experiences (e.g., eight) available for selection via spa control interface 2100. Shower configurations with a lesser number or diversity of shower outlets may have a lower number of water experiences (e.g., four) available for selection via spa control interface 2100. If the physical shower 100 includes steam outlets 131, spa control interface 2100 may include one or more steam experiences.

Referring particularly to FIG. 21, spa control interface 2100 is shown to include a "menu" tab 2102. When menu tab 2102 is selected, several graphical elements representing various spa experiences (e.g., water experiences and/or steam experiences) may be displayed. For example, spa control interface 2100 is shown to include graphical elements representing a "cooldown" experience 2104, a "warm up" experience 2106, a "relax" experience 2108, a "focus" experience 2110, a "restore" experience 2112, and a "breathe" experience 2114. Several exemplary spa experiences which may be provided by shower control system 200 are described in detail in U.S. Provisional Patent Application No. 61/934,811, filed Feb. 2, 2014, the entirety of which is incorporated by reference herein.

Each of the spa experiences may correspond to a particular sequence of outputs from shower outlets 121-129, steam outlets 131, speakers 141, lighting elements 151, and/or aromatherapy outlets 181. For example, some of the spa experiences may include dispensing water and/or steam from a predetermined combination of shower outlets 121-129 and steam outlets 131 at a particular temperature for a particular duration. Some of the spa experiences may include multiple stages which are performed sequentially by shower control system 200. Some of the spa experiences may include playing a particular audio track via speakers 141 during the spa experience or coordinating audio effects with events that occur during the spa experience (e.g., transitioning between stages of the spa experience, starting steam emission, etc.). Some of the spa experiences may include lighting effects and/or aromatherapy effects that are coordinated with various stages of the spa experience and/or events that occur during the spa experience. It is contemplated that the spa experiences provided by shower control system 200 may include coordinated outputs from any or all of shower subsystems 230-280. In other words, the spa experiences may include any combination of the different types of experiences or effects provided by shower subsystems 230-280 (e.g., water experiences, steam experiences, aromatherapy experiences, audio experiences, lighting experiences, etc.).

In some embodiments, not all of the available experiences can be represented simultaneously. For example, if more than a maximum number (e.g., six) of spa experiences are available, any spa experiences in excess of the maximum number may be displayed on a second page. A user can navigate between pages by selecting left arrow 2116 and/or right arrow 2118. The number of circles 2120 located between the arrows 2116-2118 may indicate a number of pages on which various spa experiences are displayed. One of circles 2120 may be highlighted to indicate which page the user is currently viewing. A user can select a spa experience by selecting the corresponding graphical element via spa control interface 2100. In some embodiments, one experience can be selected at a time. For example, if the cool down experience 2104 is selected and the user selects the warm up experience 2106, the warm up icon may become highlighted to indicate that the warm up experience 2106 is currently selected and the cool down icon may return to its non-selected appearance/state.

To begin an experience, the user can select "start" icon 2122. If the purge feature is enabled, selecting start icon 2122 may initiate the purging process, as described with reference to FIG. 13. If the purge feature is enabled, spa control interface 2100 may transition to a spa experience interface 2124 (shown in FIG. 22) once the purging process has completed or has been canceled. If the purge feature is disabled, spa control interface 2100 may transition to spa experience interface 2124 in response to selecting start icon 2122.

Referring particularly to FIG. 22, a spa experience interface 2124 is shown, according to an exemplary embodiment. Spa experience interface 2124 may be displayed in a new spa experience tab 2126. The spa experience tab 2126 may appear when start icon 2122 is selected after selecting a spa experience via spa control interface 2100. Spa experience tab 2126 may be labeled with the name of the selected spa experience (e.g., "relax"). Spa experience interface 2124 is shown to include a temperature indicator 2140 for the temperature of the water currently being output from shower outlets 121-129. If different zones (e.g., zones controlled by different valves) have different temperatures, each temperature may be displayed (e.g., zone 1 on top, zone 2 on the bottom). A dividing line 2142 may separate the zone 1 temperature indicator from the zone 2 temperature indicator.

Spa experience interface 2124 is shown to include a countdown timer 2128 indicating a total amount of time remaining in the currently-active spa experience. In some embodiments, the spa experience includes multiple discrete segments and spa experience interface 2124 includes a segment countdown timer indicating an amount of time remaining in the currently-active segment of the spa experience. When the segment countdown timer reaches zero, the combination of outputs provided by shower control system 200 may change to a different combination of outputs for the next segment of the spa experience Spa experience interface 2124 may be used to skip steps, repeat steps, and/or adjust temperature settings for various steps of a spa experience. In some embodiments, spa experience interface 2124 includes selection arrows (e.g., left arrow 2130 and right arrow 2132) which allow a user to manually transition between segments of the active spa experience. Selecting right arrow 2132 may skip to the next segment, whereas selecting left arrow 2130 may return to the previous segment. If the currently-active segment is the first or last segment, left arrow 2130 or right arrow 2132 (respectively) may be grayed-out to indicate that a transition into the previous or next segment is not available for selection. In some embodiments, selecting left arrow 2130 in the first segment of a spa experience resets timer 2128.

In some embodiments, spa experience tab 2126 shows the target water temperature 2134 for the currently active segment of the spa experience. The target temperature 2136 for the next segment may also be displayed (e.g., between target water temperature 2134 and right arrow 2132). If different zones (e.g., zones controlled by different valves) have different target temperatures, each target temperature may be displayed (e.g., zone 1 on top, zone 2 on the bottom). A dividing line 2144 may separate the zone 1 temperature indicator from the zone 2 temperature indicator.

In some embodiments, the target temperature(s) 2134-2136 for the current spa experience can be adjusted via temperature control buttons 504-506. Selecting one of temperature control buttons 504-506 may cause pop-up temperature adjustment window 722 to appear. In some embodiments, the target temperatures for each zone can be adjusted simultaneously. For example, selecting one of temperature control buttons 504-506 may increase or decrease both target temperatures together such that the temperature differential between zones is maintained. However, if one of the target temperatures reaches a minimum or maximum threshold, the temperature may not be increased or decreased past the threshold. The temperature differential between zones can then be adjusted by moving the other temperature closer to the threshold.

In some embodiments, the spa experience selected via menu tab 2102 may be started automatically in response to selecting start icon 2122. The spa experience may start automatically if the purge process is not performed. In some embodiments, the spa experience does not start automatically if the purge process is performed. A user can then select start icon 2122 on spa experience tab 2126 to start the spa experience. The spa experience may be stopped or paused by selecting stop icon 2138. When stop icon 2138 is selected, stop icon 2138 may toggle to start icon 2122, which can be selected to resume or restart the spa experience. In various embodiments, the spa experience may be resumed from the same segment and/or time at which stop icon 2138 was selected or from the beginning of spa experience.

At the end of a spa experience, all outlets may be deactivated except for the primary shower outlet 121. Shower outlet 121 may continue dispensing water at the ending temperature of the spa experience. Lights and music may continue. A user can select stop icon 2138 or power button 502 to stop the flow of water. In some embodiments, timer 2128 blinks between a bright time and a dim time when the spa experience has ended. The end of a spa experience may be accompanied by an audio indication (e.g., a double beep).

In some embodiments, selecting "options" icon 2146 causes a spa options interface to be displayed. The spa options interface may be presented in a pop-up window and may allow a user to make an adjustment to the selected spa experience. For example, the spa intensity level (e.g., for temperature therapy) can be selected from a list of options (e.g., mild, medium, professional, etc.). The professional level may have greater temperature differentials than the mild and medium levels. For example, a professional level experience may deliver contrast therapy at highest temperature differential (e.g., 18°); the medium level may have a medium temperature differential (e.g., 12°); and the mild level may have a lowest temperature differential (e.g., 6°). The spa options interface may be used to control whether a sound (e.g., a beep) is emitted at the end of each segment and/or at the end of the spa experience.

Referring now to FIG. 23 a "user preferences" interface 2300 is shown, according to an exemplary embodiment. User preferences interface 2300 may be displayed in response to selecting the users icon 604 on home screen 600. User preferences interface 2300 may provide interface options for configuring user preferences and customization settings for specific users of shower 100. For example, user preferences interface 2300 may allow a user to save a shower configuration by automatically detecting which of the features of shower 100 are currently active and the current settings and/or state of each active feature (e.g., which outlets are on, water temperature, music playlist, light brightness, etc.). Shower control system 200 automatically creates a preset of the active shower configuration and allows the preset to be saved for future retrieval.

User selection interface 2300 is shown to include a listing of several different user profiles 2302-2312. By default, user profiles 2302-2312 may be named chronologically (e.g., user 1, user 2, etc.). However, profiles 2302-2312 can be renamed as desired. The icons 2314 to the right of the profile name represent all the features that may be incorporated into a user profile (e.g., shower, steam, light, music, and spa). A feature may be dimmed, grayed, or omitted if the corresponding user profile has no saved settings for the feature. In FIG. 23, user profiles 2304-2312 are displayed as dimmed or grayed-out to indicate that no settings saved to them. However, user profile 2302 is illuminated to indicate that user profile 3202 has saved settings. The highlighted icons 2314 (i.e., a shower icon, a lighting icon, and a music icon) indicate that user profile 2302 has saved shower settings, saved lighting settings, and saved music settings.

To save a currently-active configuration to a user profile, the user can select the "save as" icon 2316. Selecting icon 2316 may cause a window to be displayed for allowing the user to assign the current configuration to a specific user profile. Upon assigning the configuration settings to a user profile, user interface 2300 may return to home page 600. The name of the user profile to which the settings were just assigned (e.g., "user 1") may be displayed on home page 600.

User selection interface 2300 can also be used to retrieve configuration settings previously assigned to a user profile. Any user profile that has saved configuration settings can be selected via user selection interface 2300. Once a user profile is selected, a user can select start icon 2318 to activate the selected user profile and return to home screen 600. The name of the active user profile may be displayed on home page screen 600.

In some embodiments, user profiles can be selected from user interface 500 by swiping at a designated location of touch-sensitive display 163. For example, a user can swipe from left to right along the top of touch-sensitive display 163 to select user profile 2302 via interface 500. Swiping in different areas and/or directions may select different user profiles. For example, user profile 2312 can be selected from swiping from right to left along the bottom of touch-sensitive display 163.

Referring now to FIG. 24, a feature deactivation interface 2400 is shown, according to an exemplary embodiment. Feature deactivation interface 2400 may be used to deactivate various features and/or subsystems of shower control system 200. In some embodiments, multiple different features of shower control system 200 can be active concurrently. For example, shower control system 200 may concurrently provide a shower feature via valve control system 270, a lighting feature via lighting system 250, a music feature via audio system 240, a steam feature via steam system 230, an aromatherapy feature via aromatherapy system 280, and/or a spa feature using various combinations of subsystems 230-280. Each feature may run as an independent application or process within the memory of shower control system 200.

In some embodiments, a feature can be stopped by selecting the stop icon within the user interface corresponding to the feature. For example, the shower feature can be stopped by selecting stop icon 720 within shower control interface 700; the steam feature can be stopped by selecting stop icon 1420 within steam control interface 1400; and the music feature can be stopped by selecting stop icon 1912 within music control interface 1900. A feature can also be stopped by selecting the stop icon 614 on home screen 600. For example, selecting stop icon 614 may cause feature deactivation interface 2400 to be displayed. Feature deactivation interface 2400 may include a listing of features that are currently running. A user can select one or more features via feature deactivation interface 2400 and select the "OK" icon 2402 to turn off the selected features. Features can also be deactivated via power button 502. For example, selecting power button 502 at any time may stop all currently-active features and display power off interface 500 without displaying the feature deactivation interface 2400.

In some embodiments, controller 260 runs multiple active features of shower control system 200 concurrently and deactivates an active feature of shower control system 200 in response to a user input received via feature deactivation interface 2400. In response to deactivating the active feature, controller 260 may deactivate each of the output devices of shower control system 200 (e.g., shower outlets, lighting elements, speakers, steam outlets, etc.) that are used only in the deactivated feature. Controller 260 may continue to operate each of the output devices that are used in any remaining active features of shower control system 200 in accordance with the remaining active features.

In some embodiments, shower control system 200 includes various features in addition to the features explicitly described herein. For example, shower control system 200 may include any of the features or components disclosed in U.S. Provisional Patent Application No. 61/934,811, filed Feb. 2, 2014. Exemplary features may include, for example, a timer/alarm feature, an automatic tub filling feature, a settings feature for adjusting various setting of shower control system 200 (e.g., feature settings, date and time settings, units settings, language settings, control panel settings, display settings, startup settings, etc.), or any other feature that can be incorporated into shower control system 200, as would be appreciated by one of ordinary skill in the art.

4. Virtual Shower Elements

Figure 25:
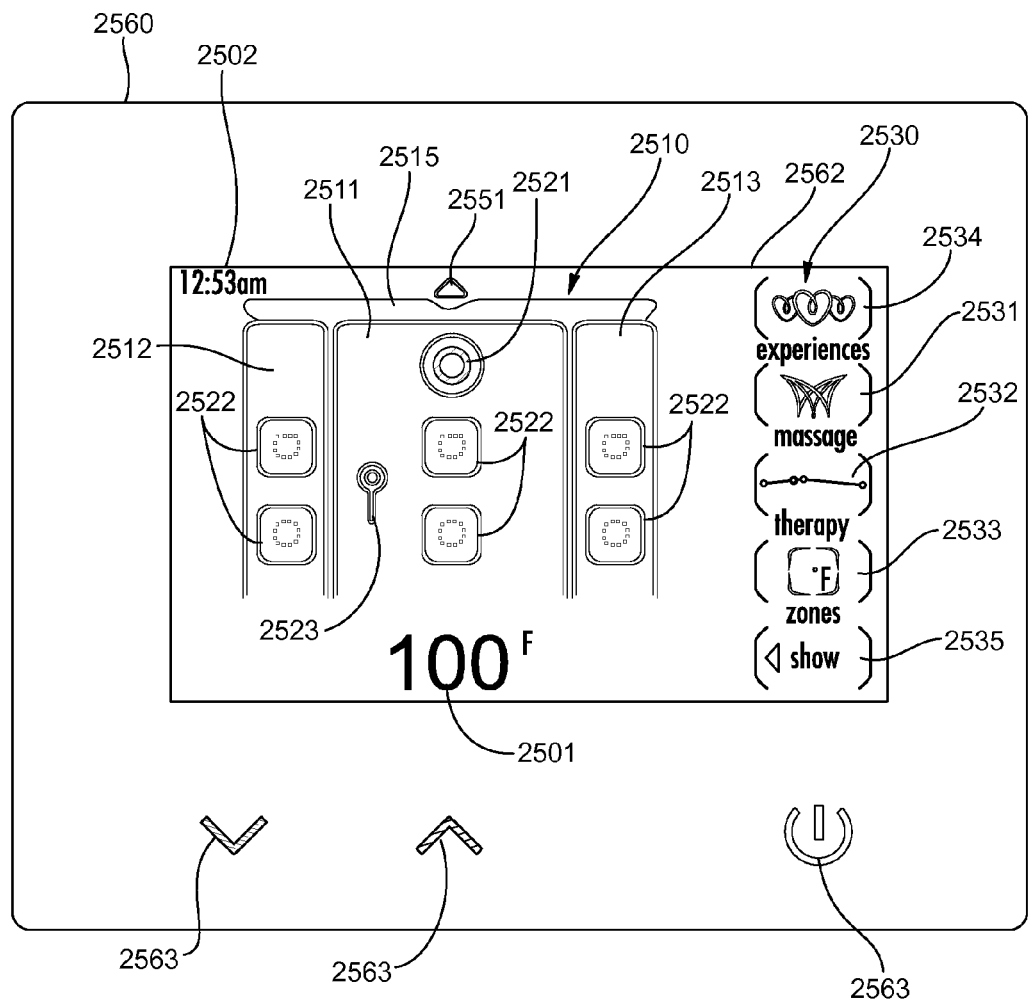
FIG. 25 is an illustration of a control panel and a graphical user interface displaying a home screen that includes a graphical representation of a shower layout, according to an exemplary embodiment.
Figure 26:
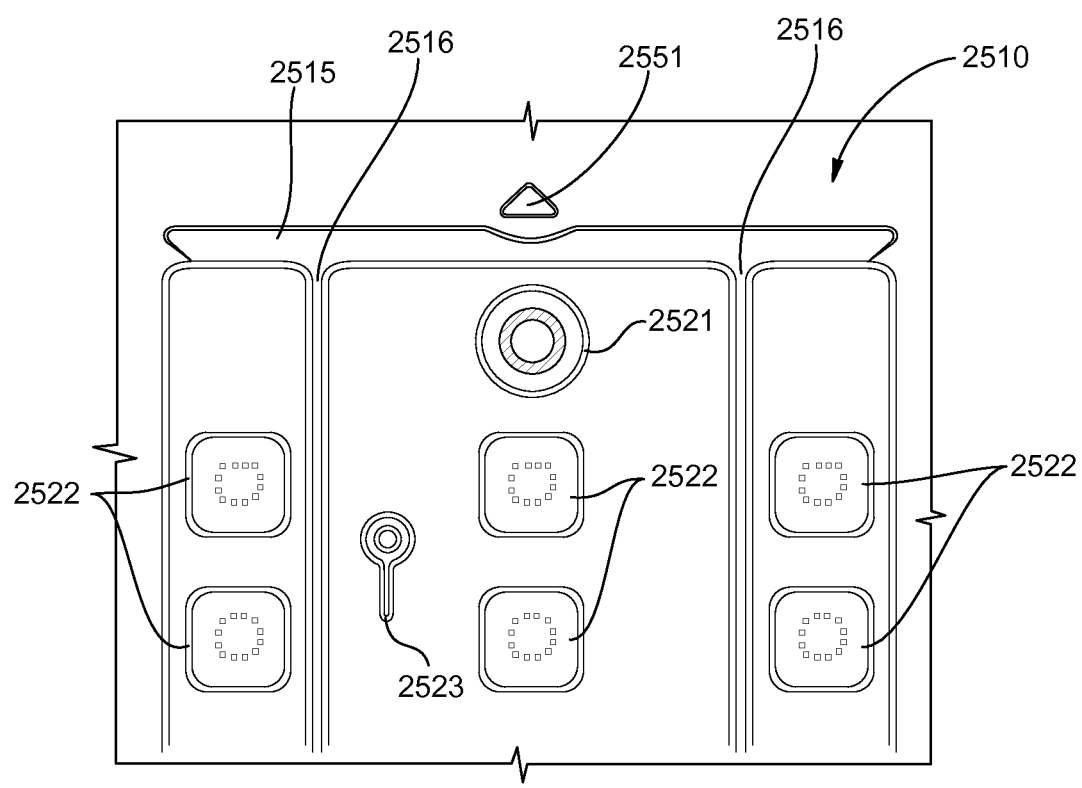
FIG. 26 is an enlarged illustration of a portion of graphical representation of a shower layout shown in FIG. 25, according to an exemplary embodiment.
Figure 27:
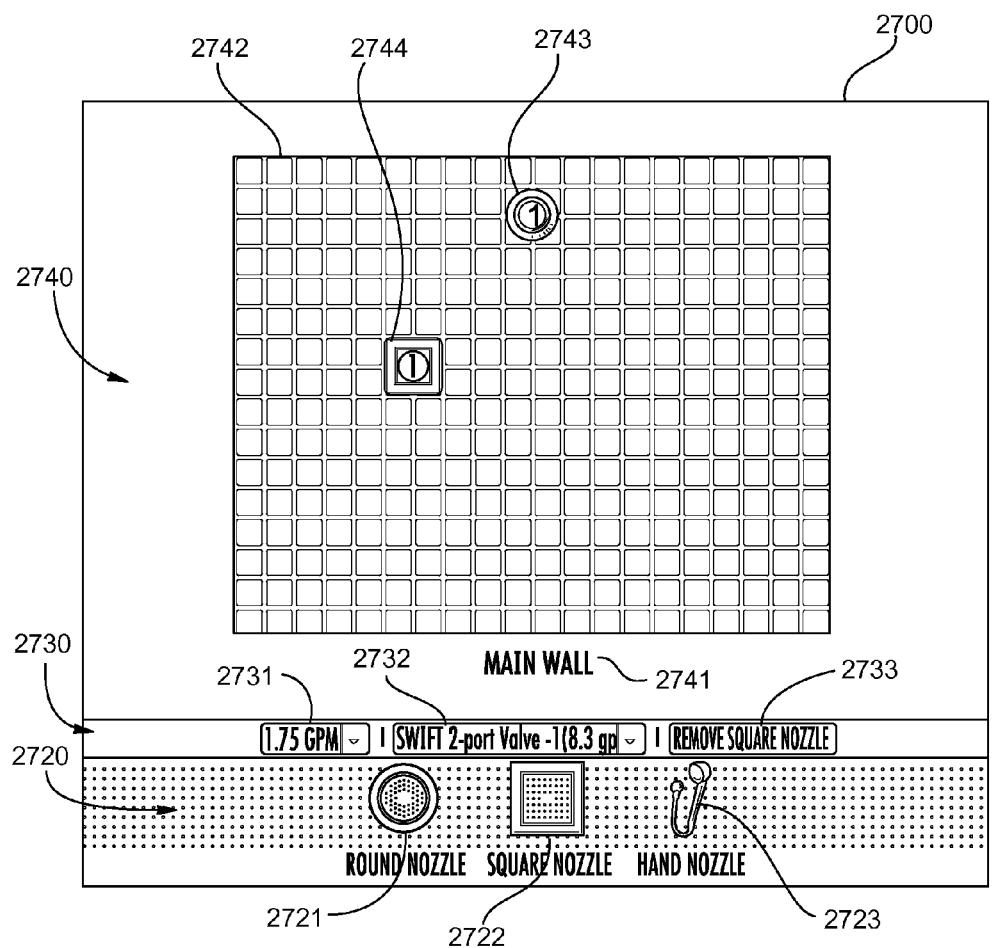
FIG. 27 is an illustration of a programming screen for the graphical representation of the shower layout, according to an exemplary embodiment.

Now referring to FIGS. 25-27, a graphical user interface displaying a virtual shower is shown, according to an exemplary embodiment. The graphical user interface may display graphical elements for quick and intuitive information recognition and input by the user. For example, the information and soft keys displayed are configured to be easily distinguished by users with compromised vision, such as from steam in the shower enclosure, moisture on the display, or deteriorated vision. Each soft key displays a graphical user interface element that includes a combination of distinguishing visual features that provide information related to the physical feature associated with each element. For example, the graphical user interface elements may include figures that are indicative of the function of a corresponding physical feature, may be grouped in particular areas of the touch screen interface, may have a particular color, shading, size, background, luminosity, or any combination thereof.

Referring particularly to FIG. 25, another embodiment of a control panel 2560 is shown, according to an exemplary embodiment. In some embodiments, control panel 2560 may be used in place of control panel 160 in shower enclosure 110. Control panel 2560 is shown displaying a home screen 2562 on the display of the control panel 2560. The home screen 2562 displays a first group of elements, each element corresponding to one physical shower outlet that may be controlled through the control panel 2560. A second group of elements 2530 includes elements that correspond to program modules (e.g., an element 2534 for experiences, an element 2531 for massage, an element 2532 for temperature therapy, and an element 2533 for temperature zones) for controlling the physical shower outlets and other shower systems (e.g., steam, music, lighting, aromatherapy, etc.).

The home screen 2562 also displays the current water temperature 2501, current time 2502, and a "show" element 2535. When the show element 2535 is touched, the home screen 2562 displays additional group of elements 2530 corresponding to other program modules or systems that may be selected by the user to display control screens for the respective modules or systems. Each of elements 2530 may represent a corresponding shower system (e.g., water, steam, music, lighting, etc.) or software program module (e.g., massage, temperature therapy, temperature zones, experiences, etc.). When a user selects one of elements 2530, a control screen for a corresponding system or module may appear on the graphical user interface. Each control screen may allow the user to select and activate particular saved settings, edit saved settings, and create and save new settings related to the systems or modules, as described with reference to FIGS. 5-24. The group of elements 2530 may also be customized by the user, for example, to display those elements 2530 associated with systems or modules most often used. The control panel may also include hard keys 2563 configured to receive user input when the user presses one of the hard keys 2563.

In some embodiments, one group of elements (e.g., 2521, 2522, 2523) representing shower outlets is displayed on a leftward-oriented portion of the screen, whereas another group of elements 2530 (e.g., 2531, 2532, 2533, 2534) representing systems or modules is displayed on a rightward-oriented portion of the screen. In other embodiments, the various elements may be arranged in other configurations. By disposing different functional groups of graphical user display elements (i.e., those representing shower outlets, and those representing systems or modules) in different areas of the touch screen interface, the user may quickly and intuitively determine which groups of elements are related to which shower features.

Each of elements 2521, 2522, 2523 may represent one or more corresponding physical shower outlets (e.g., water outlets 121-129, steam outlets 131, speakers 141, lighting elements 151, aromatherapy outlets 181, etc.). Each element representing a physical shower outlet depicts a figure that is visually indicative of the type of shower outlet to which the element corresponds. For example, element 2521 represents a showerhead, having a generally circular shape (i.e., common of many physical showerheads) and a ring of dots within the circle (i.e., representative of nozzles). Element 2522 represents a body spray, having a generally square shape (i.e., that of body spray tiles) and a ring of dots within the square (i.e., representative of nozzles). Element 2523 represents a handshower and is generally spoon-shaped (i.e., like a handshower). Although not specifically shown in FIG. 25, it should be understood that the shower outlet elements are not limited to water outlets and may include elements that represent other types of shower outlets (e.g., steam, aromatherapy, audio, lighting, etc.). By providing soft key with graphical user interface elements of varying shapes that are visually indicative of specific types of shower outlets, the user may quickly and intuitively distinguish which elements are associated with each type of physical shower outlet.

In some embodiments, each element representing physical shower outlets includes visual characteristics that are indicative of an output condition of the shower outlet associated with the element. According to an exemplary embodiment, each element is shaded according to whether its corresponding physical shower outlets are on or off. For example, element 2521 may be shaded (i.e., have the interior portion of the circle partially filled to signify that water is flowing through the showerhead) to indicate that the traditional shower outlet corresponding to element 2521 is on. For example, elements 2521, 2522 are depicted without shading to indicate that the showerhead and body sprays that correspond to elements 2521, 2522, respectively, are turned off. By providing shading for each graphical user interface element representing a shower outlet, the user may quickly and intuitively determine which physical shower outlets are on and which are off.

In some embodiments, each element representing a shower outlet may have a background to indicate water flow. For example, the background may be a solid pattern with varying shade corresponding to water flow rates, such as no shading to indicate no water flow, light shading to indicate low water flow, and dark shading to indicate high flow. Instead, or additionally, the background may include a different pattern to indicate water flow pattern, such as a solid background to indicate constant flow or a zig-zag pattern to indicate the pulsating flow of a massage program module. By providing different backgrounds for each of the graphical user interface elements representing physical shower outlets, the user may quickly and intuitively determine the flow pattern of each physical shower outlet.

In some embodiments, elements representing a physical shower outlet have particular colors that indicate temperature groupings of the corresponding physical shower outlets. For example, element 2521 may be green and element 2523 may be red, which indicates that the water temperature for the corresponding traditional showerhead and handshower, respectively, may be changed independently of each other. By providing coloring for each graphical user interface element representing a physical shower outlet, the user may quickly and intuitively determine which physical shower outlets may have their temperature changed as a group.

in some embodiments, each graphical user interface element representing a shower outlet is of sufficient size (e.g., approximately 0.5 inches×0.5 inches) to be easily seen and recognized by the user. According to other exemplary embodiments, the shower outlet elements may be small or larger than 0.5 inches×0.5 inches. The size or resolution of the elements representing shower outlets may be adjusted by the user according to user preferences or vision quality.

In some embodiments, the graphical user interface elements representing systems or programs depict figures that are indicative of the system or module to which they correspond. For example, element 2531 represents the massage program module and depicts crossing streams of water (i.e., indicative of pulsating water). Element 2532 represents the temperature therapy module and depicts a graph (i.e., indicative of a temperature profile). Element 2533 represents the temperature zone module and depicts a Fahrenheit symbol (° F.) in a box (i.e., indicative of a digital thermometer). Element 2534 represents the experiences module and depicts a series of hearts (i.e., indicative of users' favorite experiences). The elements representing system or modules may, similar to those representing shower outlets, use shape, color, size, shading, and other features for the user to quickly and intuitively distinguish between graphical user interface elements.

The visual characteristics of the graphical user interface elements described above and below are not meant to be limiting. In different embodiments, the graphical user interface elements representing different components, subsystems, program modules, or other features may include any combination of the characteristics described above or below in any combination with other visual characteristics capable of being displayed on the electronic display. For example, virtual shower 2510 may include graphical user interface elements that represent any of shower outlets 121-129, steam outlets 131, speakers 141, lighting elements 151, aromatherapy outlets 181, and/or any other outlet or component located within shower enclosure 110. All of these components may be referred to generally as "shower outlets" throughout this disclosure.

Referring now to FIGS. 25-26, the graphical user interface is shown to include a virtual shower 2510 (i.e., a graphical representation of a shower layout). Virtual shower 2510 includes a group of elements that are associated with a group of physical shower outlets in the shower enclosure. More specifically, soft keys include graphical user interface elements 2521, 2522, 2523, each displaying an image indicative of their associated physical shower outlets in shower enclosure 110 (e.g., shower outlets 121-129). Elements 2521, 2522, 2523 are also visually oriented with respect to each other in the graphical user interface in a manner that is representative of the actual arrangement of corresponding shower outlets in the physical shower enclosure 110 (e.g., forming what is essentially a "virtual" representation of the actual shower configuration). By providing graphical user interface elements having images that are visually indicative of corresponding physical shower features, and by orienting the elements in a manner visually representative of the physical orientation of corresponding physical shower features, the user may quickly and intuitively identify which elements of virtual shower 2510 correspond to each physical shower outlet disposed in shower enclosure 110.

In some embodiments, virtual shower 2510 corresponds to a physical shower enclosure 110 and is displayed on the graphical user interface. Virtual shower 2510 is shown to include a virtual front wall 2511 that corresponds to physical front wall 111, a virtual left wall 2512 that corresponds to physical left wall 112, and a virtual right wall 2513 that corresponds to physical right wall 113. Virtual front wall 2511 is shown to include a group of soft keys, portraying, for example, element 2521 depicting a traditional showerhead and corresponding to physical showerhead 121, elements 2522 depicting body sprays and corresponding to physical body sprays 124-125, and element 2523 depicting a handshower and corresponding to physical handshower 127.

The layout of virtual shower 2510 may be altered or programmed according to the custom setup of the specific, corresponding physical shower enclosure 110 it represents. The graphical user interface may be programmed by the user or an installer, such that virtual shower 2510 displays multiple elements representing shower outlets, wall breaks, walls, and a ceiling. For example, a grid running five across and four vertically may provide spaces for twenty elements representing shower outlets to be displayed. In other embodiments, more or fewer spaces for elements may be provided (e.g., 24 or more spaces, or 16 and fewer spaces), a grid of different dimensions may be provided (e.g., 3×5, or 6×6), or elements may be placed freely (i.e., without predefined spaces or a grid).

In some embodiments, virtual shower 2510 includes graphics 2516 that correspond to corners of the physical shower enclosure 110. For example, virtual front wall 2511, virtual left wall 2512, and virtual right wall 2513 may be outlined, such that gaps 2516 between the outlines of virtual walls 2511, 2512, and 2513 indicate wall breaks that correspond to corners of the physical shower enclosure 110. In other embodiments, virtual walls may be indicated by other manners instead of, or in addition to, outlines (e.g., backgrounds with different colors, shading patterns, perspective views of showerheads), and wall breaks may be indicated by other manners instead of, or in addition to, gaps 2516 between virtual walls (e.g., lines, intersection of virtual walls with different colors or shading patterns).

If usable space on the electronic display is insufficient to represent the physical shower 100 in one view of virtual shower 2510, additional virtual walls may be provided. The additional virtual walls may be hidden from view and navigated to by pressing navigation soft key elements (e.g., soft key 2551, which navigates to the ceiling) and/or paging representations depicted, for example, by arrows. By pressing the navigation elements, additional virtual walls or a virtual ceiling 2515 may be revealed. In some embodiments, virtual shower 2510 may include five virtual walls, each having twenty pre-defined spaces for elements representing shower outlets, and one virtual ceiling, also having twenty pre-defined spaces for elements. In other embodiments, virtual shower 2510 may include more or fewer virtual walls (e.g., more than 6, or fewer than 4), virtual walls having varying numbers of icon spaces (e.g., a virtual front wall having twelve icon spaces, virtual left and right walls each having three icon spaces), more or fewer virtual ceilings (e.g., 2 or more, or zero) with more or fewer icon spaces, or any combination thereof.

In some embodiments, virtual shower 2510 may be implemented by using a digital photograph and/or suitable digital illustration to represent the shower enclosure 110 instead of displaying a grid of graphical user interface elements. In this example, controls of the various outlets may be affected through use of hot-spot interaction with the digital photograph and/or illustration, wherein portions of the photograph or illustration are selected to behave as soft keys.

A user may control the various physical shower outlets (e.g., shower outlets 121-129) from control panel 2560 through the graphical user interface. For example, the user can navigate through the different shower outlet icons depicted on the graphical user interface shown on home screen 2562 and perform various functions, such as turning on/off the flow of water to each physical shower outlet, controlling the specific temperature of the shower outlets, and/or enabling advanced features such as the pulsing of the physical shower outlets, such as to provide a massage experience. For example, the physical showerhead 121 may initially be "off" as indicated by element 2521, which does not have the interior portion of the icon shaded. The user may "touch" element 2521 to turn on the water flow to the corresponding physical showerhead 121, thereby turning the showerhead 121 "ON" (i.e., having water flow to the showerhead 121). Each of the shower outlet icons 2521, 2522, 2523 may be illustrated as "OFF" or "ON" via any suitable graphic, including as illustrated, by shading the interior of the depicted graphic, and may be touched to turn off or on their associated physical shower outlets.

Referring now to FIG. 27, an interface 2700 for programming virtual shower 2510 is shown, according to an exemplary embodiment. Interface 2700 may be provided via control panel 2560, control panel 160, or via a separate computer (e.g., a laptop that includes programming software) and may be used by a user (e.g., an installer or an end user) to program virtual shower 2510. Interface 2700 may prompt the user to specify the number of physical walls in the shower 100 and may allow the user to customize virtual walls that correspond to each physical wall (e.g., by placing elements corresponding to shower outlets on the physical walls). Based on the user input, interface 2700 may create a virtual shower, which can be uploaded to control panel 2560 and/or displayed on the electronic display. In some embodiments, virtual shower 2510 may be programmed with software on control panel 2560 or control panel 160, and may be customized by the user.

Interface 2700 is shown to include an element catalog 2720, linking control section 2730, and placement section 2740 including a layout grid 2742. Catalog 2720 may provide the user with graphical user interface elements that may be used to represent shower outlets, such as a round nozzle 2721, square nozzle 2722, and hand nozzle 2723. In some embodiments, catalog 2720 includes graphical user interface elements that represent other types of shower outlets such as steam outlets, aromatherapy outlets, speakers, lighting devices, and/or other shower components located within shower enclosure 110. The user may then drag and drop the elements into the layout grid 2742 (i.e., select an element from the catalog 2720, and position the element on the grid 2742). For example, the user may select round nozzle elements 2721 to represent showerheads or rainheads, square nozzle elements 2722 to represent body sprays, and the hand nozzle element 2723 to represent handshowers. The user may select speaker elements to represent audio speakers, steam nozzle elements to represent steam outlets, and aromatherapy nozzle elements to represent aromatherapy outlets.

Grid 2742 may provide locations for the user to position the elements in catalog 2720 relative to each other, such as placement of element 2743 relative to element 2744, on each virtual wall. Each virtual wall that the user is currently configuring may be indicated by a label 2741. Grid 2742 may also provide horizontal lines and vertical lines, which may be selected by the user to define virtual walls, a virtual ceiling, and wall breaks in virtual shower 2510 that correspond to a physical shower 100.

Linking controls 2730 may enable the user to link and specify the shower outlet that corresponds to each graphical user interface element. For example, element 2744 is selected in FIG. 27 for specifying and linking, as may be indicated by a selection label. Flow menu 2731 allows the user to specify the flow rate of the physical shower outlet. Valve menu 2732 allows the user to specify the digital valve and outlet valve that control the physical shower outlet. Remove key 2733 allows the user to remove an element from the grid 2742, for example, if he/she wishes to display an element with a different shape.

Once the user completes positioning the elements and linking the elements to corresponding physical shower outlets, the user saves the virtual shower and uploads it to the control system or control panel to display on the electronic display. In this manner, the virtual shower is created by dragging and dropping elements into two-dimensional grids representing virtual walls, the virtual walls then being positioned or arranged relative to each other to create a representation of a three-dimensional shower. According to another exemplary embodiment, the walls are first positioned or arranged relative to each other to provide the representation of a three-dimensional representation, and then the elements are dragged and dropped into each wall of the representation.

Figure 28:
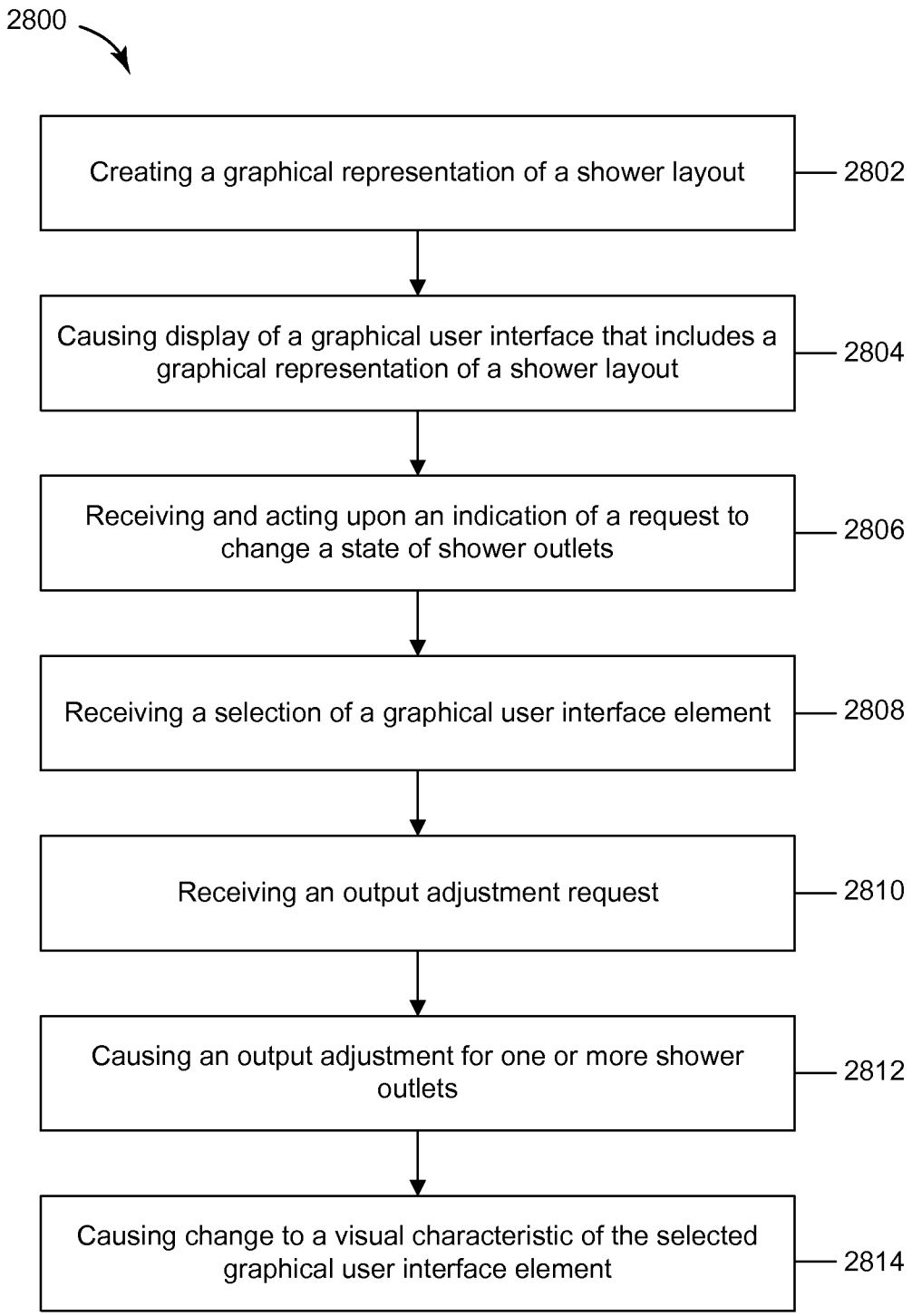
FIG. 28 is a flowchart of a process for controlling shower outlets through a graphical representation of a shower layout, according to an exemplary embodiment.

Referring now to FIG. 28, a process 2800 for controlling shower outlets is shown, according to an exemplary embodiment. Process 2800 is shown to include creating a graphical representation of a shower layout (step 2802). Step 2802 may include creating the shower outlet elements that represent water outlets 121-129, steam outlets 131, speakers 141, lighting elements 151, aromatherapy outlets 181, and/or any other type of shower outlet that may be included in shower enclosure 110. In some embodiments, step 2802 includes choosing graphical user interface elements according to corresponding types of shower outlets, (b) linking or associating the elements with physical shower outlets, and (c)

placing the elements according to the position of the shower outlets in the specific shower. Step 2802 may also include defining a number of virtual walls (i.e., graphical representations of walls in the physical shower), defining a size for each virtual wall (e.g., the number of positions for displaying an element, such as 5×1, 4×2, or defining dimensions (e.g., 3"×2"), or providing other graphics indicative of physical features in the specific shower (e.g., outlining walls, highlighting walls, coloring walls, providing lines to indicate corners). In some embodiments, step 2802 includes using one or more photographs of the specific shower, or of another physical shower, creating hot spots (i.e., portions of the screen to act as soft keys to receive user input), and linking the hot spots to corresponding shower outlets.

Process 2800 is shown to include causing display of a graphical user interface that includes a graphical representation of a shower layout (step 2804) and receiving and acting upon an indication of a request to change a state of the shower outlets (step 2806). Step 2804 may include displaying the virtual shower 2510 on the electronic display 161 in FIG. 1. The graphical representation of shower outlets may include, for example, graphical user interface elements that are associated with one or more of the shower outlets. The shower outlets may include any of the shower outlets or devices located within shower enclosure 110. The indication of a request to change a state of the shower outlets may, for example, be a user input (e.g., through the hard keys or electronic display), or be generated internally by the control system according to various software and in response to other inputs (e.g., from software modules or shower systems). The acting upon an indication of a request may, for example, include processing the request and/or sending a signal (e.g., to the display or shower systems).

Process 2800 is shown to include receiving a selection of one of the graphical user interface elements (step 2808), receiving an output adjustment request for the selected graphical user interface element (step 2810), and causing an output adjustment for the one or more shower outlets associated with the selected graphical user interface element (step 2812). The selection may be a user input (e.g., a user touching the graphical user interface element on the electronic display 161 of FIG. 1 associated with the shower outlets the user wishes to control). The output adjustment request may, for example, be changing the temperature or flow of water through the shower outlets associated with the selected graphical user interface element.

Process 2800 is shown to include causing a change to a visual characteristic of the selected graphical user interface element (step 2814). This change, for example, may be a change of the shading or background of the graphical user interface element to indicate a change in water flow through the shower outlet associated with the selected graphical user interface element.

5. Shower Outlet Zones

Figure 29:
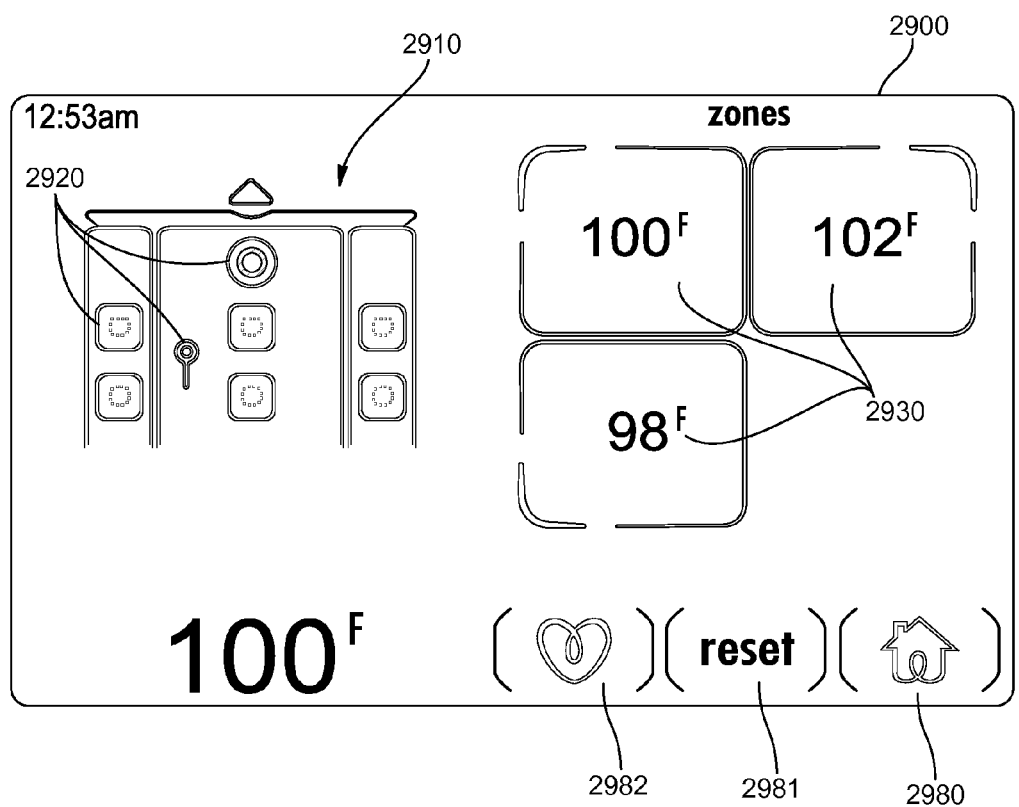
FIG. 29 is an illustration of a temperature zone control screen, according to an exemplary embodiment.

Now referring to FIG. 29, a user interface 2900 for controlling shower outlet zones is shown, according to an exemplary embodiment. Interface 2900 may be used to identify shower outlets that are part of the same controllable zone (e.g., water outlets for which temperature can or must be changed as a group) and to collectively adjust an output condition for a controllable zone of shower outlets. Interface 2900 allows a user to interact with a temperature zone program module and may be displayed in response to selecting soft key element 2533 in FIG. 25. Interface 2900 may allow a user to separately control the temperature of a number of digital valves (e.g., 1-4) with each digital valve being coupled to one or more shower outlets (e.g., 1-8). In this manner, the temperature of the shower outlets connected to an individual digital valve may be controlled collectively with each other and independently of those shower outlets connected to a different digital valve.

Interface 2900 is shown displaying a virtual shower 2910 including elements 2920 representing shower outlets and a group of elements 2930 representing temperature zones. Each zone element 2930 corresponds to a group of elements representing shower outlets whose output conditions are changed collectively. In some embodiments, each zone element 2930 has a visual characteristic that corresponds to a visual characteristic of its associated elements representing shower outlets. The visual characteristic for the zone element 2930 and shower outlet elements, for example, may be the same (i.e., matched), such as having a common color, pattern, background, or shading. In this manner, the graphical user interface indicates to the user which shower outlets are grouped together to have their temperatures changed collectively.

In some embodiments, when the user selects a temperature zone element 2930, the selection is also indicated on the corresponding shower outlet elements. For example, the elements may be highlighted, brightened, outlined, or increased in size. The user may then change the temperature of the group of shower outlets corresponding to the selected zone element 2930, for example, by pressing hard keys or soft keys that may be provided in the graphical user interface.

In some embodiments, each temperature zone element 2930 may also display an indication of water temperature. According to an exemplary embodiment, each zone element 2930 displays alphanumeric text indicating temperature (e.g., "100° F."). In other embodiments, the indicator is a dial, a slider, or any other graphic capable of indicating temperature. In some embodiments, the indicator may be interactive, such that the user may move a part of the icon or perform a gesture for changing the icon (e.g., rotating a dial, moving a slider, etc.).

Zone elements 2930 may be provided for any group of shower outlets having a common physical characteristic, such as being coupled to the same outlet valve, being of a common type (e.g., shower head, body spray, handshower, steam, lighting, aromatherapy, etc.), being disposed in a common position (e.g., wall, height), or common flow (e.g., high pressure, low pressure, no flow, pulsating flow). The zone element 2930 associated with each group may also include a visual characteristic corresponding to a visual characteristic of the shower outlet elements, such as common shape, color, background, or shading. Grouping based on physical characteristic may be dictated by the physical arrangement of the shower outlets (e.g., common valve, placement on wall or at a certain height), or may be user defined (e.g., all shower outlets having pulsating flow, all body sprays).

In some embodiments, interface 2900 includes additional soft keys. For example, a soft key 2980 may be provided to return to the home screen 2562. Soft key 2981 may be provided to reset or undo any changes the user may have made. Soft key 2982 may also be provided for the user to save the current temperature zone configuration. Other combinations of additional soft keys may be provided, for example, including more or fewer soft keys, soft keys with different functions, and/or soft keys with different visual characteristics.

Figure 30:
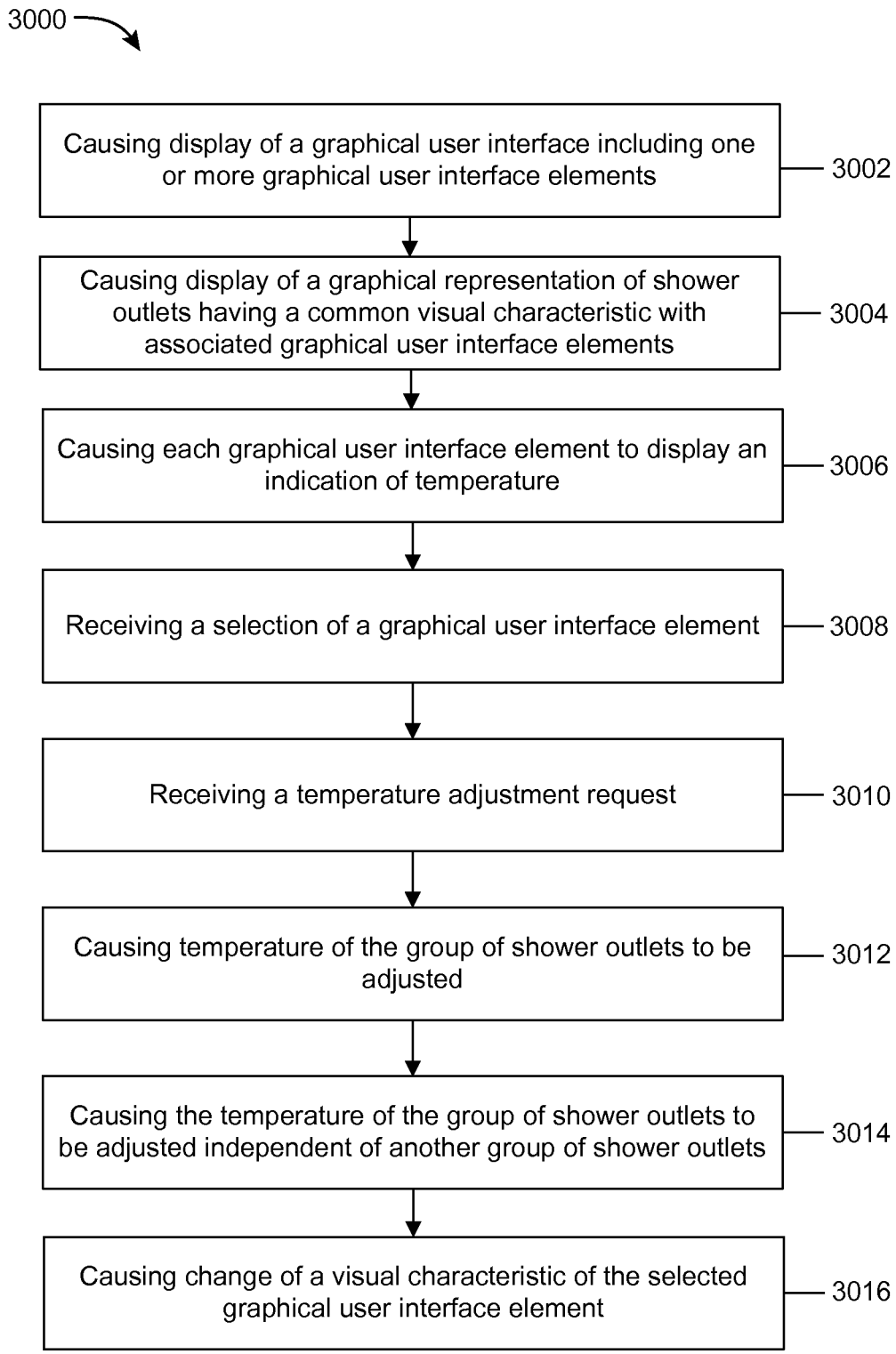
FIG. 30 is a flowchart of a process for controlling shower outlets through a temperature zone module, according to an exemplary embodiment.

Referring now to FIG. 30, a process 3000 for controlling shower outlets is shown, according to an exemplary embodiment. Process 3000 is shown to include causing display of a graphical user interface including a plurality of graphical user interface elements (step 3002). The graphical user interface elements may include, for example, the elements 2930 shown in FIG. 29. Each graphical user interface element may be associated with a group of shower outlets (e.g., groups of water outlets 121-129, steam outlets 131, speakers 141, lighting elements 151, aromatherapy outlets 181, etc.).

Process 3000 is shown to include causing display of a graphical representation of shower outlets associated with the graphical user interface elements (step 3004) and causing each graphical user interface element to display an indication of temperature of its associated group of shower outlets (step 3006). The graphical representation may have a common visual characteristic with the graphical user interface elements. The common visual characteristic may include, for example, color, shading, background, or highlighting. The indication of temperature may include the alphanumeric text of elements 2930 shown in FIG. 29. The indication of temperature may, for example, include alphanumeric text (e.g., a written label such as "100° F."), graphics (e.g., a dial, slider, or thermometer), or any combination thereof.

Process 3000 is shown to include receiving a selection of one of the graphical user interface elements (step 3008), receiving a temperature adjustment request for the selected graphical user interface elements (step 3010), and causing temperature of the group of shower outlets to be adjusted in response to the receive temperature adjustment (step 3012). The selection and temperature adjustment request may, for example, be received from the user (e.g., through the hard keys or electronic display). Causing a temperature adjustment may, for example, include sending a signal to a digital valve to adjust intake of hot and cold water. In some embodiments, process 3000 includes causing the temperature of the group of shower outlets to be adjusted independent of another group of shower outlets (step 3014).

Process 3000 is shown to include causing change of a visual characteristic of the selected graphical user interface element (step 3016). Change of a visual characteristic may, for example, include changing color, size, brightness, shading, or background of the graphical user interface element to indicate selection or changing the alphanumeric text, moving the graphics (e.g., turning the dial, moving the slider or thermometer) to indicate a change in temperature.

6. Multidimensional Temperature Profiles

Figure 31:
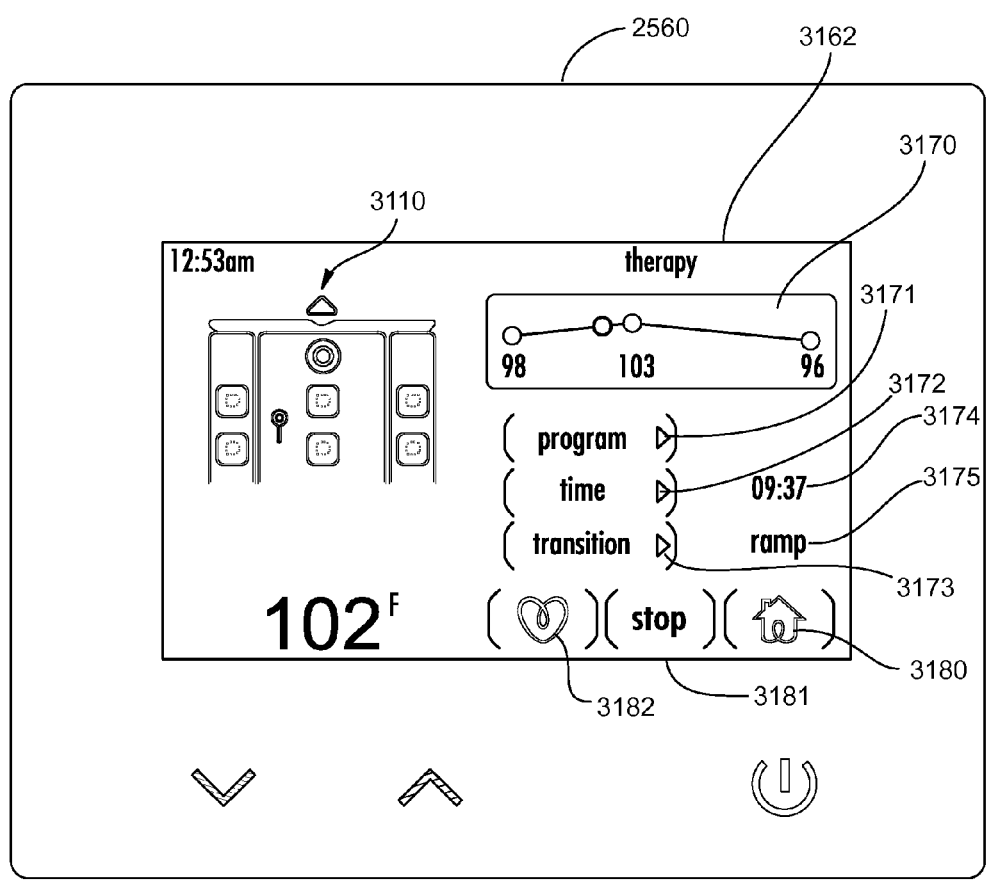
FIG. 31 is an illustration of a temperature therapy control screen, according to an exemplary embodiment.
Figure 32:
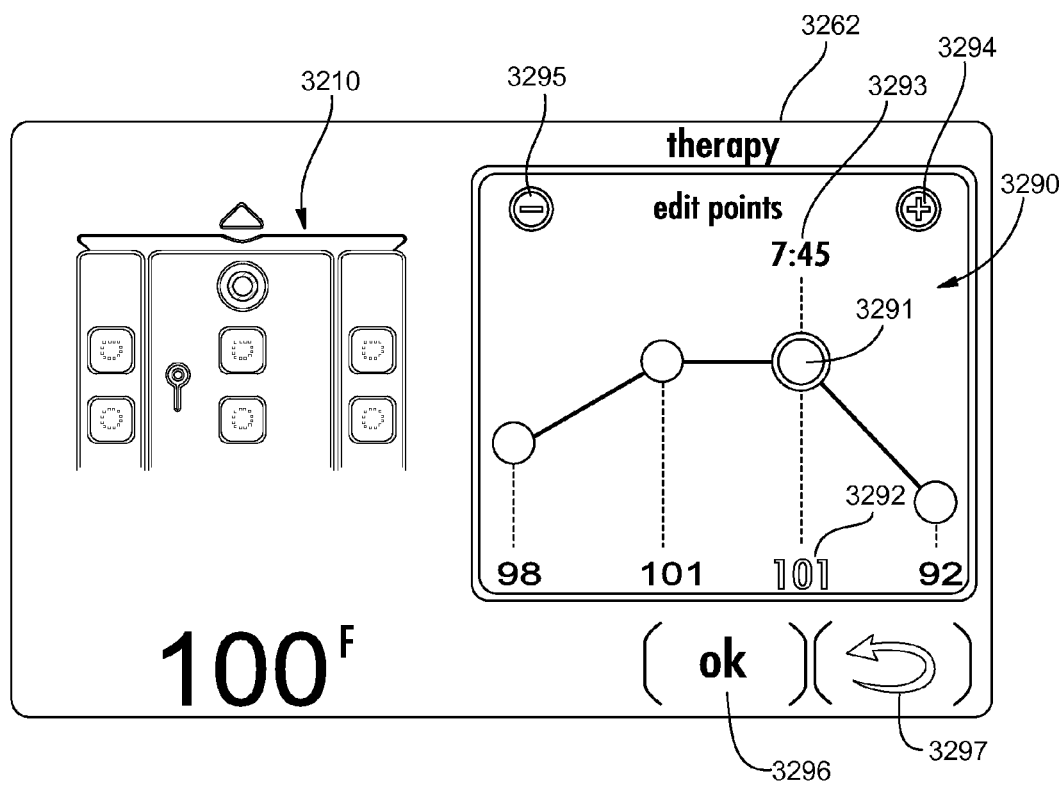
FIG. 32 is an illustration of a screen for modifying a temperature profile, according to an exemplary embodiment.

Referring now to FIGS. 31-32, a user interface 3162 for constructing a customized temperature profile is shown, according to an exemplary embodiment. Interface 3162 facilitates user interactions with a temperature therapy program module and may be displayed in response to selecting soft key element 2532 in FIG. 25. Interface 3162 allows a user to construct a customized multidimensional temperature profile for a desired duration of a shower. For instance, interface 3162 enables the user to input and/or edit the desired duration of a shower and then create a temperature profile that can increase and/or decrease the water temperature at specified times determined by the user. The user can interact with interface 3162 to adjust the details of the temperature profile to provide temperatures in any desired pattern. For example, a user may program a steady increase or decrease in temperature between two user inputted temperature points, a user may request an increase in temperature, followed by a sharp decrease, such as is typically employed by European spas, the user may program a modulating temperature that fluctuates between hot and cold like the hills of a roller coaster, and/or any other desirable pattern profile. In some embodiments, different temperature therapy profiles may be provided for different groups of shower outlets. In other embodiments, one temperature profile is provided for all groups of active shower outlets.

Referring particularly to FIG. 31, control panel 2560 is shown displaying a temperature therapy control interface 3162. The temperature therapy control interface 3162 includes graphical user interface elements related to temperature therapy controls, including a temperature profile element 3170, a program selection element 3171, a time selection element 3172, and a transition element 3173. The temperature profile element 3170 depicts the temperature profile for the profile selected, generally showing a series of temperature points connected by lines and numeric temperature labels for one or more temperature points. The temperature points may, for example, be displayed in positions relative to intersecting axes (e.g., a time axis and a temperature axis) of the temperature profile to indicate relative temperature and time of the temperature points. The program selection, time selection, and transition elements 3171, 3172, 3173 are each labeled by alphanumeric characters. The temperature therapy control screen 3162 also includes a series of soft keys related to broader control panel functions, including a home screen element 3180 depicting a house, a play/stop element 3181 displaying either the word "play" or "stop," and a "save" element 3182 depicting a heart.

Interface 3162 may be used to edit existing temperature profiles and/or to create a new temperature profile. To recall a saved temperature profile to run, the user may select the program selection element 3171. A list of saved temperature profiles will appear, which may be represented, for example, by elements depicting a temperature profile, elements having other designs, a series of alphanumeric characters, or a combination thereof. The user may then select a desired temperature profile by pressing on the appropriate element. To play a saved profile or stop a running profile, the user then presses the "stop"/"play" soft key element 3181. While a saved temperature profile is running, the time remaining 3174 in the temperature profile will be displayed next to the time selection element 3172. Additionally, the temperature profile element 3170 may indicate where in the temperature profile the user is, such as by a vertical line that moves horizontally across the temperature profile. To create a new temperature profile, the user may select the temperature profile element 3170, which causes an edit points interface 3262 to appear.

Referring now to FIG. 32, the edit points interface 3262 is shown, according to an exemplary embodiment. Interface 3262 is shown to include a virtual shower 3210 and a temperature profile 3290. Temperature profile 3290 is shown as a multidimensional profile having a first axis or dimension representing time (e.g., the horizontal axis) and a second axis or dimension representing temperature. Temperature profile 3290 includes multiple points 3291, each point having a time attribute and a temperature attribute. The temperature points 3291 are positioned in temperature profile 3290 according to the temperature attribute and time attribute of each temperature point 3291. For example, the horizontal position of each point 3291 may represent the time attribute of the point, whereas the vertical position of each point 3291 may represent the temperature attribute of the point.

In some embodiments, temperature profile 3290 represents a stored spa experience. Each point 3291 may represent a beginning and/or end of a particular stage of the spa experience, with the time between points 3291 defining the duration of the stage. The lines connecting points 3291 may represent the behavior of the controlled shower subsystem (e.g., water, steam, etc.) during that stage of the spa experience. For example, a line with a positive slope connecting two temperature points 3291 may indicate that the temperature of the water or steam output increases (e.g., ramps up) from a first temperature to a second temperature during that stage of the spa experience. The first temperature may be defined by the temperature attribute of the point 3291 at the beginning of the stage, whereas the second temperature may be defined by the temperature attribute of the point 3291 at the end of the stage. A horizontal line connecting two temperature points 3291 may indicate that the temperature is held constant during that stage of the spa experience. A line with a negative slope connecting two temperature points 3291 may indicate that the temperature of the water or steam output decreases (e.g., ramps down) from a first temperature to a second temperature during that stage of the spa experience.

The user may change the temperature of a particular point 3291 by touching and sliding the point up or down, the specific temperature being indicated by temperature label 3292 in alphanumeric characters. The user may change the time position of a particular point by touching and sliding the point left or right, the specific time being indicated by a time label 3293 in alphanumeric characters. According to other exemplary embodiments, the points may instead be moved by the user in other manners. For example, the user may touch a point 3291 to select it, the point 3291 then appearing larger and/or brighter than non-selected points. Hard keys and/or additional soft keys, corresponding to increases and decreases in temperature or time, may then be pressed or touched by the user.

In some embodiments, the user may select the number of temperature points 3291 to be included in the temperature profile 3290. The edit points interface 3262 may include an add point soft key 3294 including a plus sign icon (i.e., "+") and a delete point soft key 3295 including a minus sign icon (i.e., "−"), which the user may touch to add or delete points between two end points. In some embodiments, the user may choose between two and five points. In other embodiments, the user may choose more than five points.

In some embodiments, the edit points interface 3262 includes an "ok" soft key 3296, which, when touched by the user, saves the displayed temperature profile and returns the graphical user interface to the temperature therapy control screen. The edit points interface 3262 may also provide a "return" soft key 3297 depicting a curved arrow, which when touched by user, returns the graphical user interface to the temperature profile control interface 3162 without changing the temperature profile.

In some embodiments, the user may determine the total time duration of a temperature profile. Referring again to FIG. 31, when the user touches the time selection icon 3172, the user may then select a desired profile time. For example, a list of incremental times may appear, and the user may select a desired time duration by touching the corresponding time listed. According to another example, a digital clock will appear, and the user may press hard keys or soft keys, which are representative of positive or negative changes in time (e.g., with arrows or plus and minus signs), until the desired time duration is reached. The user may then return to the graphical user interface to the temperature therapy control screen, for example, by pressing the digital clock or an "ok" soft key that may be provided.

In some embodiments, the user may also determine the temperature transition between nodes. Referring again to FIG. 31, when the user touches the transition icon 3173, the user may then select a desired transition. For example, a list of transitions may appear, such as "ramp" indicating a gradual transition or "step" indicating an abrupt transition. The user then touches the desired transition and a transition label 3175 appears next to the transition icon 3173.

In some embodiments, the user may save custom temperature profiles. Once the user has set each desired parameter (e.g., number of nodes, nodes time and temperature positions, and transitions), the user touches the save element 3182 to save the temperature profile into memory. The user may then be prompted to label the temperature profile, such as with an icon or alphanumeric, so that the saved temperature profile may be later recalled and run again.

In some embodiments, each temperature profile 3290 corresponds to the output from a particular shower outlet or group of shower outlets (e.g., a subset of water outlets 121-129, steam outlets 131, etc.) during a spa experience. Different groups of shower outlets may have different temperature profiles 3290 for a given spa experience. Different spa experiences may have different temperature profiles 3290 for the same group of shower outlets. When a spa experience is performed, the controller 260 may cause the shower subsystems (e.g., the water subsystem, the steam subsystem, etc.) to simultaneously provide outputs defined by the various temperature profiles 3290 associated with the spa experience. In other words, multiple temperature profiles 3290 may be executed concurrently by controller 260 to simultaneously provide different outputs from different groups of shower outlets during the spa experience. Alternatively, in some embodiments, a single temperature profile 3290 may be applied to the entire shower system (e.g., all shower outlets).

In some embodiments, controller 260 is configured to cause control panel 160 to display multiple temperature profiles simultaneously. For example, when a spa experience is selected, all of the temperature profiles 3290 associated with the selected spa experience may be displayed on the same screen. In other embodiments, each temperature profile 3290 may be displayed individually (e.g., in response to a user selecting a group of shower outlets).

Figure 33:
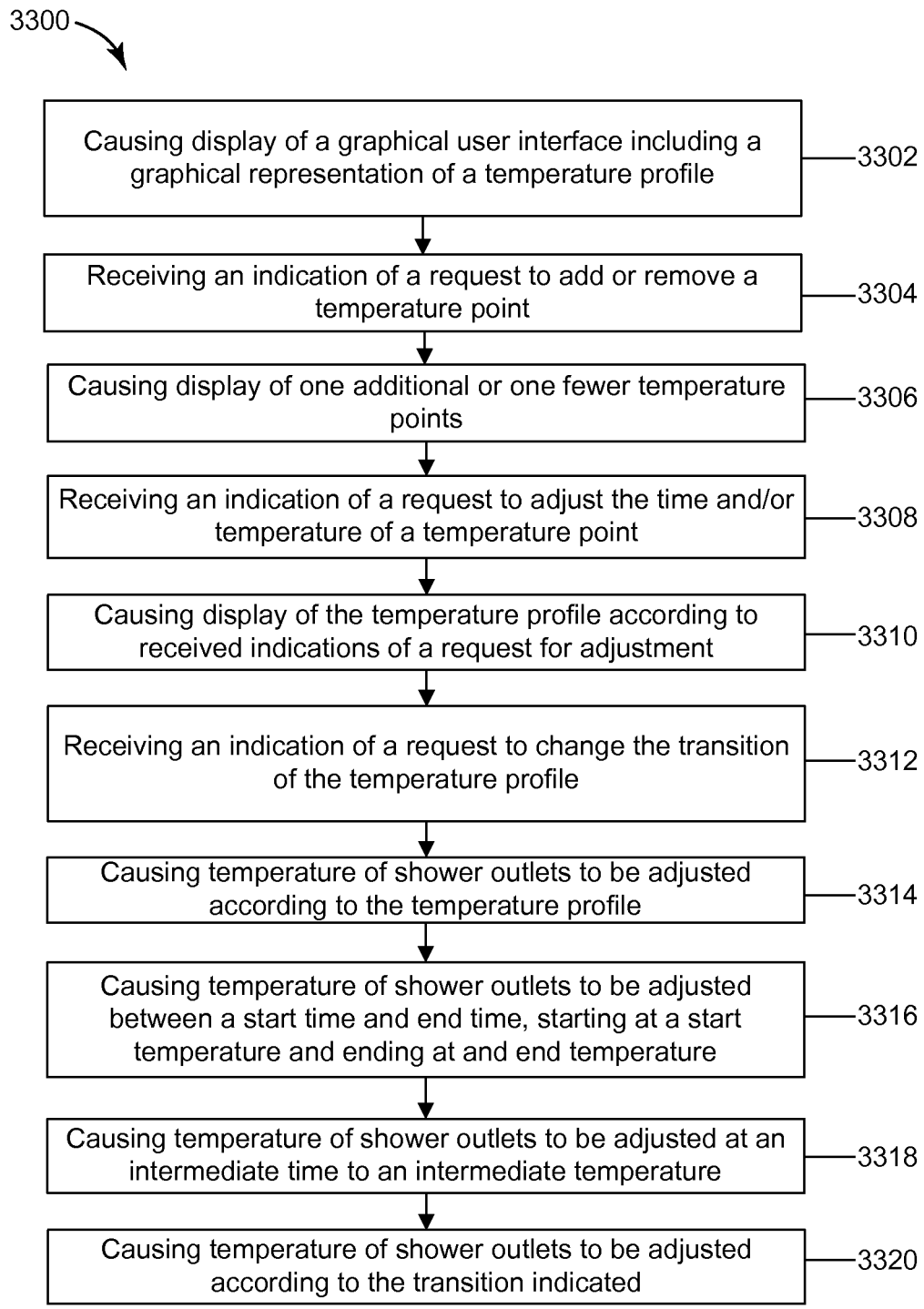
FIG. 33 is a flowchart of a process for controlling shower outlets through a temperature therapy module, according to an exemplary embodiment.

Referring now to FIG. 33, a process 3300 for controlling shower outlets is shown, according to an exemplary embodiment. Process 3300 is shown to include causing display of a graphical user interface including a graphical representation of a temperature profile (step 3302). The temperature profile includes at least two temperature points that are adjustable in time and temperature (e.g., the temperature points may be start and end temperature points, each with a temperature, a duration of time between them, and the temperatures and duration being adjustable). An exemplary graphical representation of a temperature profile is shown as element 3170 in FIG. 31, which may be displayed on the electronic display 161 of FIG. 1.

Process 3300 is shown to include receiving an indication of a request to add or remove a temperature point (e.g., the temperature point 3291) (step 3304) and causing display of one additional or one fewer temperature points (step 3306). The request may, for example, be user-specified and received through the hard keys or electronic display of the control panel. The user may, for example, request that the number of temperature points be increased from two to three temperature points or decreased from four to three temperature points.

Process 3300 is shown to include receiving an indication of a request to adjust the time and/or temperature of a temperature point (e.g., by touching the add or remove node soft keys 3294, 3295) (step 3308). The method may also include causing display of the temperature profile according to the requested adjustment of time or temperature (step 3310). The request may, for example, be user-specified and be received through the hard keys or electronic display of the control panel. The user may, for example, request that the total shower duration be increased, thus changing the time of an end point.

Process 3300 is shown to include receiving an indication of a request to change the transition for the temperature profile (e.g., by touching the transition icon 3173) (step 3312). The request may, for example, be user-specified and be received through the hard keys or electronic display of the control panel. The transition may, for example, be a ramp transition corresponding to a gradual change in temperature between two temperature points or be a step transition corresponding to an abrupt change in temperature between two temperature points.

Process 3300 is shown to include causing temperature of the shower outlets (e.g., water outlets 121-129, steam outlets 131, etc.) to be adjusted according to the temperature profile (step 3314). Causing temperature adjustment may, for example, sending a signal to a digital valve to adjust the proportionate mix of incoming hot and cold water. The adjustment of temperature may, for example, include adjusting between a start time and an end time, starting at a start temperature and ending at an end temperature (step 3316) The adjustment may, for example, also include adjusting to an intermediate temperature at an intermediate time between the start and end times (step 3318). The adjustment may, for example, also include adjusting the temperature gradually or abruptly according to the transition indication (step 3320).

In some embodiments, steps 3302-3320 may be performed in numerical order. In other embodiments, the steps may be performed in other orders, other combinations of steps, and other combinations of steps in other orders.

In some embodiments an experiences module is provided, which allows the user to save and recall a combination of settings for the shower systems and program modules. In the experience module, the user can select specific saved settings from each of the available individual systems or modules (e.g., temperature, steam, music, temperature therapy, etc.), and then save them together as one entire showering experience for later "playback." For example, a user can create a unique experience by combining a music playlist from the music module, a massage setting from the massage module, a steam setting from the steam module, and a lighting setting from the lighting module. The user can save the use of all of these settings together under one named experience and when the user initiates the experience, all of the settings will run to create a unique user defined shower event.

7. Spa Experience Selection

Figure 34:
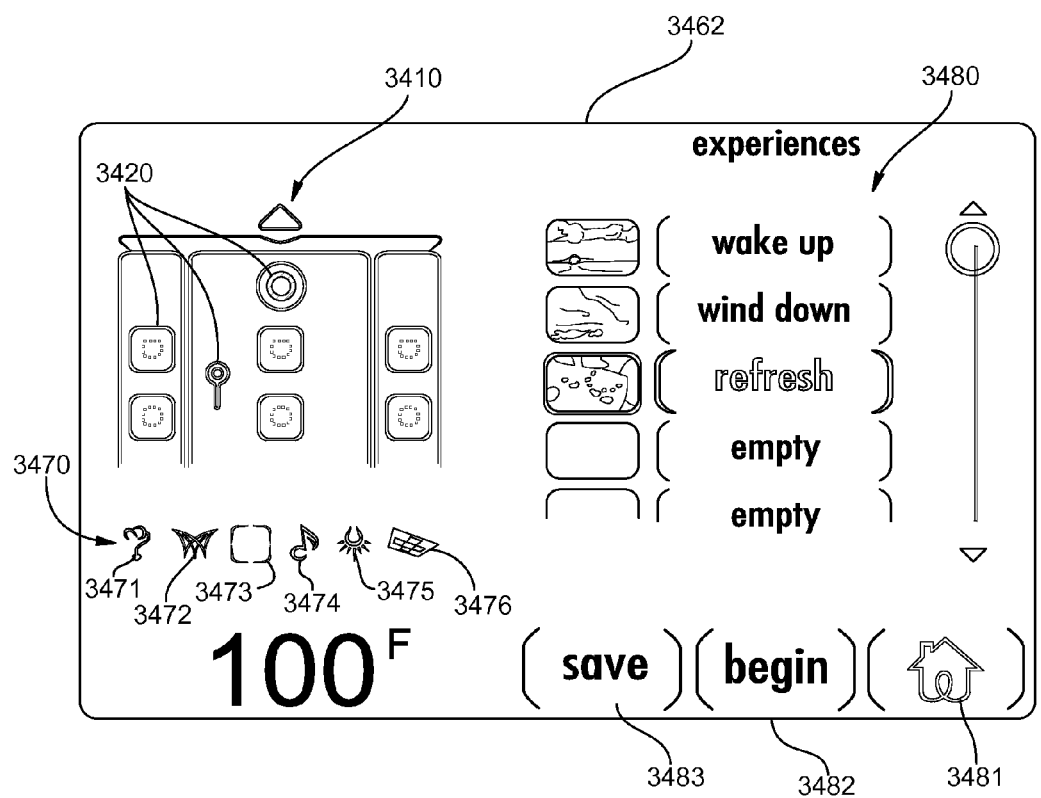
FIG. 34 is an illustration of a spa experiences control screen, according to an exemplary embodiment.

Referring now to FIG. 34, a spa experience control interface 3462 is shown, according to an exemplary embodiment. Interface 3462 may be displayed in response to selecting the experiences feature element 2534 from the home screen 2562. Interface 3462 is shown to include a group of elements 3480 representing saved experiences, each element 3480 including an icon and alphanumeric labels, a group of subsystem/module elements 3470, a group of control panel function icons, and a virtual shower 3410 including a group of shower outlet elements 3420.

A user may select a particular saved experience by touching the associated experience element 3480. Selection of a particular experience may be indicated, for example, by boldface alphanumeric text associated with the selected experience, brightened the text and/or elements, increased size of the text and/or elements, outlining of the text and/or element, or any combination thereof, or any other manner sufficient to visually indicate to the user that an experience is selected.

In some embodiments, when an experience is selected, a group of elements 3470 representing systems or modules are displayed for those systems or modules that are active in the selected experience. The system/module elements 3470 are configured to visually indicate to the user what system/module corresponds to each element 3470. For example, element 3471 represents the steam system and depicts a swirl rising from a lower point (i.e., indicative of steam rising from an outlet), element 3474 represents the music system and depicts a music note, element 3475 represents the lighting system and depicts a light bulb, and element 3476 depicts represents the ambient rain function and depicts a rain panel. Further, elements 3472, 3473 represent are indicative of, the massage module and temperature zone modules. By displaying system/module elements 3470 that are visually indicative of the systems and modules active for a given experience, the user may quickly and intuitively determine which systems and modules will be turned on for each experience. For example, the user may quickly scroll through each saved experience until finding an experience that includes a desired combination of systems or modules.

In some embodiments, when an experience is selected, the experiences control interface 3462 also displays a virtual shower 3410 to indicate for each experience which shower outlets are active and their respective temperature zone. By displaying the virtual shower 3410, including elements 3420 representing shower outlets according to the manner described above, the user may quickly and intuitively determine for each experience which corresponding physical shower outlets are active. Further, by displaying the system and module elements 3470 and the virtual shower 3410, the user may quickly and intuitively determine for each experience which systems and modules are active and which shower outlets are active.

In some embodiments, when an experience is selected, the user may start the experience by touching the "begin" soft key 3482. A running experience may be stopped for example, by pressing the "power" hard key, or a "stop" soft key that may be provided in place of the "begin" soft key 3482. Or, the user may select a different experience by touching its associated element 3480 and pressing the "begin" soft key 3482. The user may also return to the home screen by pressing the home soft key 3481, which depicts a house.

Figure 35:
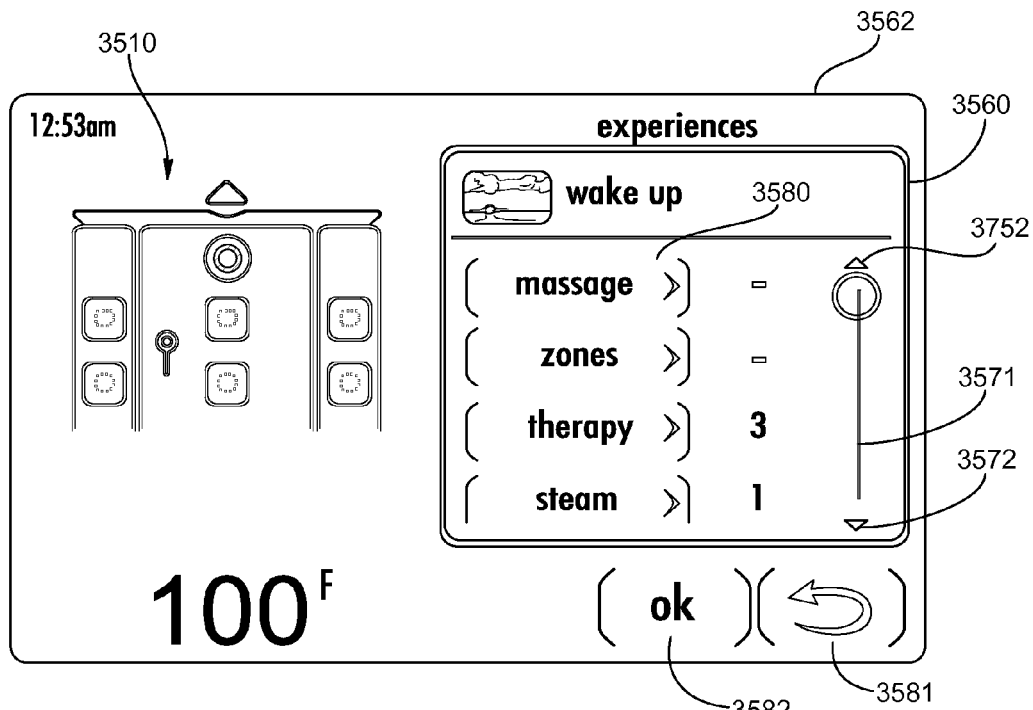
FIG. 35 is an illustration of a screen for selecting systems or modules for the spa experiences control screen, according to an exemplary embodiment.

Referring now to FIG. 35, an experience edit user interface 3562 is shown, according to an exemplary embodiment. Interface 3562 may be displayed in response to selecting the "edit"/"save" soft key 3483 via interface 3462. Alternatively, the user may similarly create a new experience by selecting an "empty" experience element and touching the "edit"/"save" soft key 3483. The experience edit interface 3562 allows a user to compile a series or combination of stored, programmable instructions to create a comprehensive shower experience. For instance, the experience edit interface 3562 displays a menu 3560 including shower systems and program modules to allow the user to create and/or control a variety of different parameters related to the shower systems or modules, such as music, temperature zones, temperature therapy, lighting, steam, massage, or any other suitable parameter. Each system or module is indicated in the menu 3560 by a graphical user interface element that includes an alphanumeric label (e.g., "music," "steam") and/or a graphical image, which the user may select by touching the respective element. The menu may also include a scroll bar 3571 and navigation keys 3572 for navigating the menu to reveal other system/program elements. The experience edit interface 3562 may also display the virtual shower 3510.

Figure 36:
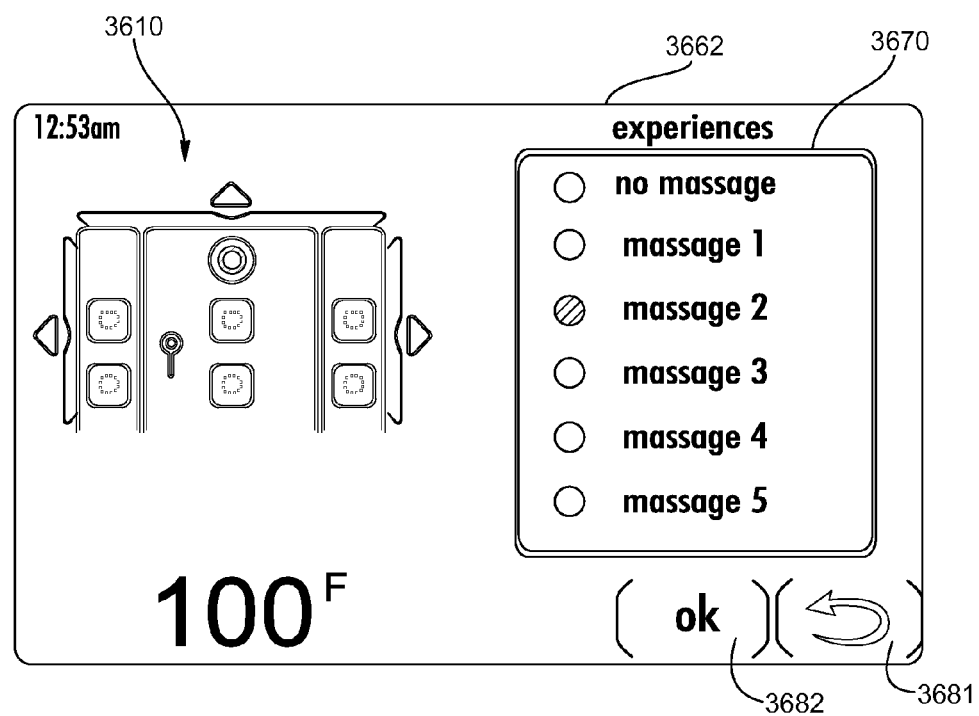
FIG. 36 is an illustration of a screen for selecting a setting for a system or module, according to an exemplary embodiment.

Referring now to FIG. 36, a system or module setting selection interface 3662 is shown, according to an exemplary embodiment. Interface 3662 may be displayed in response to selecting a system/feature module via interface 3562. In some embodiments, interface 3662 includes a menu 3670 that provides the user the ability to save individual settings into an experience, each system or program setting being indicated by an alphanumeric label, a graphical icon, or both. The system or program settings may be pre-programmed (i.e., provided by the manufacturer), or may be user-created, such as within the control screen for the respective system or module. The user may then select a desired setting by pressing the corresponding element in the menu 3670, the selection being indicated, for example, by brightening, highlighting, outlining, or any combination thereof. Once the desired setting is selected, the user may save the setting to the experience by touching the "ok" soft key 3682, or the user may press the "return" key 3681 to return to the experience edit screen without changing the system or program setting for that experience. The graphical user interface then displays the experience edit screen 3562 with a label or figure corresponding to the selected setting next to the system or module 3580 element in the menu 3560.

For example, in the example illustrated in FIG. 34, the user may edit a "wake up" experience profile by selecting the corresponding experience element 3480. The user may then select the massage module, causing the graphical user interface to display a massage setting select screen 3662 that allows the user to select a massage setting. The setting select interface 3662 also depicts a virtual shower 3610. The user may, for example, select to include a "massage 2" setting, such selection being indicated by highlighting, and then press the "ok" soft key 3682 to save the massage setting to the experience and return to the experience edit screen 3562. The user may also edit the "wake up" experience by selecting a setting temperature therapy (e.g., "therapy 3") and for steam (e.g. "steam 1") from the module select screens for the respective module and steam setting select screens. In the experience edit interface 3562, the user then presses the "ok" key 3582 to save the experience, returning the graphical user interface to the experiences select screen 3462. The user may instead return to the experiences select interface 3462 by pressing the "return" soft key 3581 without saving settings. The user may then select the "wake up" experience, and press the "begin" to "playback" the experience.

According to other exemplary embodiments, other screens or tools may be provided in the graphical user interface to communicate information to the user and to receive user inputs. For example, other screens or tools may include pop up boxes, a wizard with series of questions, or other information to guide the user in configuring an experience.

Figure 37:
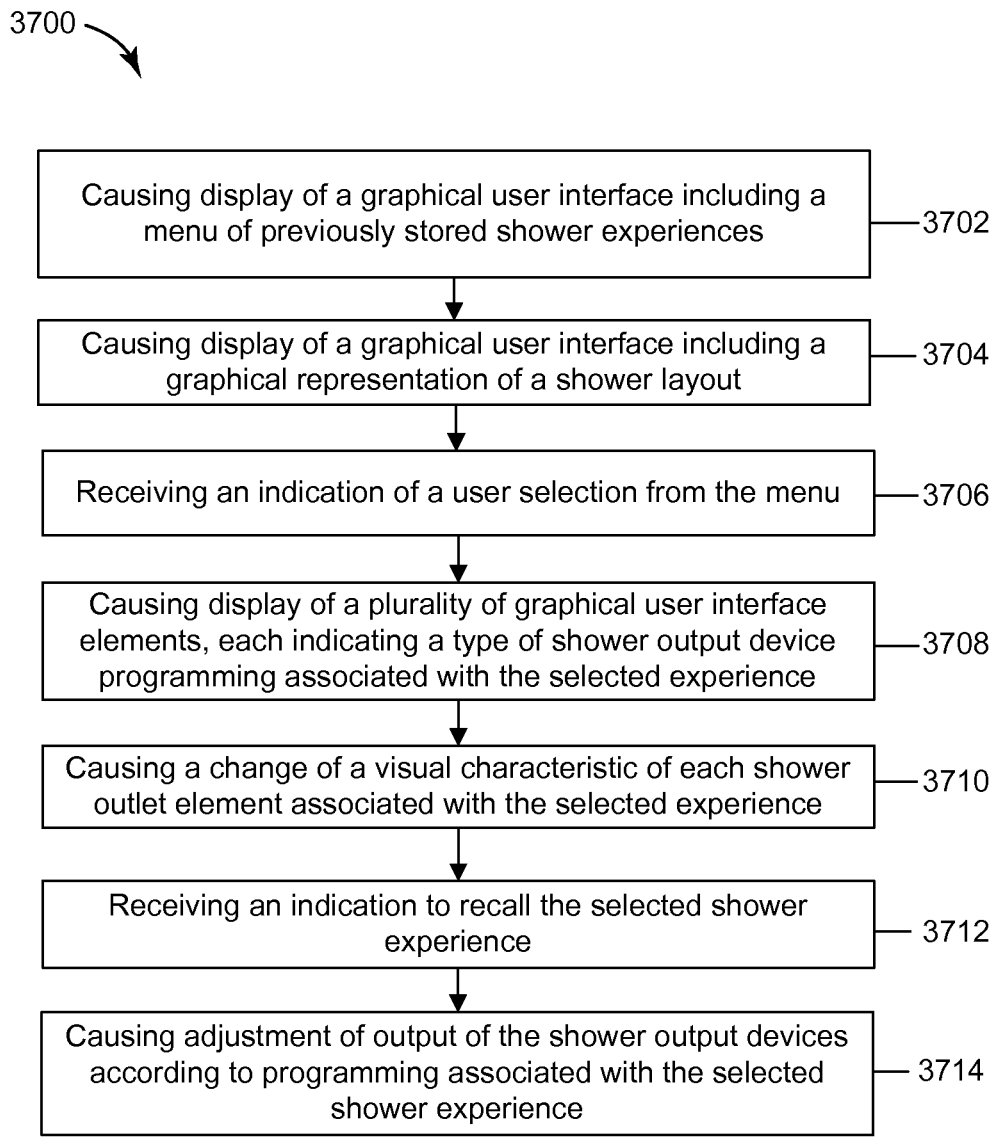
FIG. 37 is a flowchart of a process for controlling shower output devices through a spa experiences module, according to an exemplary embodiment.

Referring now to FIG. 37, a process 3700 for controlling a shower system is shown, according to an exemplary embodiment. Process 3700 is shown to include causing display of a graphical user interface including a menu of previously stored shower experiences (e.g., menu displayed on electronic display 161) (step 3702). The menu may, for example, include elements or alphanumeric text representing each previously stored shower experience. Each shower experience may, for example, include a plurality of user-specified settings for controlling output devices of the shower system.

In some embodiments, process 3700 includes causing display of a graphical user interface that comprises a graphical representation of a shower layout (e.g., virtual shower 3410) (step 3704). The graphical representation may, for example, be a virtual shower with shower outlet elements, the virtual shower and elements representative of a physical shower and shower outlets.

Process 3700 is shown to include receiving an indication of a user selection from the menu (step 3706) and causing display of a plurality of graphical user interface elements that each indicate a type of shower output device programming associated with the selected shower experience (e.g., the program/module elements 3471 representing steam, and 3472 representing massage) (step 3708). The indication may, for example, be user-specified and received through hard keys or the electronic display. The elements may, for example, only be displayed if a corresponding subsystem or module is active for the experience. The elements may, for example, include visual characteristics that are indicative of the type of programming it represents.

In some embodiments, process 3700 includes causing a change of a visual characteristic of each shower outlet element (e.g., elements 3420) that represents physical shower outlets associated with the selected shower experience (step 3710). Changing a visual characteristic may, for example, include changing shading of shower outlets that are active for the selected experience or changing color of shower outlets according to temperature zones that are active for the selected experience.

Process 3700 is shown to include receiving an indication to recall the selected shower experience (e.g., the "wake up" experience from menu 3480) (step 3712) and causing adjustment of output of the shower output devices (e.g., water outlets 121-129, steam outlets 131, speakers 141, lights 151, aromatherapy outlets 181, etc.) according to the programming associate with the selected shower experience (step 3714). The indication may, for example, be user-specified and received through the hard keys or electronic display. Causing adjustment may, for example, include sending signals to the various shower subsystems according to the programming. The adjustment of shower output devices may, for example, include sending signals to the various shower subsystems (e.g., water, steam, music, lighting, aromatherapy) to adjust output (e.g., turning on/off, changing temperature/volume, amount) from their output devices (e.g., water from shower outlets, steam from steam outlets, music from speakers, light from lights, etc.).

In some embodiments, the shower control system may limit the availability of modules to the user, such as to simplify a user's navigation and customization of shower settings. For example, when the user runs a temperature therapy profile, the temperature zone module may not be active. Accordingly, all shower outlets will have the same temperature. Conversely, when the user runs the temperature zone module, the temperature therapy module is inactive. Accordingly, temperatures will not be changed automatically according to a saved temperature profile. Those skilled in the art will recognize that other limitations may be provided on the availability of systems or modules, or that even more customization may be available to the user, within the scope of this disclosure.

8. Shower Control Systems with Network Features

Figure 38:
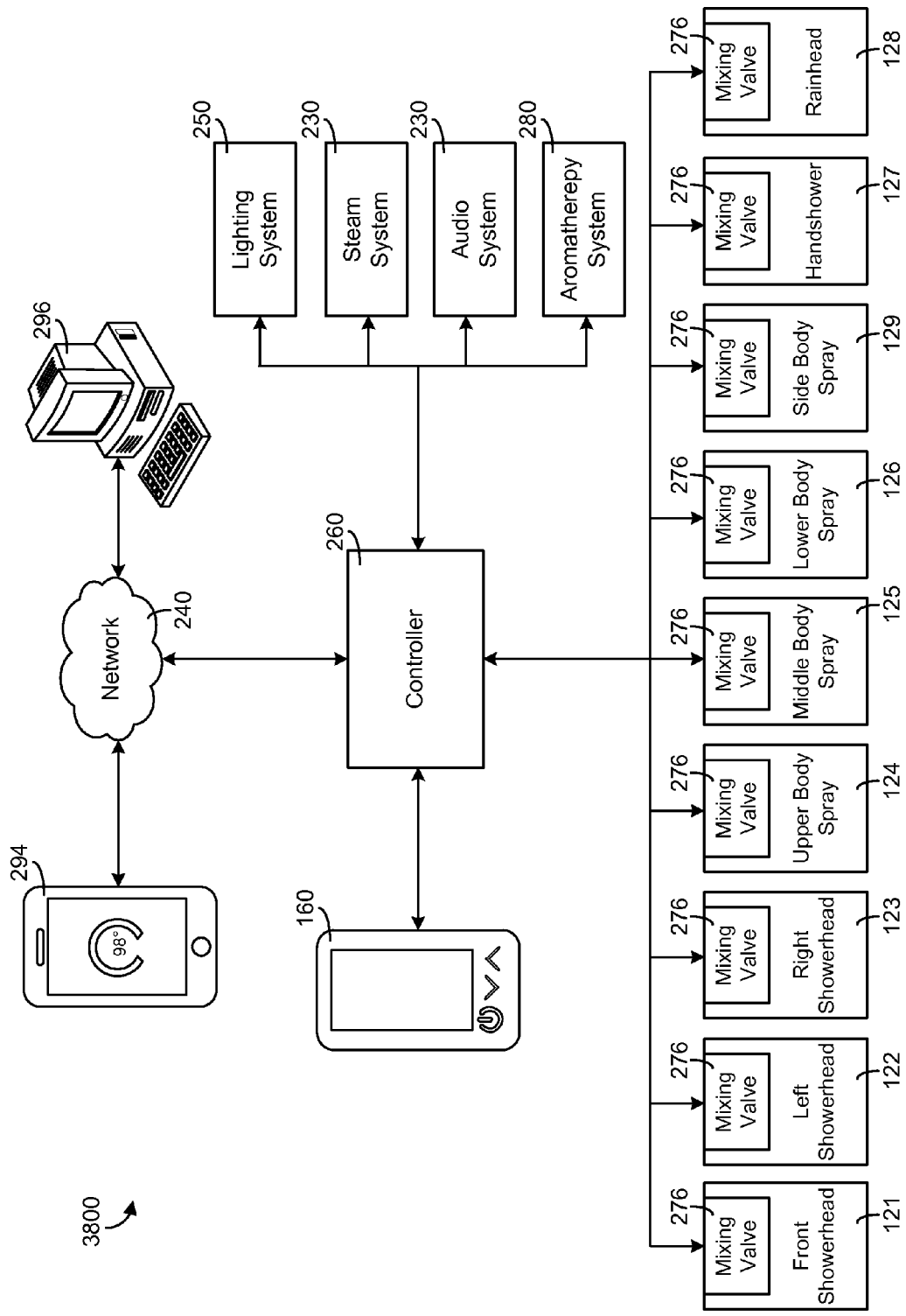
FIG. 38 is a block diagram of a shower control system including a central controller configured to monitor and control the shower output devices in the shower of FIG. 1, according to an exemplary embodiment.

Referring now to FIG. 38, a block diagram illustrating another shower control system 3800 is shown, according to an exemplary embodiment. Shower control system 3800 may be used to monitor and control a plurality water delivery devices (e.g., shower outlets 121-129) as well as other controllable devices that may be used therewith (e.g., steam outlets 131, speakers 141, lighting 151). In some embodiments, shower control system 3800 is used to monitor and control shower 100. For example, shower control system 3800 is shown to include a plurality of mixing valves 276, each of which is associated with one of shower outlets 121-129. Each mixing valve 276 may be configured to affect the temperature and/or flow rate of the water dispensed from the corresponding shower outlet. In some embodiments, mixing valves 276 are the same or similar to the mixing valves described in U.S. patent application Ser. No. 14/693,447, filed Apr. 22, 2015.

Mixing valves 276 may communicate with a controller 260 configured to monitor and control mixing valves 276. For example, mixing valves 276 may receive a control signal from controller 260 that causes mixing valves 276 to variably open or close to achieve a target water temperature and/or flow rate. In some embodiments, mixing valves 276 include temperature sensors and/or flow rate sensors configured to measure the temperature and/or flow rate of the water dispensed by each of mixing valves 276. In other embodiments, the sensors may be integrated with shower outlets 121-129 or otherwise located in shower control system 3800. The sensors may provide feedback to controller 260 regarding the temperatures and/or flow rates of the water dispensed by each of mixing valves 276. Controller 260 may use the feedback from the sensors in conjunction with one or more temperature and/or flow rate setpoints to determine an appropriate control signal for each of mixing valves 276. The communications between mixing valves 276, controller 260, and the sensors may be wired or wireless, and may use any of a variety of communications protocols.

Shower control system 3800 is shown to include a lighting system 250, a steam system 230, an audio system 240, and an aromatherapy system 280, which may be the same or similar as described with reference to FIG. 2. For example, lighting system 250 may include one or more lights 151 configured to selectively supply light into shower enclosure 110 (e.g., chromotherapy lights, ambient lights, rainhead lights, etc.). Lighting system 250 may also include various lights or lighting fixtures located in proximity to shower enclosure 110 (e.g., within the same room or zone) or separate from shower enclosure 110 (e.g., in a separate room or zone). Steam system 230 may include one or more steam generators configured to supply steam to steam outlets 131 within shower enclosure 110 and/or to other steam output devices. Audio system 240 may include a media player, an amplifier, and/or speakers. The speakers may be located within shower enclosure 110 (e.g., speakers 141) or otherwise located in proximity to shower enclosure 110 or in a different room or zone. Aromatherapy system 280 may include an aerial diffuser, heater, vaporizer, or other device configured to vaporize a stored aromatic substance and emit the aromatic vapor into shower enclosure 110. In some embodiments, the aromatic vapor is combined with the steam emitted via steam outlets 131.

Lighting system 250, steam system 230, audio system 240, and aromatherapy system 280 may communicate with controller 260 via a wired or wireless communications link. Controller 260 may provide control signals to lighting system 250, steam system 230, audio system 240, and aromatherapy system 280 to control the output devices thereof (e.g., lights, steam outlets, speakers, aerial diffusers, etc.). In various embodiments, controller 260 may communicate directly with the output devices of systems 230-280 or with one or more intermediate controllers (e.g., a lighting controller, a steam controller, a music controller, etc.) configured to control the output devices of one or more of systems 230-280.

In some embodiments, controller 260 communicates with control panel 160 via a wired or wireless communications link. Controller 260 may be configured to receive and process user inputs from control panel 160 and to control shower outlets 121-129, lighting system 250, steam system 230, audio system 240, and/or aromatherapy system 280 in accordance with the user inputs. For example, control panel 160 may present a user interface that allows a user to view and modify setpoints for mixing valves 276 (e.g., temperature setpoints, flow rate setpoints, etc.), to initiate or stop water flow from shower outlets 121-129 (e.g., individually or as one or more groups), to run a predefined sequence of water outputs from shower outlets 121-129, and/or to otherwise interact with or control shower outlets 121-129.

Control panel 160 and controller 260 may facilitate user interactions with lighting system 250, steam system 230, audio system 240, and aromatherapy system 280. For example, a user can provide inputs via control panel 160 to turn on or off lighting, initiate a chromotherapy sequence, or otherwise monitor and control lighting system 250. The user can provide inputs via control panel 160 to view and modify steam temperature setpoints, start or stop steam from steam outlets 131, or otherwise monitor and control steam system 230. The user can provide inputs via control panel 160 start or stop playback from speakers 141, select an audio source, increase or decrease audio volume, or otherwise monitor and control audio system 240. The user can provide inputs via control panel 160 to view and modify aromatherapy settings, start or stop aromatherapy outputs, or otherwise monitor and control aromatherapy system 280.

In some embodiments, control panel 160 provides a user interface that allows a user to select and initiate a spa experience. The spa experience may automatically operate one or more of mixing valves 276, lighting system 250, steam system 230, audio system 240, and aromatherapy system 280 using a predefined sequence of outputs to provide a multi-sensory user experience. Shower control system 3800 may be configured to generate and use any of the user interfaces described with reference to FIGS. 5-24. Several exemplary spa experiences which may be provided by shower control system 3800 are described in detail in U.S. Provisional Patent Application No. 61/934,811, filed Feb. 2, 2014.

In some embodiments, shower control system 3800 includes multiple control panels 160. Each of control panels 160 may be disposed at a different location (e.g., in shower 100, outside shower 100, in a different shower, etc.) for facilitating user interaction with shower control system 3800 at multiple different locations. Each control panel 160 may be associated with one or more discrete showers that can be controlled by shower control system 3800. For example, the showers may be located in different rooms within the same house, hotel, apartment complex, hospital, or the like. An instance of control panel 160 may be located proximate to each of the showers to allow user control over the corresponding shower and devices thereof (e.g., valves 276, lighting system 250, steam system 230, audio system 240, etc.). For example, a control panel 160 within a particular hotel room may allow a user to control the devices within that hotel room.

In some embodiments, each instance of control panel 160 is associated with a corresponding instance of controller 260. For example, one instance of controller 260 may control the devices within a particular room, whereas another instance of controller 260 may control the devices within another room. In other embodiments, controller 260 is a centralized controller that receives and processes inputs from multiple control panels 160. A centralized controller 260 may control the devices within multiple different rooms or zones based on the user inputs provided via the control panel(s) 160 for that room or zone.

In various embodiments, controller 260 may be integrated with one or more of control panels 160 or separate from control panels 160. Controller 260 may receive input from control panels 160 and may control the user interfaces provided via electronic display 161. Controller 260 processes user inputs received at control panels 160 (e.g., user inputs received via a touchscreen, buttons, switches, or other user input devices of control panel 160) and provides control outputs to valves 276, lighting system 250, steam system 230, and audio system 240 based on the user inputs.

In some embodiments, controller 260 is connected to a network 290 (e.g., a LAN, a WAN, a WiFi network, the Internet, a cellular network, etc.) configured to facilitate interactions with controller 260. For example, a user can communicate with controller 260 via network 290 using any of a variety of mobile devices 294 (e.g., a laptop computer, a tablet, a smart phone, etc.) or non-mobile devices 296 (e.g., a desktop computer, a workstation, a server, etc.). Communications via network 290 may allow a user to view and modify various configuration settings stored within controller 260 (e.g., valve configuration settings, network configuration settings, water outlet configuration settings, flush cycles, etc.) and to receive information from controller 260 (e.g., usage information, log data, etc.). In some embodiments, communications via network 290 can be used to actively control the outputs from various devices (e.g., starting and stopping water flow, adjusting setpoints, turning on/off lighting, steam, audio, aromatherapy, etc.).

In some embodiments, the user interface presented via control panel 160 also allows the user to view and modify configuration settings, and to retrieve information from controller 260. The user interactivity options available via control panel 160 may include some or all of the operations that can be performed via network 290. In some embodiments, the user interactivity options available via control panel 160 are limited to a subset of the operations available via network 290. For example, a system administrator may configure each control panel 160 to allow a user to control a set of devices without allowing the user to modify configuration settings. The options available to a user via control panel 160 may be defined by configuration parameters stored within controller 260, which can be modified via network 290.

In some embodiments, controller 260 is configured to receive updates via network 290. For example, controller 260 may be configured to receive firmware updates, software updates, configuration updates, or other updates from a remote server (e.g., from the system manufacturer) or other network data source (e.g., a networked user device). In various embodiments, controller 260 may be configured to check for and download updates periodically or may receive pushed updates from a remote data source when the updates become available. Advantageously, updating controller 260 via network 290 allows for new and improved spa experiences, user interfaces, and/or other features to be provided to multiple controllers 260 in an automated manner. Controller 260 can then install the updates to make the new and improved features available to a user.

Figure 39:
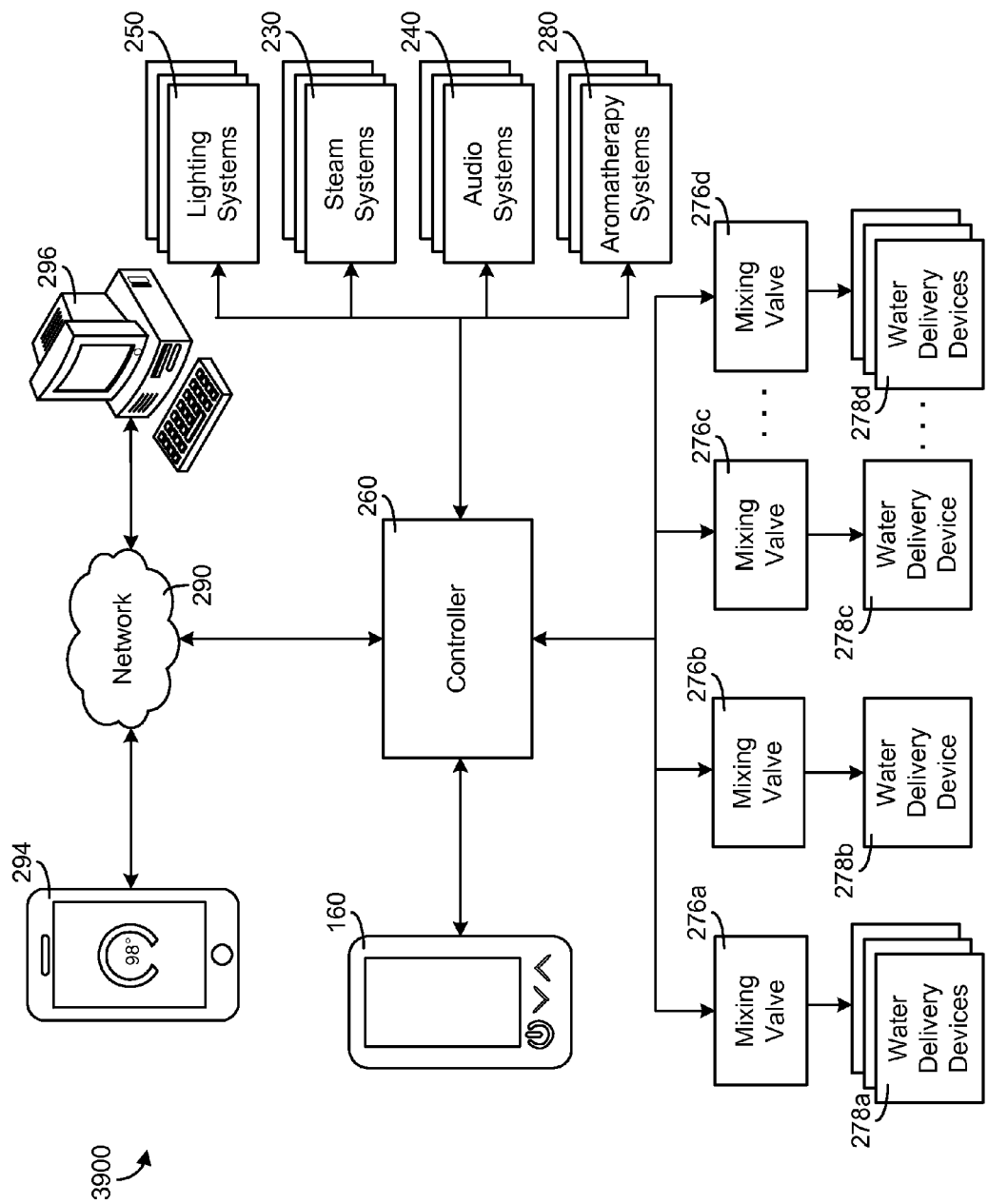
FIG. 39 is a block diagram of another shower control system in which the controller of FIG. 38 is used to control a plurality of mixing valves, each of which affects the water dispensed by a different set of water outlets, according to an exemplary embodiment.

Referring now to FIG. 39, a block diagram of another control system 3900 is shown, according to an exemplary embodiment. Control system 3900 is shown to include many of the same components as control system 3800. However, in control system 3900, each mixing valve 276a-276d is associated with one or more water delivery devices 278a-278d rather than a specific shower outlet. Each mixing valve 276a-276d may be an instance of mixing valve 276, as described with reference to FIG. 38. Mixing valves 276a and 276d are shown providing water to a plurality of water delivery devices 278a and 278d, respectively. Water delivery devices 278a and 278d may be sets of shower outlets, faucets, bath tub taps, etc. within the same temperature group. Mixing valves 276b and 276c are shown providing water to a single water delivery device 278b and 278c, respectively. Water delivery devices 278b and 278c may be individual shower outlets, faucets, bath tub taps, etc.

In some embodiments, mixing valves 276a-276d are located within the same general area (e.g., behind the wall of a shower enclosure, within a bathroom, etc.) and configured to provide water to various water delivery devices in that area. For example, mixing valves 276a-276d may be configured to provide water to various shower outlets within the same shower enclosure, as described with reference to FIGS. 1 and 38. In other embodiments, mixing valves 276a-276d are located in different physical areas (e.g., within different hotel rooms, apartments, hospital rooms, etc.) and configured to provide water to water delivery devices located in each of the different physical areas. For example, mixing valves 276a-276b may be located within a first hotel room and configured to provide water to water delivery devices 278a-278b within the first hotel room, whereas mixing valves 276c-276d may be located within a second hotel room and configured to provide water to water delivery devices 278c-278d within the second hotel room.

Each set of water delivery devices 278a-278d may be associated with one or more controllers 260 configured to monitor and control water delivery devices 278a-278d. In various embodiments, controller 260 may be a centralized controller for all of water delivery devices 278a-278d or a local controller for a subset of water delivery devices 278a-278d (e.g., a set of water delivery devices 278a-278d located within the same room or zone). Controller(s) 260 may also be configured to monitor and control one or more lighting systems 250, steam systems 230, audio systems 240, and/or aromatherapy systems 280, as described with reference to FIG. 38. One or more control panels 160 may be provided to facilitate user interaction with controller(s) 260 and the controllable devices associated therewith.

In some embodiments, control system 3900 allows for the programming of a single water delivery device or multiple water delivery devices and/or the controller(s) 260 associated therewith via network 290. This is particularly advantageous in that it allows for the programming of one or more water delivery devices and/or controllers 260 individually from a single location (e.g., via a single communication device such as mobile device 294 or non-mobile device 296). Multiple control systems 3900 and the components thereof can be programmed and updated via network 290 from centralized location (e.g., from a user device and/or a remote server), as described with reference to FIG. 38.

9. Shower Controller with Network Features

Figure 40:
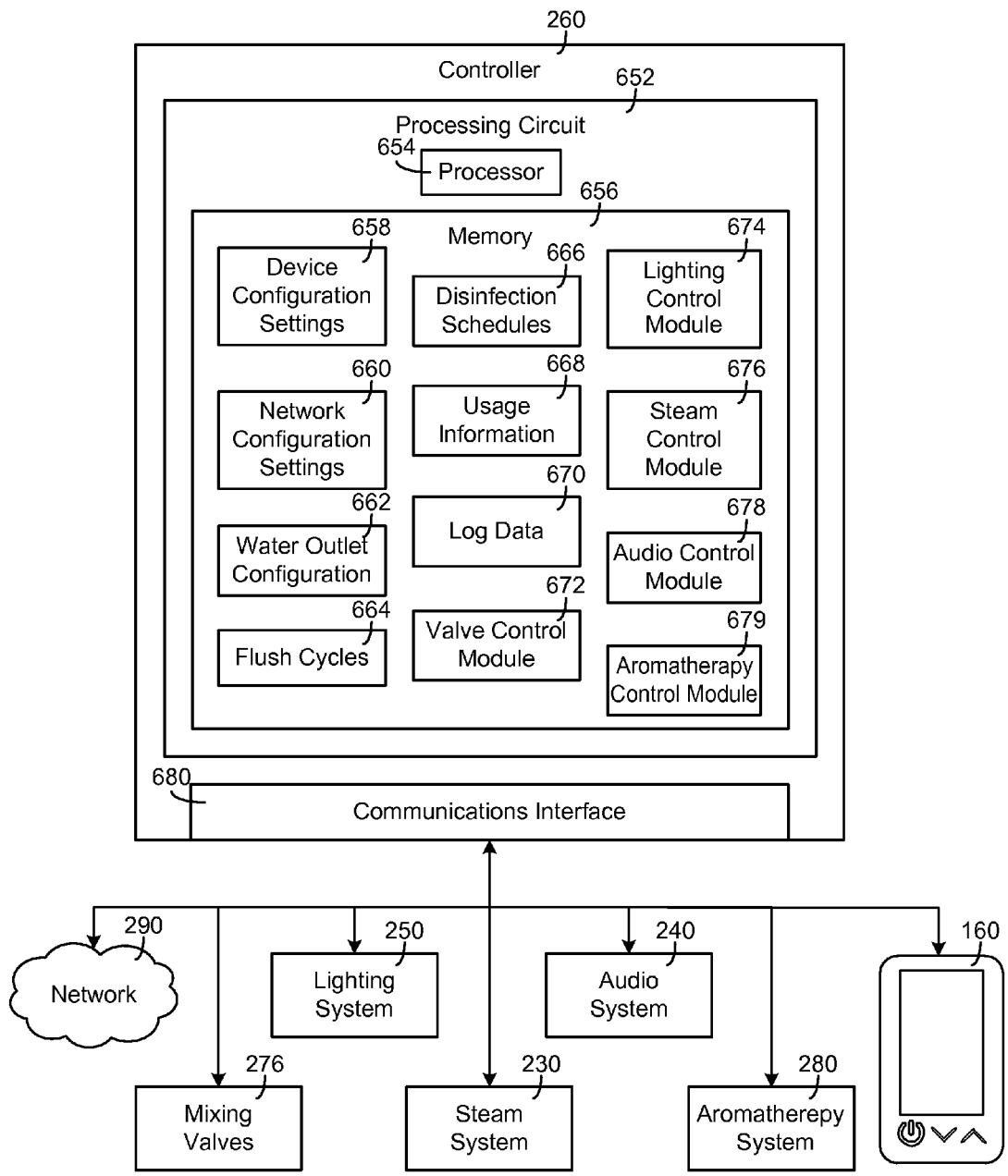
FIG. 40 is a block diagram illustrating the controller of FIG. 38 in greater detail, according to an exemplary embodiment.

Referring now to FIG. 40, a block diagram illustrating controller 260 in greater detail is shown, according to an exemplary embodiment. Controller 260 may be a central controller for a plurality of rooms or zones (e.g., a building management system controller in a hospital, residential building, office building, etc.) or a local controller for a particular room or zone (e.g., a controller for a particular shower area). Controller 260 is shown to include a communications interface 680 and a processing circuit 652.

Communications interface 680 may include wired or wireless communications interfaces (e.g., jacks, antennas, transmitters, receivers, transceivers, wire terminals, etc.) for conducting electronic data communications with various systems or devices. For example, communications interface 680 is may be used to communicate with network 290, mixing valves 276, lighting system 250, steam system 230, audio system 240, and/or control panel 160. Communications via interface 680 may be direct (e.g., local wired or wireless communications), or via communications network 290 (e.g., a LAN, WAN, the Internet, a cellular network, etc.). For example, communications interface 680 may include an Ethernet card and port for sending and receiving data via an Ethernet-based communications link or network. In another exemplary embodiment, communications interface 680 can include a WiFi transceiver for communicating via a wireless communications network or WiFi direct communications. In another exemplary embodiment, communications interface 680 may include cellular or mobile phone communications transceivers, a power line communications interface, and/or any other type of wired or wireless communications hardware.

Processing circuit 652 is shown to include a processor 654 and memory 656. Processor 654 can be implemented as a general purpose processor, an application specific integrated circuit (ASIC), one or more field programmable gate arrays (FPGAs), a group of processing components, or other suitable electronic processing components. Memory 656 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 656 may be or include volatile memory or non-volatile memory, and may include database components, object code components, script components, or any other type of information structure for supporting the various activities and information structures described in the present application. According to an exemplary embodiment, memory 656 is communicably connected to processor 654 via processing circuit 652 and includes computer code for executing (e.g., by processing circuit 652 and/or the processor 654) one or more processes described herein.

Still referring to FIG. 40, memory 656 is shown to include device configuration settings 658. Device configuration settings 658 may include programmable features/settings associated with the various devices controlled by controller 260 such as valves 276, lighting system 250, steam system 230, audio system 240, aromatherapy system 280, etc. For example, device configuration settings 658 may include water set point temperatures, modes of operation (e.g., full cold water mode), default flow rate, flow rate change increments, timeout duration, run time, reaction time, blocking time, and other similar features for valves 276. Device configuration settings 658 may also include configuration settings for lighting system 250, steam system 230, audio system 240, and/or aromatherapy system 280. In some embodiments, device configuration settings 658 include spa experiences defining programmed sequences of outputs from the output devices. Device configuration settings 658 can be programmed by a user via network 290 or control panel 160, or received as part of a packaged update from a remote data source. For example, when a user or an installer adjusts any one of the above settings via control panel 160 or user devices 294-296, the changed information may be communicated to controller 260 via communications interface 680 and stored in memory 656.

Memory 656 is shown to include network configuration settings 660. Network configuration settings 660 may define the types of communications used by controller 260 (e.g., infrared, WiFi, Ethernet, USB, etc.) and/or the network locations of various external components with which controller 260 communicates. For example, network configuration settings 660 may specify a wireless or wired network 290 to which controller 260 is connected (e.g., a LAN), and may include any network information (e.g., SSID, passwords, network key, authentication type, etc.) necessary to connect to the network 290. Network configuration settings 660 may also define whether controller 260 is set to receive updates via network 290 from a networked data source, and may specify the network location (e.g., URL, IP address, etc.) of the networked data source. Network configuration settings can be programmed by a user via network 290 or control panel 160, or received as part of a packaged update from a remote data source.

Still referring to FIG. 40, memory 656 is shown to include a water outlet configuration 662. Water outlet configuration 662 may store data describing the particular configuration of the water delivery devices controlled by controller 260. For example, water outlet configuration 662 may define which of the water delivery devices are connected to the same valve, which of the water delivery devices are within the same control group (i.e., groups of devices that can be controlled together), the locations of the water delivery devices (e.g., within a particular room or zone of a facility), and/or any other information relating to the configuration of the water outlets. Water outlet configuration 662 can be programmed by a user via network 290 or control panel 160, or received as part of a packaged update from a remote data source.

Memory 656 is shown to include flush cycles 664. Flush cycles 664 may store data relating to a duty flush cycle and/or a cold flush cycle of one or more water delivery devices. Programmable features/settings associated with a duty flush cycle of one or water delivery devices may include the type of duty flush (e.g., standard, standard oscillation, smart, and smart oscillation), frequency time, flush activation time, flush duration, flush temperature, flush flow rate, full cold water pre-flush time, and duty flush warm-up time. Programmable features/settings associated with a cold flush cycle of one or water delivery devices includes the type of cold flush (e.g., standard, standard oscillation, smart, smart oscillation, etc.), frequency time, flush activation time, flush duration, flush temperature, and full cold water pre-flush time. Flush cycles 664 can be programmed by a user via network 290 or control panel 160, or received as part of a packaged update from a remote data source.

Still referring to FIG. 40, memory 656 is shown to include disinfection schedules 666. Disinfection schedules 666 may include a thermal disinfection schedule and/or an electrical disinfection schedule for one or more water delivery devices. Thermal disinfection may be accomplished by controlling a heating element located within a mixing valve. The heating element can be controlled to heat the valve such that the water contained within the valve acts as a disinfectant for at least a portion of the valve. Programmable features/settings associated with thermal disinfection include the target water temperature(s), disinfection timeout period, disinfection warm-up time, and total disinfection time. Programmable features/settings associated with electrical disinfection include disinfection frequency time, disinfection activation time, and disinfection timeout period. Disinfection schedules 666 can be programmed by a user via network 290 or control panel 160, or received as part of a packaged update from a remote data source.

Memory 656 is shown to include usage information 668 and log data 670. In some embodiments, controller 260 is configured to log data relating to events such as water usage, duty flush cycles, and thermal disinfection events. The data may be stored in memory 656 and transmitted to an external device (e.g., user devices 294-296, control panel 160) for analysis and reference. According to an exemplary embodiment, the data relating to the above noted events is automatically logged by the controller 260 for up to a 12 month period. This is advantageous in that it allows for the monitoring and analysis of one or more water delivery devices to determine future cost allocation associated with water usage, to analyze previous usage trends, to determine optimized maintenance schedules, and to predict future water usage. Usage information 668 and log data 670 may be automatically stored in memory 656 during operation. Controller 260 may be configured to retrieve usage information 668 and log data 670 from memory 656 (e.g., periodically and/or upon request from an external system or device) and send usage information 668 and log data 670 to an external system or device via communications interface 680.

Still referring to FIG. 40, memory 656 is shown to include a valve control module 672. Valve control module 672 may be configured to monitor and control mixing valves 276. Monitoring a mixing valve may include receiving feedback signals indicating the current state of the valves and/or attributes of the water dispensed by the valves. Controlling mixing valves 276 may include generating control signals for mixing valves 276. The control signals may instruct one or more valves 276 to open, close, or adjust the amount of hot water and/or cold water provided through the valve in order to adjust the temperature and/or flow rate of the water dispensed from each of mixing valves 276. In some embodiments, valve control module 672 is configured to control each of mixing valves 276 independently.

Valve control module 672 may generate the control signals by comparing the current output of each valve 276 to a setpoint. The setpoint may be a user-defined setpoint provided via network 290 or control panel 160, or a programmed setpoint defined by a programmed spa experience or other automated feature. The current output may be measured by one or more sensors configured to measure the temperature and/or flow rate of the water dispensed one or more of mixing valves 276. Valve control module 672 may use any of a variety of control techniques (e.g., proportional control, proportional-integral (PI) control, proportional-integral-differential (PID) control, model predictive control (MPC), pattern recognition adaptive control (PRAC), etc.) to determine an appropriate control signal for the mixing valves.

Each mixing valve 276 may be configured to affect the water dispensed from one or more water delivery devices. Valve control module 672 may use the stored water outlet configuration 662 to determine which mixing valves 276 correspond to a set of water delivery devices for which an adjustment is required. Valve control module 672 may then provide the generated control signals to the determined valves 276 via communications interface 680.

Memory 656 is shown to include a lighting control module 674, a steam control module 676, an audio control module 678, and an aromatherapy control module 679. Modules 674-679 may be similar to valve control module 672 in that they provide the functionality used by controller 260 to control various types of output devices. For example, lighting control module 674 may be configured to monitor and control lighting system 250, steam control module 676 may be configured to monitor and control steam system 230, audio control module 678 may be configured to monitor and control audio system 240, and aromatherapy control module 679 may be configured to monitor and control aromatherapy system 280.

Modules 674-679 may be configured to receive feedback signals from systems 230-280 via communications interface 680 and to generate control signals for systems 230-280. In some instances, the control signals are based on user-defined setpoints or other user inputs provided via network 290 or control panel 160. For example, a user may provide an input to control panel 160 to increase or decrease a steam temperature setpoint or to turn on/off a lighting fixture. In other instances, the control signals are based on a programmed control sequence stored in memory 656 (e.g., a stored spa experience). Modules 674-679 may provide the generated control signals to systems 230-280 via communications interface 680. It is appreciated that the programmable features/settings disclosed herein are merely exemplary, and that additional programmable features associated with water delivery control may be included in the control architecture.

10. Shower Control Processes

Figure 41:
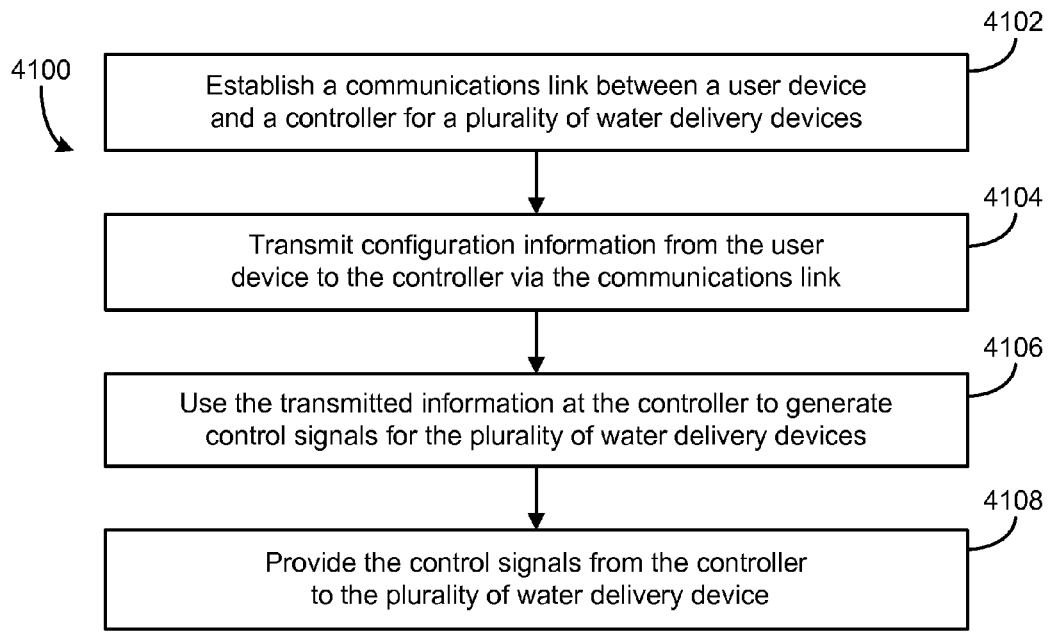
FIG. 41 is a flowchart of a process for programming a controller for a plurality of water delivery devices, according to an exemplary embodiment.

Referring now to FIG. 41, a flowchart of a process 4100 for programming a controller for a plurality of water delivery devices is shown, according to an exemplary embodiment. Process 4100 may be performed by shower control systems 200, 3800, and/or 3900, as described with reference to FIGS. 2 and 38-39.

Process 4100 is shown to include establishing a communications link between a user device and a controller for a plurality of water delivery devices (step 4102). In some embodiments, the controller is the same or similar to controller 260, as described with reference to FIGS. 2-40. The communications link may be a wired or wireless communications link, and may be a direct link or via an intermediate communications network (e.g., network 290). In various embodiments, the user device may be a mobile device (e.g., user device 294), a non-mobile device (e.g., device 296), or a control panel (e.g., control panel 160). The plurality of water delivery devices may be faucets, shower outlets, bath tub taps, or any other type of water delivery devices. The water delivery devices may be located in the same room or zone (e.g., within the same shower enclosure, as described with reference to FIG. 38) or in different rooms or zones (e.g., different rooms of an apartment complex, office building, hospital, etc. as described with reference to FIG. 39).

In some embodiments, the controller in step 4102 is a controller for a plurality of shower subsystems (e.g., a water subsystem, a steam subsystem, a lighting subsystem, an aromatherapy subsystem, an audio subsystem, etc.). In an alternative embodiment, the controller in step 4102 is a controller for a single water delivery device. The communications link established with such a controller may be a direct communications link, via an intermediate communications network, and/or via a communications bridge. The controller may be integrated with the water delivery device or separate from the water delivery device.

Process 4100 is shown to include transmitting configuration information from the user device to the controller via the communications link (step 4104). The configuration information may include, for example, device configuration settings 658, network configuration settings 660, water outlet configuration 662, flush cycles 664, disinfection schedules 666, setpoint adjustments, and/or any other type of configuration that may be used by the controller to control the water delivery device(s). In some instances, the configuration information includes control setpoints provided by the user device. The controller may store these and other types of configuration information within the memory of the controller for use in controlling the water delivery device(s), as described with reference to steps 4106-4108.

In some instances, the configuration information includes control signals or configuration information for the water delivery device(s). The controller may be configured to act as a communications bridge and relay these and other types of configuration information to the water delivery device(s). Relaying the configuration information may include, for example, translating the configuration information into a format or syntax that can be understood by the water delivery device(s) (e.g., translating the configuration information into optical light pulses) and transmitting the translated configuration information to the water delivery device(s). The water delivery device(s) may store the configuration information in a local memory thereof and/or use the configuration information to operate one or more valves (e.g., mixing valves 276) integrated with the water delivery device(s).

Process 4100 is shown to include using the transmitted information at the controller to generate control signals for the plurality of water delivery devices (step 4106) and providing the control signals from the controller to the plurality of water delivery devices (step 4108). Steps 4106 and 4108 may be performed when the configuration information is configuration information for the controller (e.g., setpoints for the controller) rather than configuration information for the water delivery devices. The control signals may be based on a difference between a setpoint (e.g., a temperature setpoint, a flow rate setpoint, etc.) included in the transmitted information and a measured value received as feedback from the plurality of water delivery devices. The control signals generated by the controller may be transmitted via a communications interface of the controller and used to control one or more mixing valves (e.g., valves 276) configured to affect the temperature and/or flow rate of the water dispensed from the water delivery devices.

Figure 42:
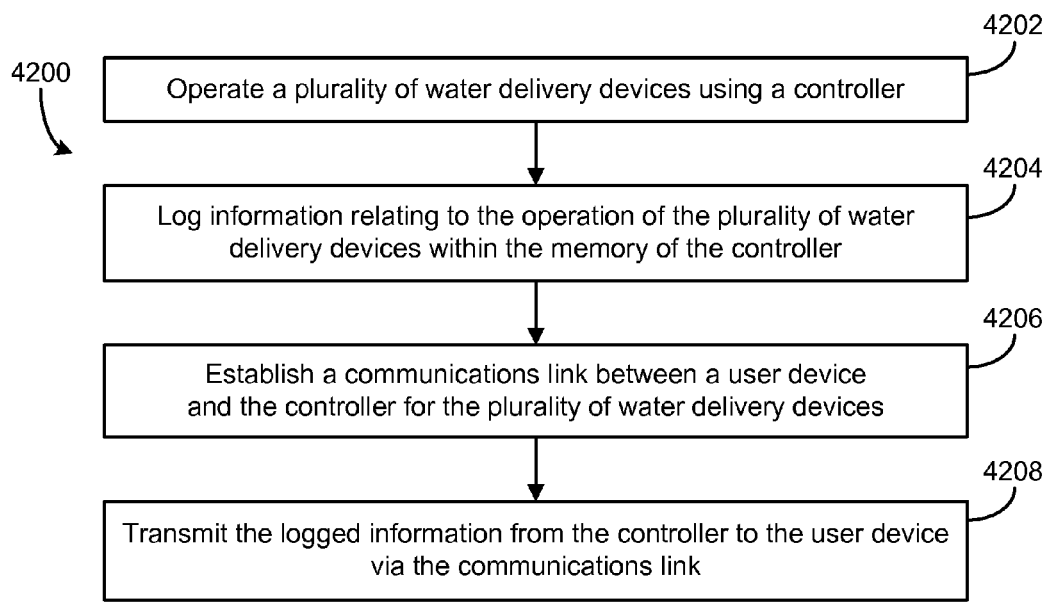
FIG. 42 is a flowchart of a process for retrieving information from a controller for a plurality of water delivery devices, according to an exemplary embodiment.

Referring now to FIG. 42, a flowchart of a process 4200 for retrieving information from a controller for a plurality of water delivery devices is shown, according to an exemplary embodiment. Process 4200 may be performed by shower control systems 200, 3800, and/or 3900, as described with reference to FIGS. 2 and 38-39.

Process 4200 is shown to include operating a plurality of water delivery devices using a controller (step 4202) and logging information relating to the operation of the plurality of water delivery devices within the memory of the controller (step 4204). The plurality of water delivery devices may be faucets, shower outlets, bath tub taps, or any other type of water delivery devices. The water delivery devices may be located in the same room or zone (e.g., within the same shower enclosure, as described with reference to FIG. 38) or in different rooms or zones (e.g., different rooms of an apartment complex, office building, hospital, etc. as described with reference to FIG. 39). The logged information may include, for example, usage information and/or log data relating to the operation of the water delivery devices. In some embodiments, the controller is a controller for a plurality of shower subsystems (e.g., a water subsystem, a steam subsystem, a lighting subsystem, an aromatherapy subsystem, an audio subsystem, etc.).

In various embodiments, the controller is integrated with one or more of the water delivery devices or separate from the water delivery devices. The logged information may be stored within the local memory of the controller (e.g., in memory 656), within the local memory of the water delivery device, or both (e.g., for embodiments in which the controller and the water delivery device are integrated). For embodiments in which the logged information is stored within the local memory of a water delivery device separate from the controller, the logged information may be transmitted from the water delivery device to the controller via a wired or wireless communications link. The controller may be configured to log usage information for a plurality of water delivery devices operated by the controller.

Process 4200 is shown to include establishing a communications link between a user device and the controller for the plurality of water delivery devices (step 4206) and transmitting the logged information from the controller to the user device via the communications link (step 4208). The communications link may be a wired or wireless communications link, and may be a direct link or via an intermediate communications network (e.g., network 290). In various embodiments, the user device may be a mobile device (e.g., user device 294), a non-mobile device (e.g., device 296), or a control panel (e.g., control panel 160).

The user device may include an application or program configured to analyze the logged information to determine future cost allocation associated with water usage, to analyze previous usage trends, to determine optimized maintenance schedules, and/or to predict future water usage. In some embodiments, the user device generates an updated configuration setting based on the logged information (e.g., based on a result of the analysis) and sends the updated configuration setting to the controller and/or the water delivery device (e.g., as described in process 4100).

Figure 43:
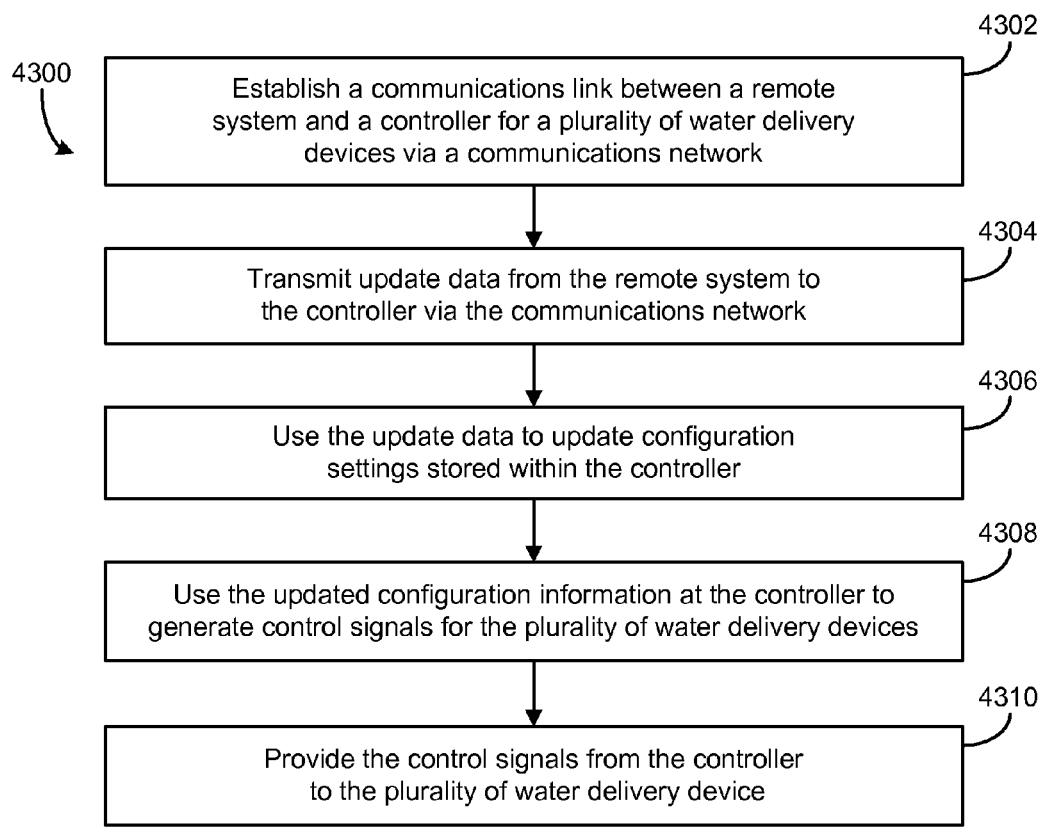
FIG. 43 is a flowchart of a process for updating a controller for a plurality of water delivery devices via a communications network, according to an exemplary embodiment.

Referring now to FIG. 43, a flowchart of a process 4300 for updating a controller for a plurality of water delivery devices is shown, according to an exemplary embodiment. Process 4300 may be performed by shower control systems 200, 3800, and/or 3900, as described with reference to FIGS. 2 and 38-39.

Process 4300 is shown to include establishing a communications link between a remote system and a controller for a plurality of water delivery devices via a communications network (step 4302). The communications link may be a wired or wireless communications link. The communications network (e.g., network 290) may be a LAN, a WAN, the Internet, a cellular network, a radio frequency network, and/or any other type of communications network. In some embodiments, the remote system is a computer server operated by a manufacturer of the controller and/or the shower control system.

In some embodiments, the controller in step 4302 is a controller for a plurality of shower subsystems (e.g., a water subsystem, a steam subsystem, a lighting subsystem, an aromatherapy subsystem, an audio subsystem, etc.). In an alternative embodiment, the controller in step 4302 is a controller for a single water delivery device. The communications link established with such a controller may be a direct communications link, via an intermediate communications network, and/or via a communications bridge. The controller may be integrated with the water delivery device or separate from the water delivery device.

Process 4300 is shown to include transmitting update data from the remote system to the controller via the communications network (step 4304). In some instances, the update data includes update data for the controller. Such update data may include, for example, updated firmware, updated control software, updated spa experiences, updated user interfaces, updated configuration settings, updated control parameters, and/or any other type of updates which may be applied by the controller.

In some instances, the update data includes update data for the water delivery device(s). The controller may be configured to act as a communications bridge and relay these and other types of update data to the water delivery device(s). Relaying update data may include, for example, translating the update data into a format or syntax that can be understood by the water delivery device(s) (e.g., translating the update data into optical light pulses) and transmitting the translated configuration information to the water delivery device(s). The water delivery device(s) may store the update data in a local memory thereof and/or use the update data to update configuration settings stored within the water delivery device(s).

Process 4300 is shown to include using the update data to update configuration settings stored within the controller (step 4306). Step 4306 may be performed when the update data is update data for the controller. The configuration settings updated in step 4306 may include, for example, device configuration settings 658, network configuration settings 660, water outlet configuration 662, flush cycles 664, disinfection schedules 666, setpoint adjustments, and/or any other type of configuration that may be used by the controller to control the water delivery device(s). In some instances, the configuration settings include control setpoints provided by the remote server (e.g., temperature, timing, and/or flow rate settings for a programmed spa experience). The controller may store these and other types of configuration settings within the memory of the controller for use in controlling the water delivery device(s).

Process 4300 is shown to include using the updated configuration information at the controller to generate control signals for the plurality of water delivery devices (step 4308) and providing the control signals from the controller to the plurality of water delivery devices (step 4310). The control signals may be based on a difference between a setpoint (e.g., a temperature setpoint, a flow rate setpoint, etc.) included in the transmitted information and a measured value received as feedback from the plurality of water delivery devices. The control signals may be transmitted via a communications interface of the controller and used to control one or more mixing valves (e.g., valves 276) configured to affect the temperature and/or flow rate of the water dispensed from the water delivery devices.

11. Configuration of Exemplary Embodiments

It is important to note that the construction and arrangement of the shower control systems and devices thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A shower control system comprising:
   a water subsystem comprising one or more electronic valves configured to control a flow rate and a temperature of water dispensed from one or more shower outlets within a shower enclosure;
   a steam subsystem configured to generate and dispense steam from one or more steam outlets within the shower enclosure; and
   a controller in communication with the water subsystem and the steam subsystem, wherein the controller is configured to control the water subsystem and the steam subsystem to provide a spa experience comprising a predetermined and coordinated sequence of water outputs from the shower outlets and steam outputs from the steam outlets;
   wherein the predetermined sequence of water outputs from the shower outlets is defined by a first stored multidimensional temperature profile for the shower outlets;
   wherein the predetermined sequence of steam outputs from the steam outlets is defined by a second stored multidimensional temperature profile for the steam outlets;
   wherein the controller executes both multidimensional temperature profiles concurrently during the spa experience, causing the shower outlets and the steam outlets to provide the coordinated sequence of water outputs and steam outputs.

2. The shower control system of claim 1, further comprising an audio subsystem configured to provide audio from one or more speakers within the shower enclosure;
   wherein the controller is in communication with the audio subsystem and configured to control the audio subsystem;
   wherein the spa experience further comprises a predetermined sequence of audio outputs from the speakers coordinated with the water outputs and the steam outputs.

3. The shower control system of claim 1, further comprising a lighting subsystem configured to provide lighting from one or more lighting devices within the shower enclosure;
   wherein the controller is in communication with the lighting subsystem and configured to control the lighting subsystem;
   wherein the spa experience further comprises a predetermined sequence of lighting outputs from the lighting devices coordinated with the water outputs and the steam outputs.

4. The shower control system of claim 1, further comprising an aromatherapy subsystem configured to dispense an aromatic substance within the shower enclosure;
   wherein the controller is in communication with the aromatherapy subsystem and configured to control the aromatherapy subsystem;
   wherein the spa experience further comprises a predetermined sequence of aromatherapy outputs coordinated with the water outputs and the steam outputs.

5. The shower control system of claim 1, wherein the spa experience comprises multiple stages, each stage having a predetermined duration and comprising a different combination of the water outputs and the steam outputs;
   wherein the controller is configured to perform the multiple stages sequentially.

6. The shower control system of claim 5, wherein performing the multiple stages sequentially comprises:
   causing the water subsystem and the steam subsystem to provide a first combination of coordinated water and steam outputs during a first stage of the spa experience;
   automatically transitioning from the first stage of the spa experience to a second stage of the spa experience; and
   causing the water subsystem and the steam subsystem to provide a second combination of coordinated water and steam outputs during the second stage of the spa experience, wherein the second combination of coordinated water and steam outputs is different from the first combination of coordinated water and steam outputs.

7. The shower control system of claim 1, further comprising a control panel in communication with the controller and comprising an electronic display;
   wherein the controller causes the control panel to display a graphical user interface for controlling the spa experience.

8. The shower control system of claim 7, wherein the graphical user interface comprises the first stored multidimensional temperature profile representing an output provided by a group of the shower outlets during the spa experience;
   wherein the controller causes the group of shower outlets to provide a water output defined by the first stored multidimensional temperature profile during the spa experience.

9. The shower control system of claim 8, wherein the first stored multidimensional temperature profile comprises a time axis, a temperature axis, and a plurality of points, each point having a time attribute and a temperature attribute defining a location of the point in the multidimensional temperature profile.

10. The shower control system of claim 8, wherein the graphical user interface further comprises the second stored multidimensional temperature profile representing an output provided by the steam outlets during the spa experience;
wherein the controller causes the steam outlets to provide a steam output defined by the second multidimensional temperature profile during the spa experience.

11. A shower control system comprising:
a water subsystem comprising one or more electronic valves configured to control a flow rate and a temperature of water dispensed from one or more shower outlets within a shower enclosure;
a steam subsystem configured to generate and dispense steam from one or more steam outlets within the shower enclosure; and
a controller for the water subsystem and the steam subsystem, wherein the controller is configured to receive update data from a remote system, use the update data to update configuration settings stored within the controller, and generate control signals for the water subsystem and the steam subsystem using the updated configuration settings;
wherein the predetermined sequence of water outputs from the shower outlets is defined by a first stored multidimensional temperature profile for the shower outlets;
wherein the predetermined sequence of steam outputs from the steam outlets is defined by a second stored multidimensional temperature profile for the steam outlets;
wherein the controller executes both multidimensional temperature profiles concurrently during the spa experience, causing the shower outlets and the steam outlets to provide the coordinated sequence of water outputs and steam outputs.

12. The control system of claim 11, wherein the water subsystem is configured to use the control signals to adjust an attribute of the water dispensed from the shower outlets;
wherein the steam subsystem is configured to use the control signals to adjust an attribute of the steam dispensed from the steam outlets.

13. The control system of claim 11, wherein the remote system comprises an internet file server configured to provide the update data to the controller via the internet.

14. The control system of claim 11, wherein the update data comprises at least one of updated firmware for the controller, updated control parameters used by the controller, and updated configuration settings for the controller.

15. The control system of claim 11, further comprising a control panel configured to present a user interface for monitoring and controlling the water subsystem and the steam subsystem;
wherein the update data comprises an updated user interface for the control panel.

16. The control system of claim 11, wherein the controller is configured to:
collect usage information describing control operations performed by the water subsystem and the steam subsystem;
store the usage information within a memory of the controller; and
report the usage information to the remote system via a communications network.

17. The control system of claim 11, wherein the update data comprises at least one of an update to the spa experience and a new spa experience.

18. The control system of claim 11, further comprising at least one of:
an audio subsystem configured to provide audio from one or more speakers within the shower enclosure;
a lighting subsystem configured to provide lighting from one or more lighting devices within the shower enclosure; and
an aromatherapy subsystem configured to dispense an aromatic substance within the shower enclosure.

* * * * *